US011597785B2

(12) United States Patent
Sletten et al.

(10) Patent No.: US 11,597,785 B2
(45) Date of Patent: Mar. 7, 2023

(54) TUNABLE LINEAR FLUOROPOLYMERS

(71) Applicant: The Regents of the University of California, Oakland, CA (US)

(72) Inventors: Ellen M. Sletten, Los Angeles, CA (US); Joseph A. Jaye, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 32 days.

(21) Appl. No.: 16/764,680

(22) PCT Filed: Nov. 16, 2018

(86) PCT No.: PCT/US2018/061594
§ 371 (c)(1),
(2) Date: May 15, 2020

(87) PCT Pub. No.: WO2019/099884
PCT Pub. Date: May 23, 2019

(65) Prior Publication Data
US 2020/0407475 A1 Dec. 31, 2020

Related U.S. Application Data

(60) Provisional application No. 62/588,040, filed on Nov. 17, 2017.

(51) Int. Cl.
*C08F 8/26* (2006.01)
*C08F 214/18* (2006.01)
*C08F 118/12* (2006.01)
*C08F 138/00* (2006.01)
*C08J 3/24* (2006.01)

(52) U.S. Cl.
CPC ............ *C08F 214/182* (2013.01); *C08F 8/26* (2013.01); *C08F 118/12* (2013.01); *C08F 138/00* (2013.01); *C08J 3/243* (2013.01)

(58) Field of Classification Search
CPC .... C08G 61/04; C08F 214/182; C08F 236/20; C08F 214/16; C08F 4/468; C08F 4/30; C08F 36/00; C08F 36/02; C08F 36/20
See application file for complete search history.

(56) References Cited

FOREIGN PATENT DOCUMENTS

CN 105482013 * 4/2016
WO WO-2019/099884 A1 5/2019

OTHER PUBLICATIONS

Xu, Macromol. Rapid Commun. 2017, 38, 1600587(1-8). (Year: 2016).*
Translation of CN 105482013 (Year: 2016).*
Boyer et a., "Iodine transfer polymerization (ITP) of vinylidene fluoride (VDF). Influence of the defect of VDF chaining on the control of ITP," Macromolecules, 38(25):10353-10362 (2005).
International Search Report and Written Opinion for International Application No. PCT/US2018/061594 dated Mar. 10, 2019.
Percec et al., "Rational Design of a Hexagonal Columnar Mesophase in Telechelic Alternating Multicomponent Semifluorinated Polythylene," Macromolecules, 30:645-648 (1997).
Soulestin et al., "Differences in electroactive terpolymers based on VDF, TrFE and 2, 3, 3, 3-tetrafluoropropene prepared by batch solution and semi-continuous agueous suspension polymerizations," Polymer Chemistry, 8(4):735-747 (2017).
Tando Kili, "The synthesis and characterization of fluorinated ethylene propylene (FEP) copolymers," Department of Chemical Engineering University of Pretoria, (2014).
Wilson et al., "Liquid-Crystalline Fluorocarbon-Hydrocarbon Microblock Polymers," Marcromolecules, 26:6312-6314 (1993).
Extended European Search Report for EP Application No. 18879420.0 dated Jul. 14, 2021.
Xu et al., "Step Transfer-Addition and Radical-Termination (START) Polymerization of α,ω-Unconjugated Dienes under Irradiation of Blue LED Light," Macromolecular Rapid Communications, 38(13): 1600587 (2016).

* cited by examiner

*Primary Examiner* — Robert C Boyle
(74) *Attorney, Agent, or Firm* — Foley Hoag LLP; David P. Halstead; Alexander J. Chatterley

(57) ABSTRACT

The present disclosure provides tunable fluoropolymers and methods for making them.

22 Claims, 25 Drawing Sheets

Before SPAAC   5a

After SPAAC   5a

Before SPAAC   31

After SPAAC   34

TUNABLE LINEAR FLUOROPOLYMERS

RELATED APPLICATIONS

This application is the § 371 National Stage of PCT/US2018/061594, filed Nov. 16, 2018; which claims the benefit of U.S. Provisional Patent Application No. 62/588,040, filed on Nov. 17, 2017. The contents of each of those applications are hereby incorporated by reference in their entirety.

BACKGROUND

Fluorinated polymers have diverse applications spanning many industries due to the inert, non-polarizable nature of perfluorocarbons. Fluoropolymers benefit from high maximum operation temperature, high chemical resistance, and high electric resistivity. These attractive physical properties also make fluoropolymers difficult to work with. Processibility of these polymers is difficult due to low solubility and high melting points. Solubility of fluoropolymers produced on an industrial scale has been improved through use of various functional groups being attached to the core of the polymer, but these processes use expensive starting materials. The materials typically used in industrial-scale fluoropolymer synthesis are also corrosive and generate hazardous by products. Accordingly, new methods of preparing fluoropolymers are needed.

SUMMARY OF THE INVENTION

The present disclosure provides a polymerization technique that allows an easy, safe, and scalable synthesis of functionalized fluoropolymers. This step-growth polymerization uses an organic diene and an αω-diiododoperfluoroalkane as building blocks in the presence of a radical initiator. The reaction can be performed without air-free conditions with acetonitrile/water/dimethyl carbonate as a reaction mixture, or under nitrogen with DMSO as a solvent. Through this approach, diverse and tunable fluoropolymers may be prepared. An additional benefit of this method is that the resulting polymer contains iodine atoms on its backbone, which provide sites for post-polymerization functionalization through reduction, elimination, displacement, or cross-linking.

In one aspect, the present disclosure provides a polymer comprising repeat units according to formula I, Ia, Ib, Ic, Id, Ie, If, or Ig:

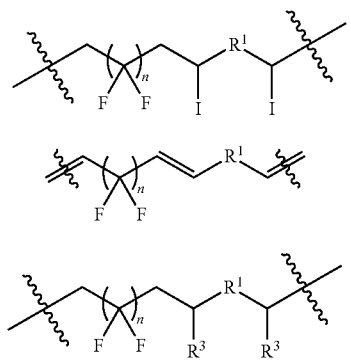

(I)

(Ia)

(Ib)

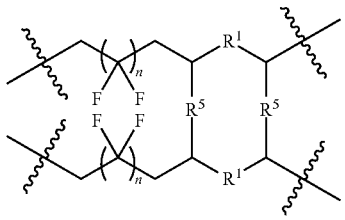

(Ic)

(Id)

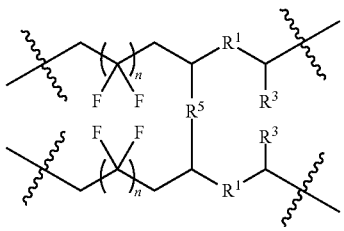

(Ie)

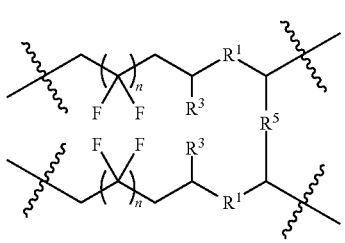

(If)

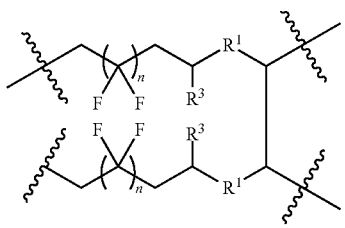

(Ig)

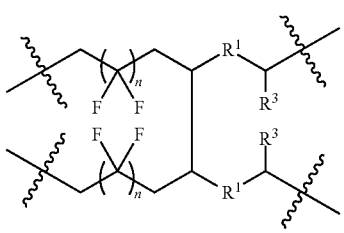

wherein:
each $R^1$ and $R^5$ is independently a divalent linker; $R^3$ is H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron; and
n is an integer from 1-100, such as 1-50, 1-25, 1-10, or 6.

BRIEF DESCRIPTION OF THE DRAWINGS

FIG. 22B shows the solubility of 24 in hot methoxyperfluorobutane at 10 mg/mL compared to 5a.

DETAILED DESCRIPTION OF THE INVENTION

Figure 17A:
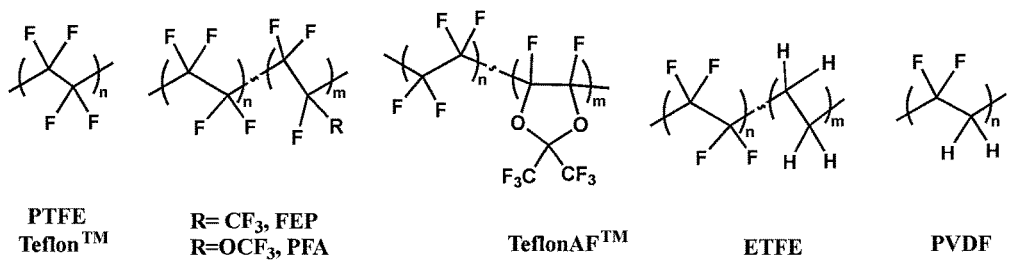
FIG. 17A shows some common industrial fluoropolymers and semi-fluorinated polymers. Generally, stability and melting points correlate with increased weight percent fluorine, while there is an inverse relationship with processability.
Figure 17B:
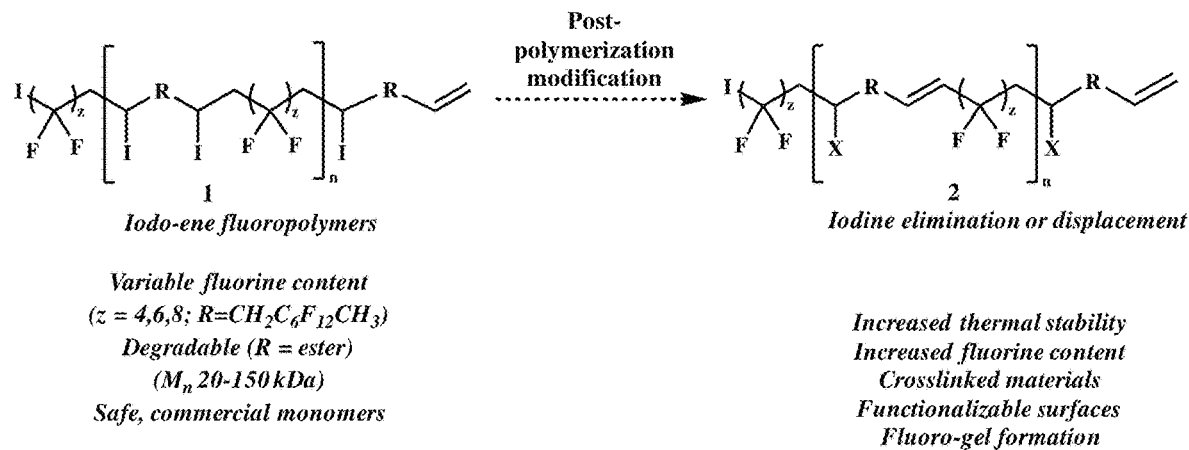
FIG. 17B shows the iodo-ene fluoropolymers described herein, which are processable, tunable, simple to prepare, and can be readily modified through post-polymerization modification to improve stability or functionality.

Semifluorinated polymers were prepared under mild conditions with safe, commercially available monomers and no need for surfactant. The polymers produced herein were significantly larger (200 kDa) than polymers produced through similar methods (10-20 kDa). A step-growth iodo-ene polymerization was employed, which results in two iodine atoms installed within the backbone for every repeat unit (7, FIGS. 17A&B). The large, polarizable iodine atoms enhance the processability, yet can be easily removed after processing to result in stable fluoropolymers. Furthermore, the iodine atoms provide a functional handle for post-polymerization modification and crosslinking (1). The fluorine content can be tuned by varying the monomers ($CF_2$ repeats and R in 7) and/or iodine displacement (X in 2) with moieties containing further fluorination. Through these strategies, it is possible to prepare fluoropolymers that: 1) render surfaces hydrophobic yet can be processed in organic or fluorous solvent, 2) generate fluorous surfaces that can be covalently modified, 3) are curable with heat and base into thermally stable films, 4) are readily crosslinked with a variety of chemistries, and 5) may be photocured into gels. Notably, the fluorine content within these polymers is on the backbone making them distinct from existing approaches to impart standard polymers (e.g. acrylates, styrenes) with fluorous character.

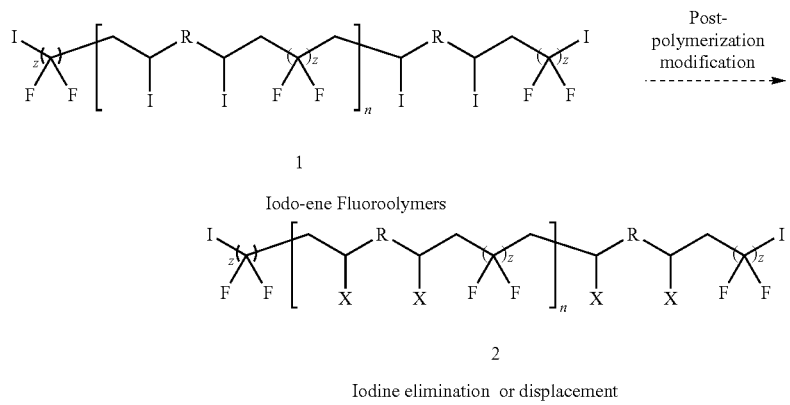

1
Iodo-ene Fluoroolymers

2
Iodine elimination or displacement

Quantitative addition of perfluorohexyliodide into 1-octene and 1,9-decadiene was obtained after sonication in a mixture of acetonitrile and water with sodium dithionate and bicarbonate, suggesting these conditions were sufficient for a step-growth polymerization. Studies were performed combining 1,9-decadiene (3) with diiodoperfluorohexane (4) in an acetonitrile/water/DMC solvent mixture (Table 1). Within 30 minutes of sonicating 3 and 4a under these conditions, precipitate was evident, suggesting polymer formation. Isolation of the precipitate and NMR analysis indicated polymer 5a, which was compared to 5a synthesized using AIBN (Table 1, Entry 11) and found to be identical via $^1$H-NMR and $^{19}$F-NMR. GPC analysis in THF indicated 5a formed via the air-free reaction developed by Griffin was 10 kDa, while 5a formed after 30 min of sonicating in the presence of sodium dithionate gave very broad peaks on the THF GPC, suggesting aggregation.

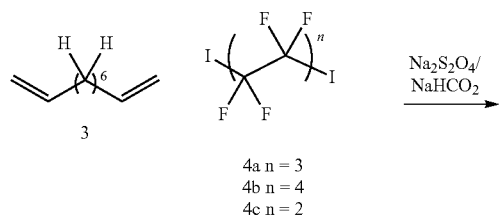

3

4a n = 3
4b n = 4
4c n = 2

-continued 5a n = 3
5b n = 4
5c n = 2

In efforts to gain accurate $M_n$ and $M_w$ data for the iodo-ene polymers, the polymers were analyzed in 65° C. DMSO using an Agilent Mixed-C column, emulating conditions that were previously reported for the analysis of PVDF. Under these conditions, 5a prepared via the iodo-ene polymerization could be analyzed without solubility problems. GPC analysis of polymer 5a at multiple time points demonstrated that although the polymer quickly precipitates, the reaction requires 14 hours to reach maximum size. With the optimized initial conditions, polymer 5a could be synthesized in 88% yield with molecular weights up to 257 kDa and dispersity of 1.66. Further exploring the scope of the polymerization, the iodo-ene reaction readily proceeded with traditional heating or 365 nm light as energy inputs. Polymer could also be obtained without the use of the dimethyl carbonate additive, or even more surprisingly, without any organic solvent. The solvent system can also be switched to pure DMSO as a reaction solvent with or without degassing, with degassing providing higher molecular weight polymer. The molecular weights and dispersities did vary under the different conditions with conventional heating yielding the highest molecular weight polymers, and sonication with water as the solvent generating the lowest molecular weight polymers (Table 1).

TABLE 1

Exemplary Polymerization Conditions

| Entry # | No. | z | Solvent | Energy Input | Time (Hours) | $M_n$ (kDa) | n | Ð |
|---|---|---|---|---|---|---|---|---|
| 1 | 5a | 6 | MeCN:DMC:H$_2$O | Sonication | 0.5 | 25.0$^b$ | 35 | 1.98 |
| 2 | 5a | 6 | MeCN:DMC:H$_2$O | Sonication | 6 | 58.6 | 84 | 1.33 |
| 3 | 5a | 6 | MeCN:DMC:H$_2$O | Sonication | 14 | 116 | 168 | 1.79 |
| 4 | 5a | 6 | MeCN:DMC:H$_2$O | Heating | 14 | 188 | 272 | 1.35 |
| 5 | 5a | 6 | MeCN:DMC:H$_2$O | 365 nm UV | 14 | 101 | 146 | 1.25 |
| 6 | 5a | 6 | MeCN:H$_2$O | Sonication | 14 | 143 | 206 | 1.32 |
| 7 | 5a | 6 | H$_2$O | Sonication | 14 | 35.1 | 51 | 2.84 |
| 8 | 5b | 8 | MeCN:DMC:H$_2$O | Sonication | 14 | 161 | 203 | 1.26 |
| 9 | 5c | 4 | MeCN:DMC:H$_2$O | Sonication | 14 | 78.7 | 113 | 1.44 |
| 10 | 5d | 4-8 | MeCN:DMC:H$_2$O | Sonication | 14 | 76.3 | 110 | 1.62 |

TABLE 1-continued

Exemplary Polymerization Conditions

| Entry # | No. | z | Solvent | Energy Input | Time (Hours) | $M_n$ (kDa) | n | Đ |
|---|---|---|---|---|---|---|---|---|
| 11 | 5a | 6 | Neat plus AIBN[a] | Heat | 3 | 10[b] | 14 | 1.65 |
| 12 | 5a | 6 | Neat plus AIBN[a] | Heat | 3 | 47.4 | 68 | 1.57 |
| 13 | 5a | 6 | DMSO | Stirring, RT[c] | 14 hours | 32.3[b] | 47 | 1.88 |

[a] AIBN employed instead of $Na_2S_2O_4/NaHCO_3$
[b] GPC analysis performed in THF at 40° C. at a flow rate of 0.7 mL/min. Molecular weight and PDI calculated through calibration with Polystyrene standards. In all other cases, GPC analysis performed in DMSO at 65° C. at a flow rate of 0.35 mL/min. Molecular weight and PDI calculator through calibration with PMMA standards.
[c] Degassing was performed prior to polymerization.

Figure 1:
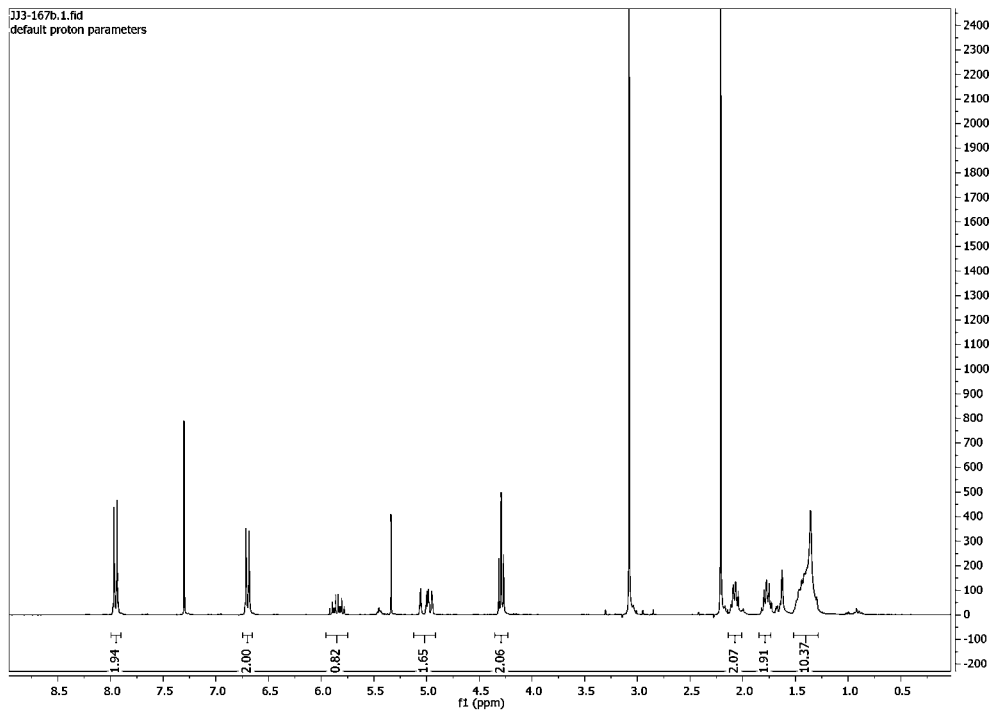
FIG. 1 shows an NMR spectrum of a dimethylaminobenzoyl end-cap.
Figure 2:
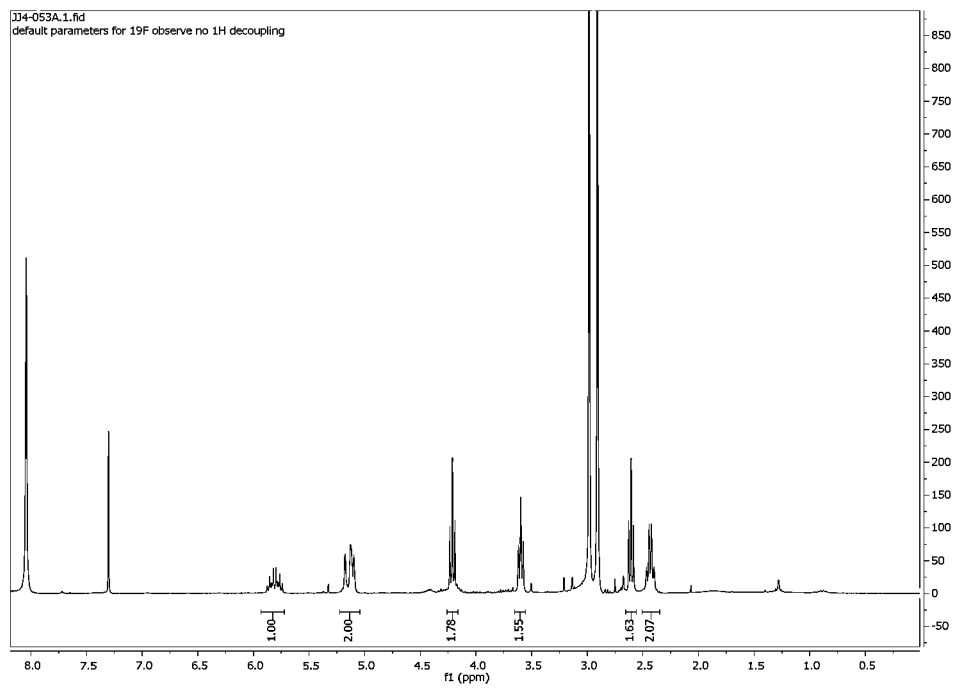
FIG. 2 shows an NMR spectrum of an azide end-cap.
Figure 3:
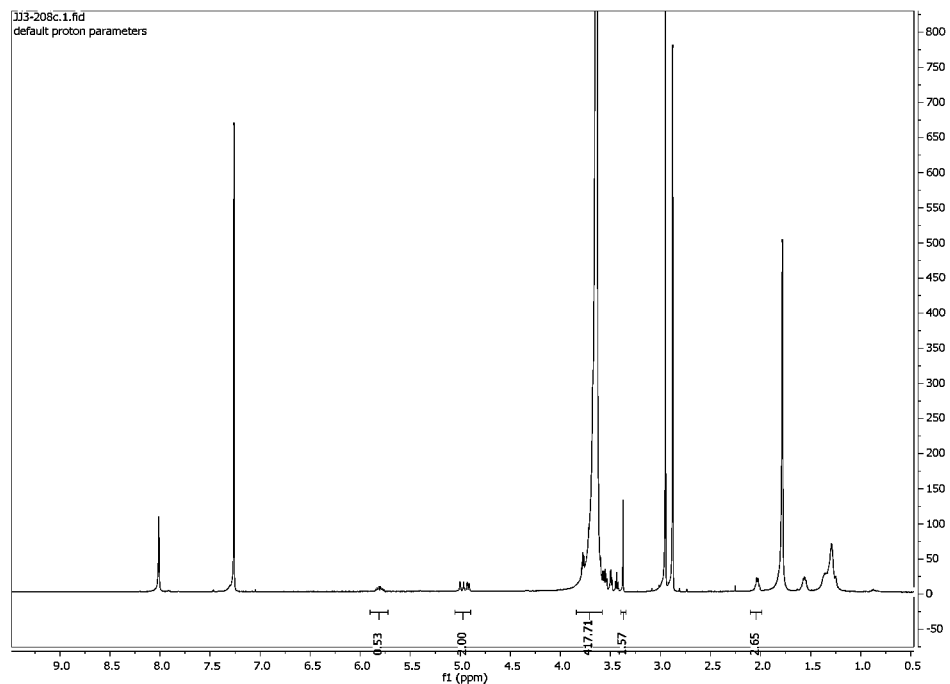
FIG. 3 shows an NMR spectrum of a PEG end-cap.
Figure 18A:
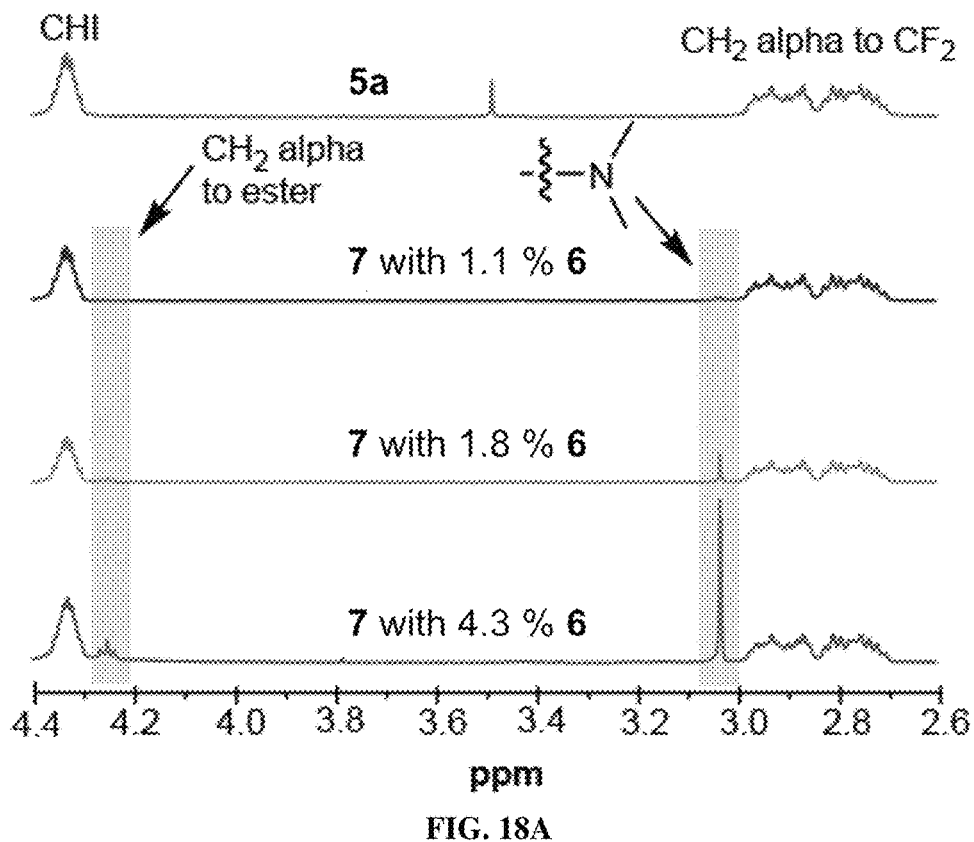
FIG. 18A shows stacked $^1$H-NMR spectra of end-capped polymers 7 compared to 5a (top) described in Example 20. $^1$H-NMR signals from the end-cap are highlighted in gray.
Figure 18B:
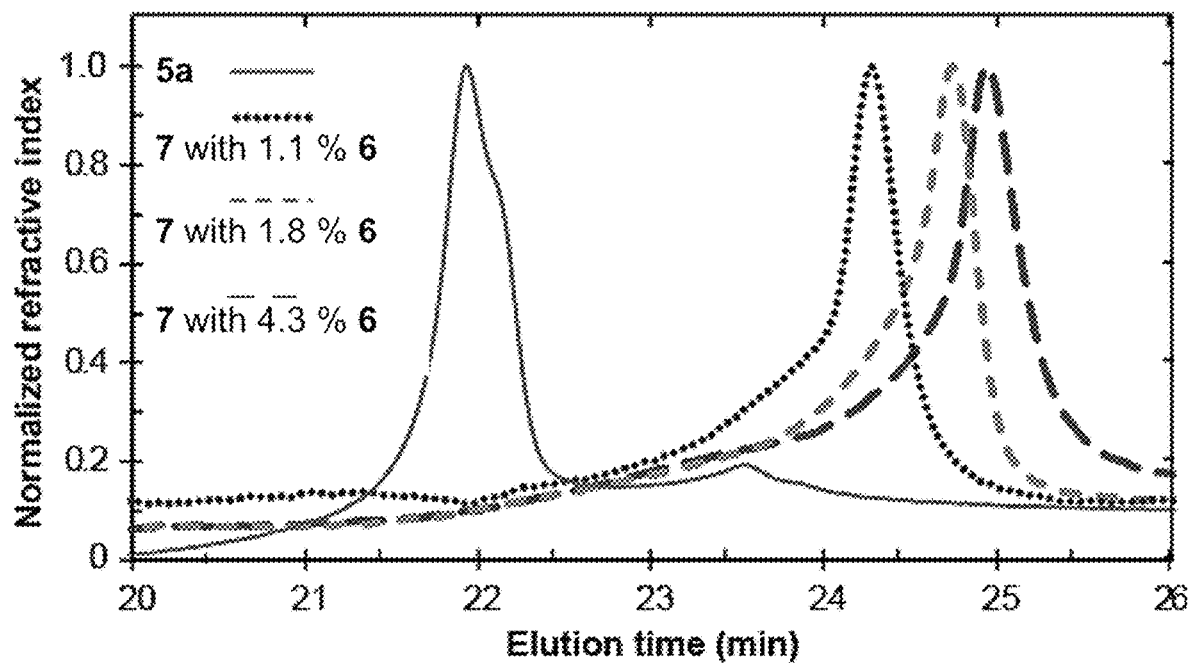
FIG. 18B shows GPC traces for polymer 5a (solid) compared to 7 with varied weight percent 12 described in Example 20. GPC traces were obtained from a 3 mg/mL solutions of fluoropolymers in DMSO and analyzed on an Agilent Mixed-C column with DMSO eluent at 65° C.

Through the course of the work described herein, there were discrepancies between the molecular weight data obtained via GPC in THF with polystyrene standards and DMSO with polymethyl methacrylate standards (10 kDa vs 47 kDa for 5a synthesized via AIBN conditions). To explore the DMSO GPC data, an end-capping method was developed such that $M_n$ could be determined by NMR. Alkene 6 was prepared, containing a dimethylamino group that has $^1$H-NMR chemical shifts that are distinct from the polymer backbone. Three different polymers were prepared containing 4.3, 1.7, 1.1 wt % of 7 and compared to uncapped polymer 5a (FIGS. 18 A&B). The $M_n$ calculated via NMR were 22.0 kDa, 31.2 kDa, and 59.6 kDa, respectively. These data matched the $M_n$ obtained by the GPC in DMSO well (FIG. 2b-d), validating the use of DMSO GPC for iodo-ene fluoropolymers (Table 2).

TABLE 2

Exemplary Polymer Characteristics

| Polymer | Wt % | $M_n$ (NMR) (kDa) | $M_n$ GPC (kDa) | Đ |
|---|---|---|---|---|
| 7 | 4.3 | 22.0 | 18.4 | 1.36 |
| 7 | 1.7 | 31.2 | 41.5 | 1.32 |
| 7 | 1.1 | 59.6 | 63.9 | 2.25 |
| 5a | 0 | — | 134.6 | 1.79 |

The end-capping approach also allows for the molecular weight of the semifluorinated polymers to be controlled with low dispersities, a feat that has not been achieved with existing chain growth methods industrially employed for fluoropolymer synthesis. For example, current methods to

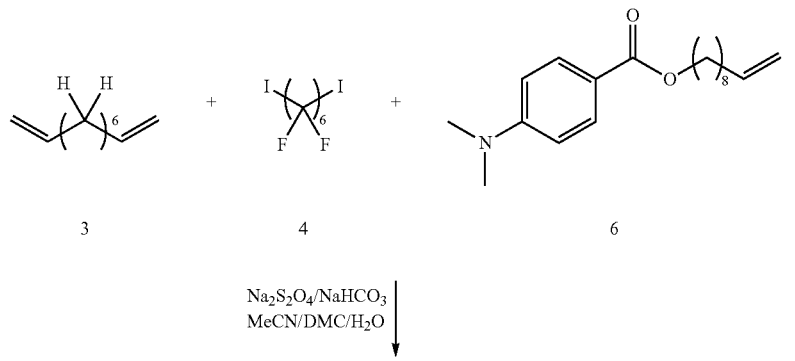

3    4    6

$Na_2S_2O_4/NaHCO_3$
$MeCN/DMC/H_2O$

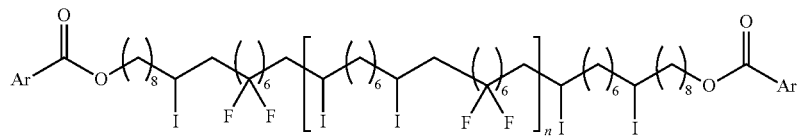

7

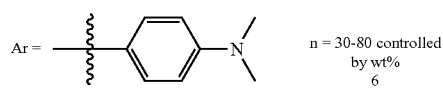

n = 30-80 controlled by wt% 6 obtain 10-100 kDa PTFE include fragmenting larger PTFE with ionizing radiation or through polymerization of TFE in supercritical $CO_2$ or fluoroform. Furthermore, azide end-capped 8 can replace end-cap 6 and be utilized to synthesize triblock copolymers 11a-c through alkyne-azide click chemistry with a pre-functionalized alkynyl polymer fluorous polymers using the iodo-ene polymerization, fluorinated diene 8 was prepared by the addition of allyl tributyl tin to diiodoperfluorohexane. Diene 12 was polymerized with diiodoperfluorooctane 4b to result in polymer 16b, increasing the wt % fluorine by 1.5×. The addition of more hydrophilic functionalities was also explored. Ether, alco-

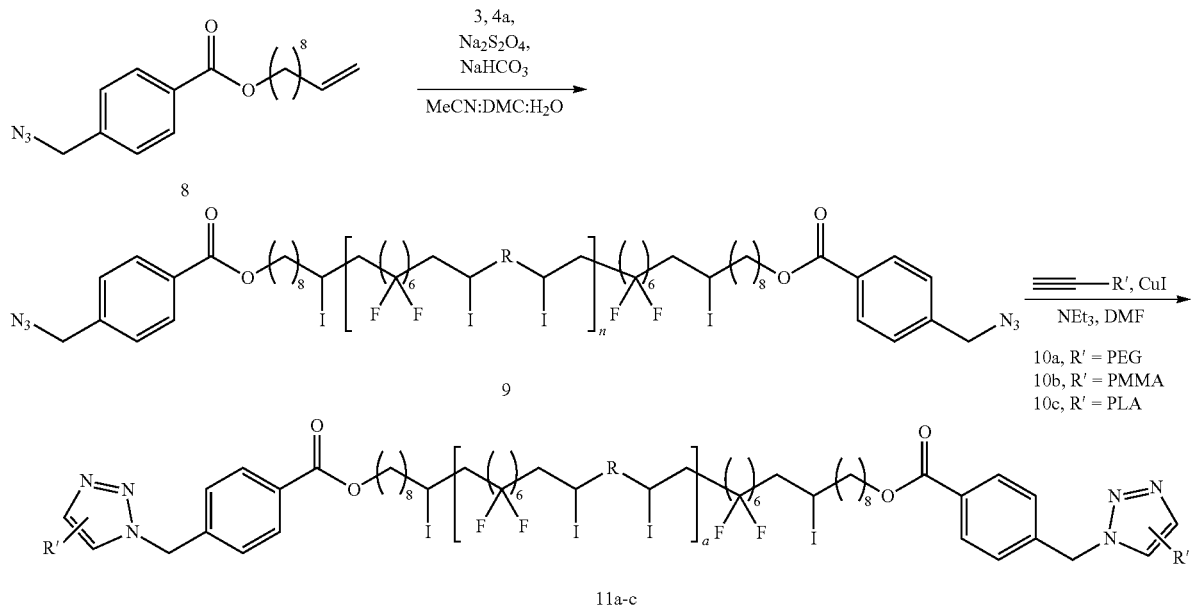

Figure 19:
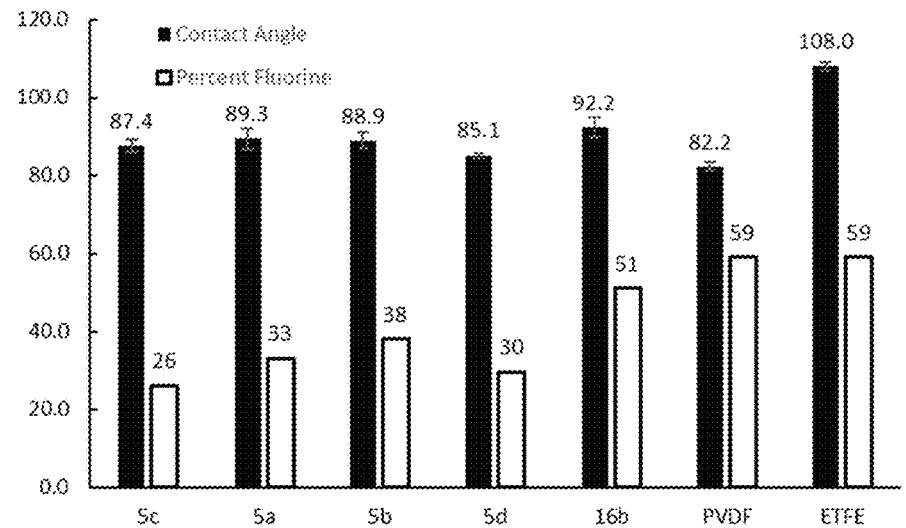
FIG. 19 shows contact angle measurements of polymers 5a-d, 16b, in comparison to PVDF (6) and ETFE (5). Thin films of 5a-d and 16b were prepared by dropcasting a 3 mg/mL polymer solutions in THF, DMF, or DMSO onto a slide and annealed at 80° C. Contact angle measurements were obtained by slow dropping of water from a distance which separates the resulting droplet and the pipette tip. Contact angles were measured with a 5 second delay from initial contact of water with the polymer surface. The reported values are the average of at least three independent droplets per sample.

With a facile method to obtain fluoropolymers established, the fluorine content of the polymers was modulated to allow their fluorous properties to be compared to existing industrial polymers. The simplest way to alter the weight percent fluorine (wt % F) of the semifluorinated polymers is to employ different diiodoperfluoroalkane monomers. The polymerization proceeded readily with C4, C6, and C8 diiodoperfluoroalkanes 4a-c to yield polymers 5a-c, though the rate of polymerization increases with the number of $CF_2$ groups in the monomer. Thin films of the resulting polymers 5a-c were prepared by drop-casting from THF, DMF, or DMSO solutions and contact angles were measured to gain insight on the fluorous character of the respective polymers. PVDF films dropcast from DMSO were used as a positive control. Despite having lower weight percent fluorine than PVDF, polymers 5a-c surprisingly have larger contact angles, suggesting that consecutive $CF_2$ groups enhance the fluorous character (FIG. 19). This is also supported through ETFE's significantly higher contact angle than PVDF. The similarity between the contact angle of 5a-c prompted the synthesis of polymer 5d, using monomers 5a-c in a ratio representative of crude perfluoroalkyldiiodide. Polymer 5d represents the lowest-cost iodo-ene polymer which could be more readily transferred to large scale synthesis.

Having established that the semifluorinated iodo-ene polymers are sufficiently fluorous, the iodine installed within the backbone and the diene composition was leveraged to increase the wt % fluorine, biocompatibility, processability, as well as install functional handles for grafting and cross-linking. Chemical modifications to the diene monomer provide an avenue to increase the fluorine content or add further functional groups to the fluoropolymers. To create more hol, and ester-containing dienes (13-15) all afforded semifluorinated polymers (17-19) of significant molecular weight (Table 3).

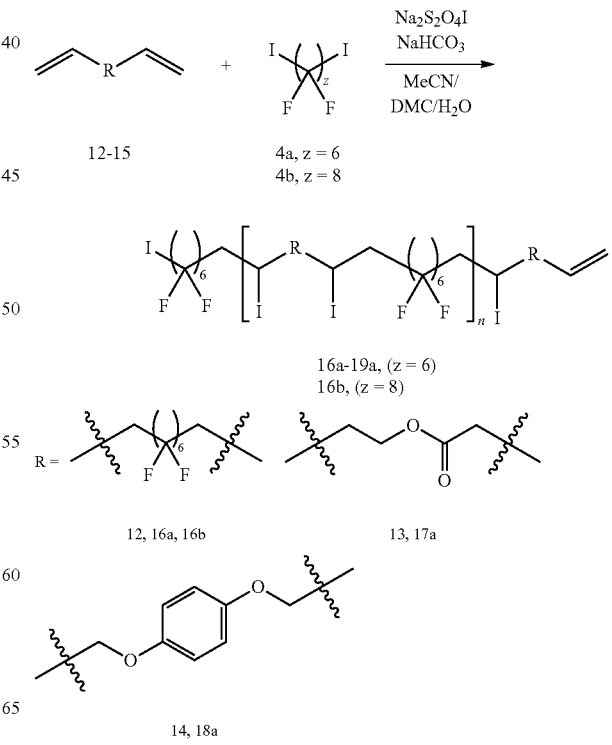

-continued

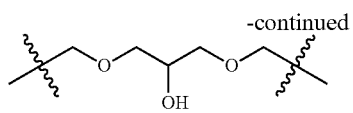

15, 19a

Figure 4:
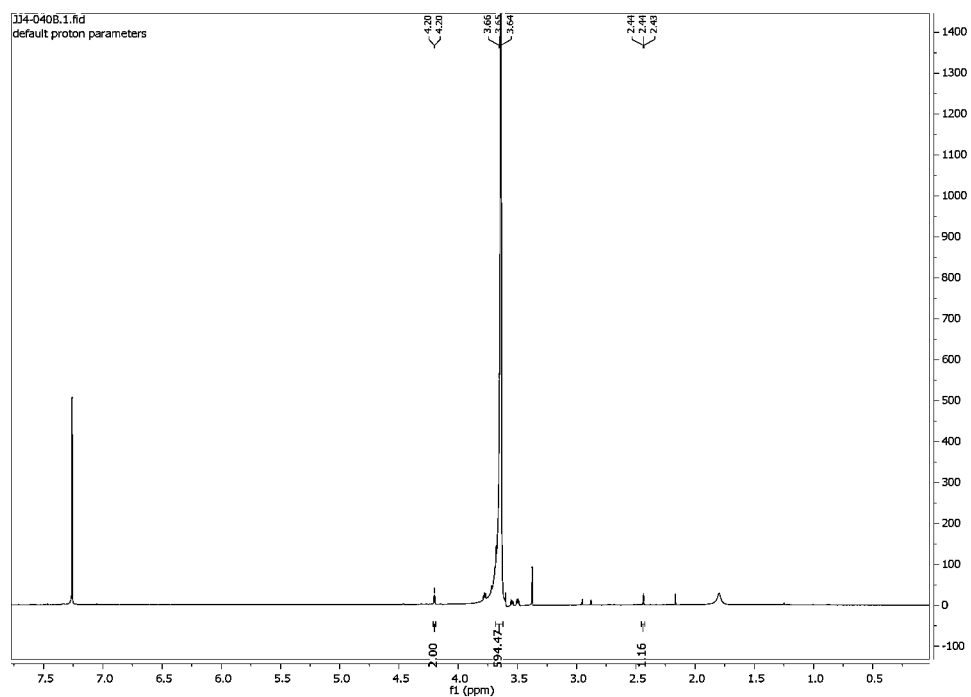
FIG. 4 shows an NMR spectrum of an alkynyl PEG.
Figure 5:
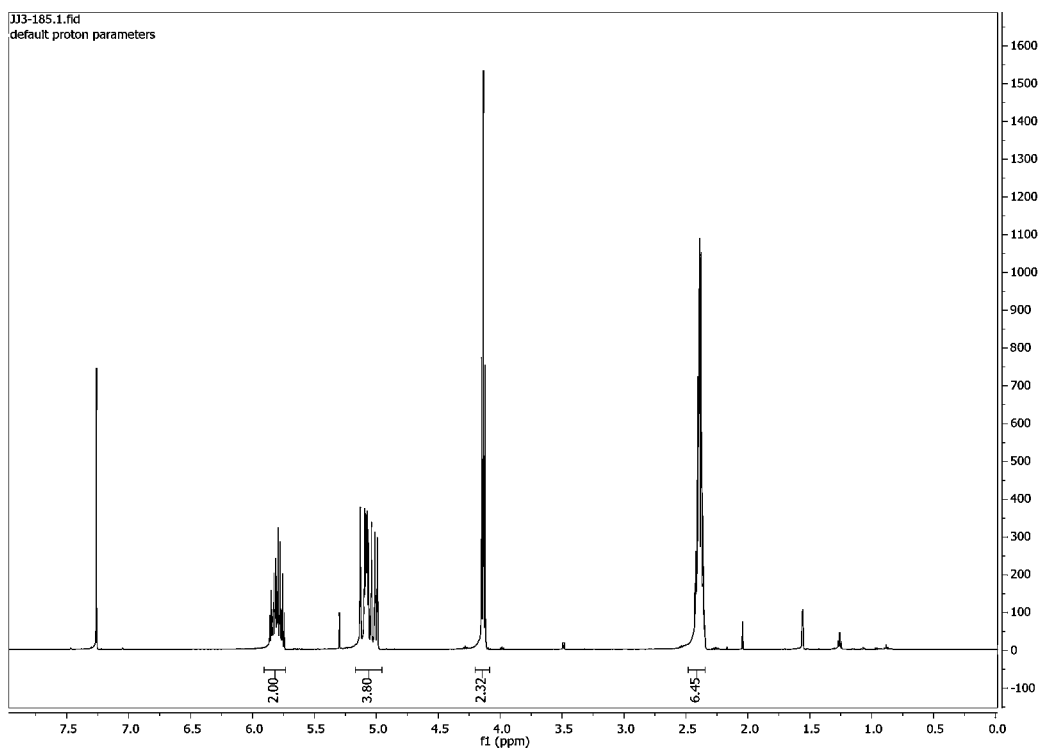
FIG. 5 shows an NMR spectrum of an ester diene.
Figure 6:
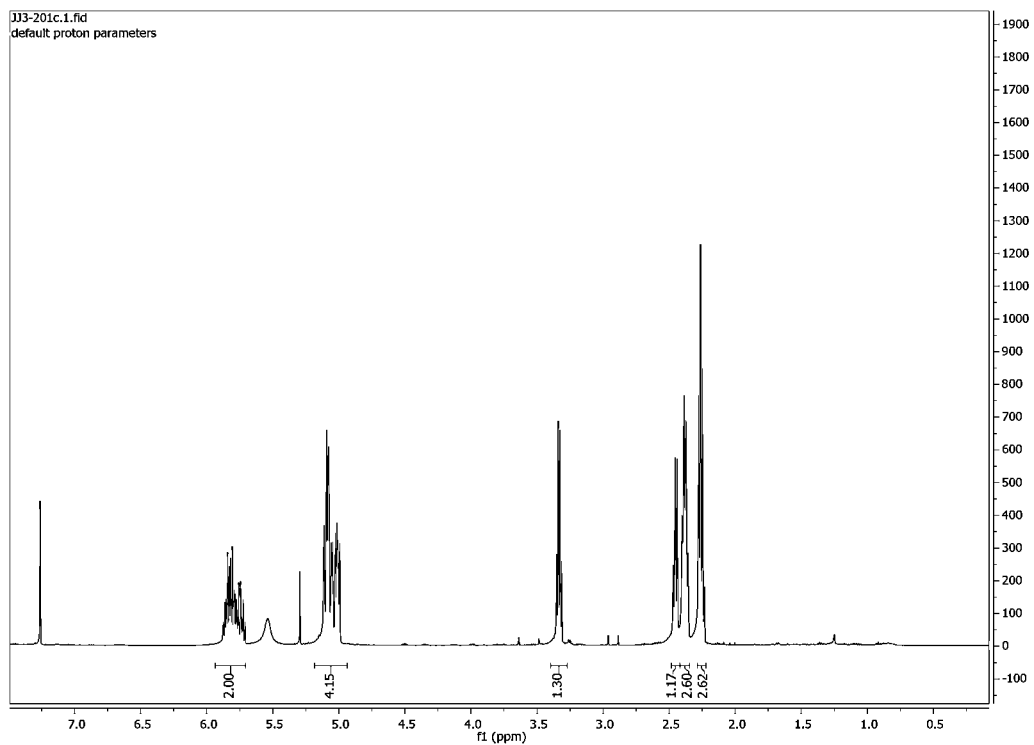
FIG. 6 shows an NMR spectrum of an amide diene.
Figure 7:
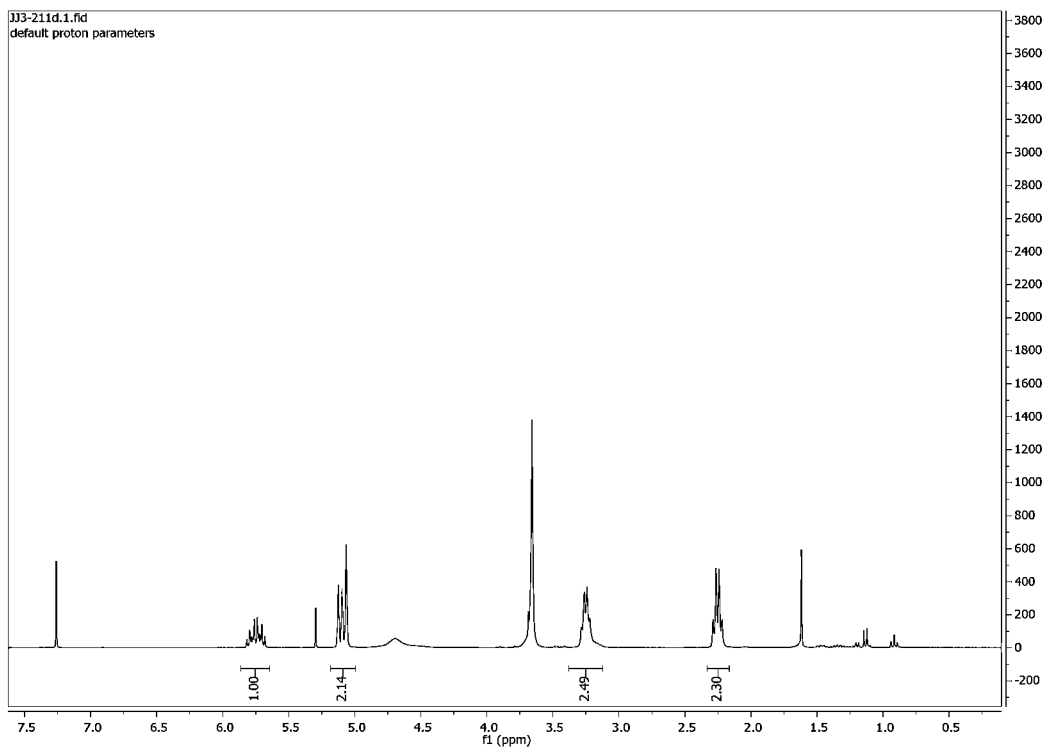
FIG. 7 shows an NMR spectrum of a urea diene.
Figure 8:
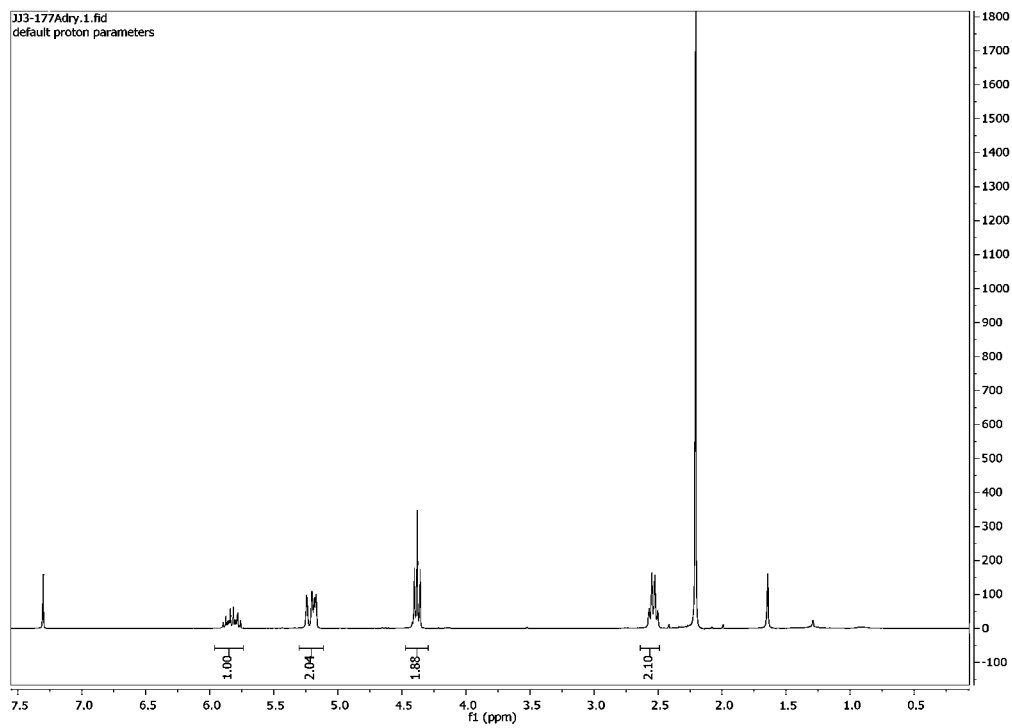
FIG. 8 shows an NMR spectrum of a carbonate diene.
Figure 9:
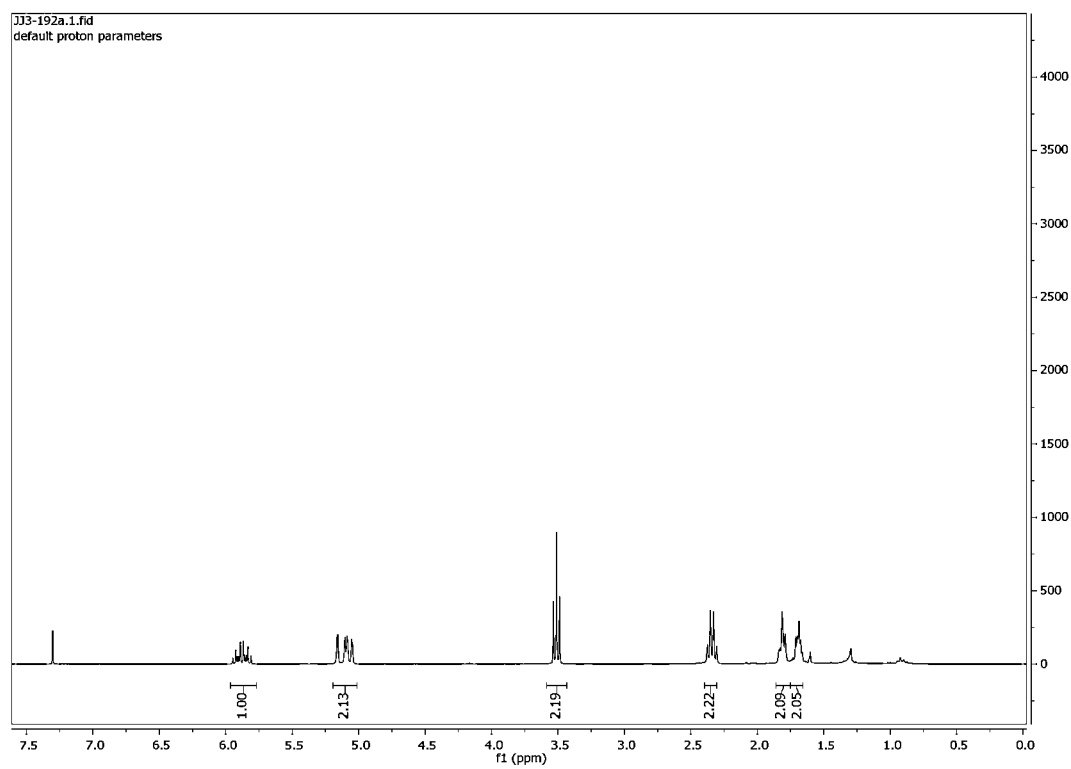
FIG. 9 shows an NMR spectrum of an acetal diene.
Figure 10A:
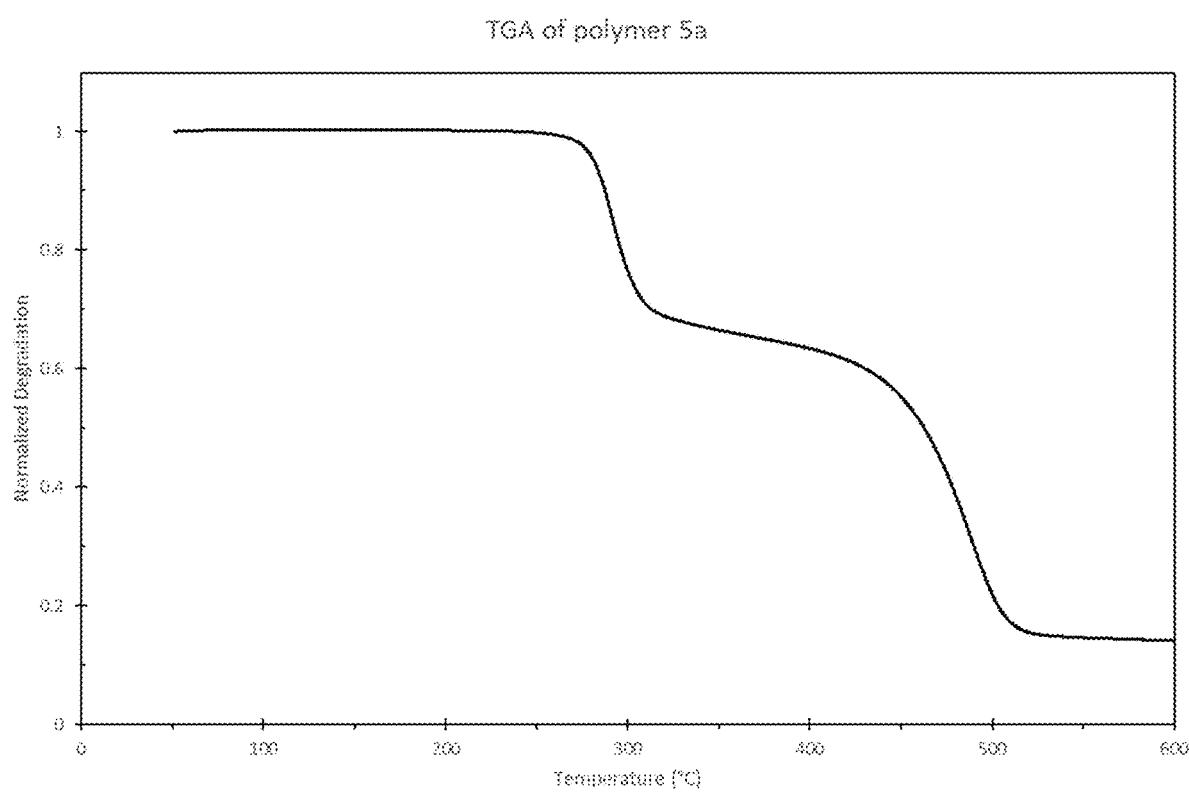
FIGS. 10A, 10B, and 10C show thermogravimetric analysis, NMR Spectrum, and GPC spectrum from polymer 5a, respectively.
Figure 10B:
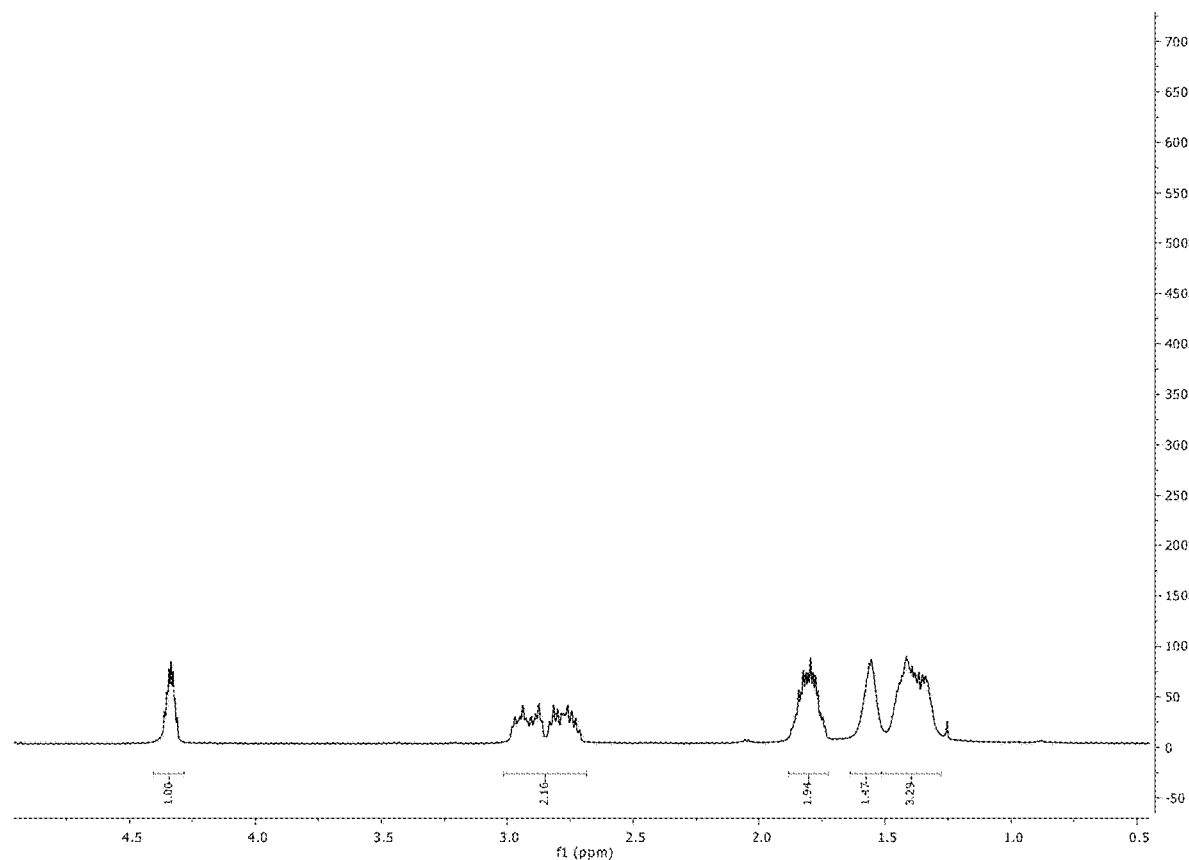
Figure 10C:
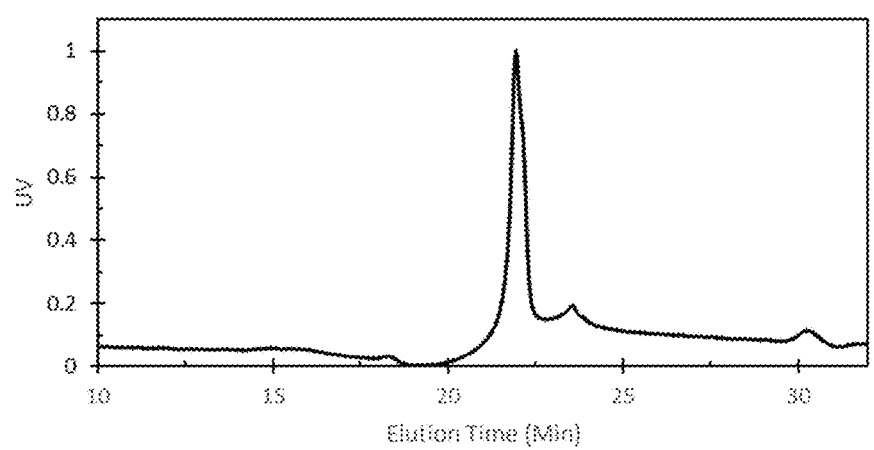
Figure 11:
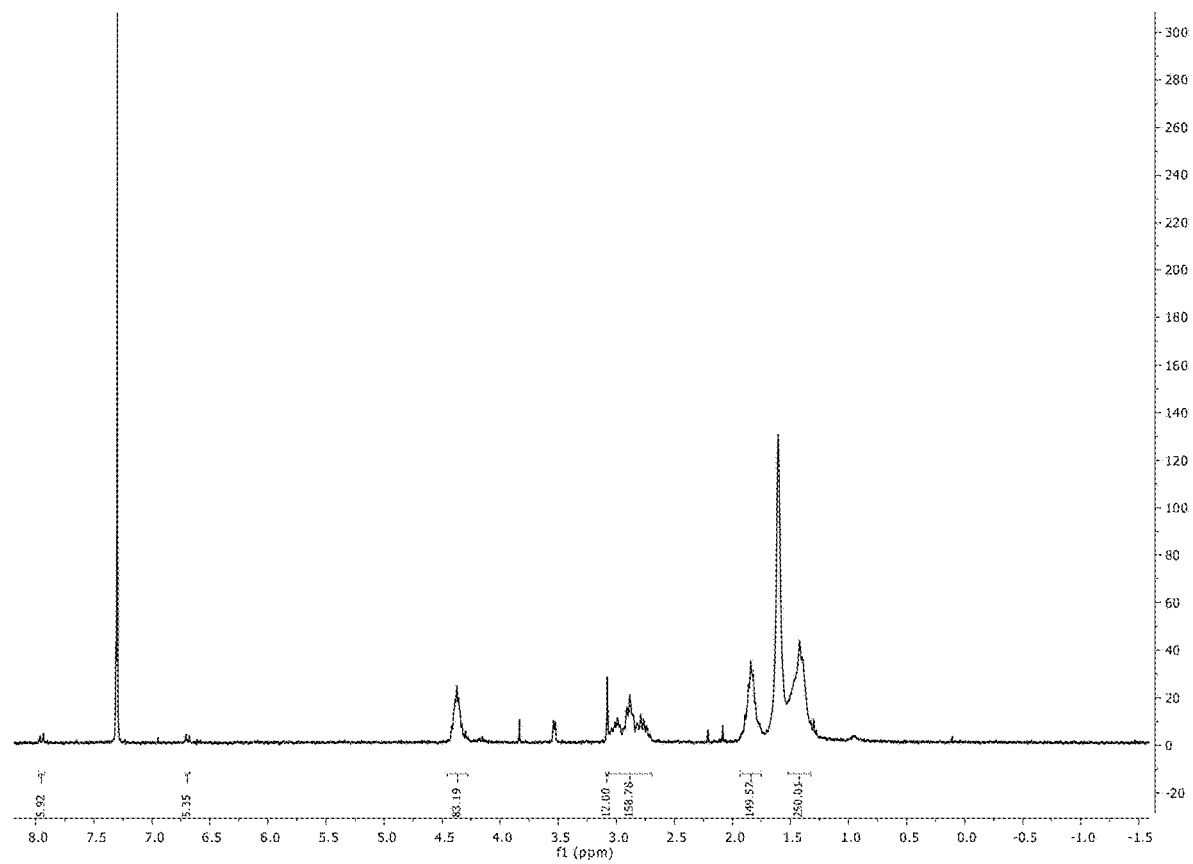
FIG. 11 shows an NMR spectrum of an end-capped polymer.
Figure 12A:
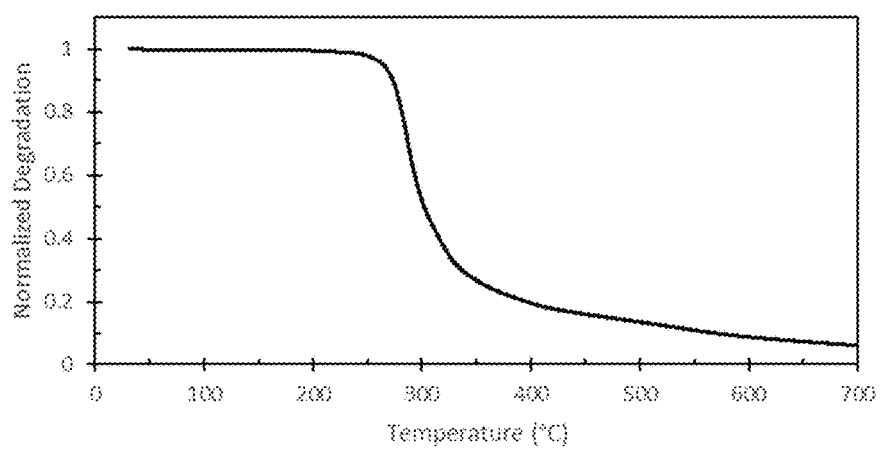
FIGS. 12A and 12B show thermogravimetric analysis trace and NMR spectrum for polymers 17a, respectively.
Figure 12B:
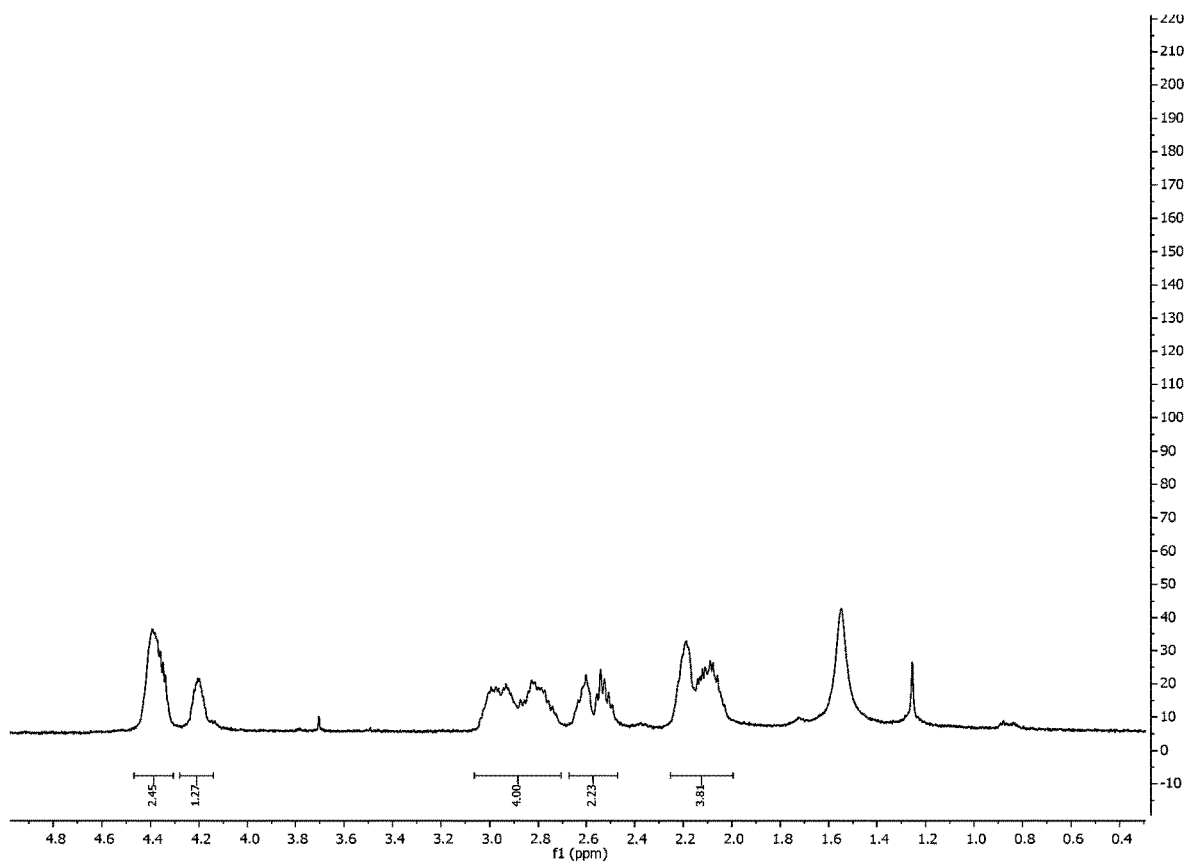
Figure 20A:
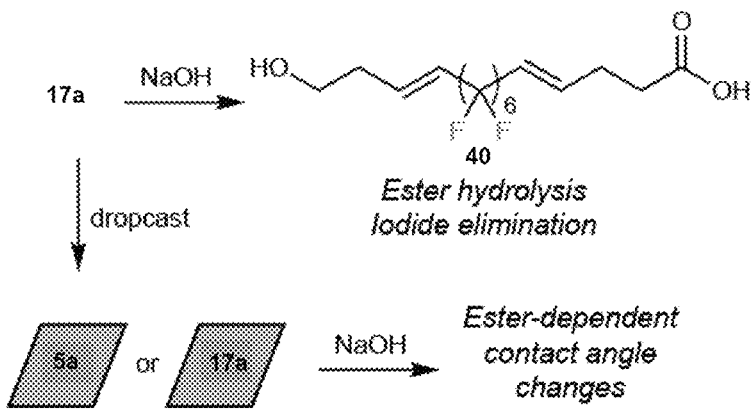
FIG. 20A shows the hydrolysis of ester-containing polymer with sodium hydroxide which proceeds in solution as confirmed by GPC (not depicted) and thin films as confirmed by contact angle. This is further described in Example 21.
Figure 20B:
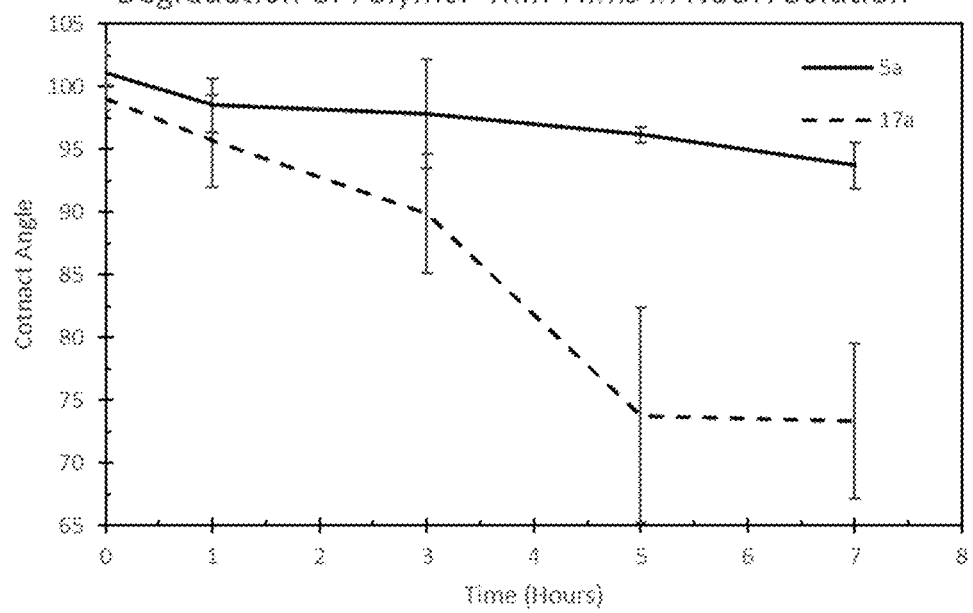
FIG. 20B shows contact angle measurements of slides containing films of polymers 5a and 17a treated in aqueous sodium hydroxide over time.
Figure 21A:
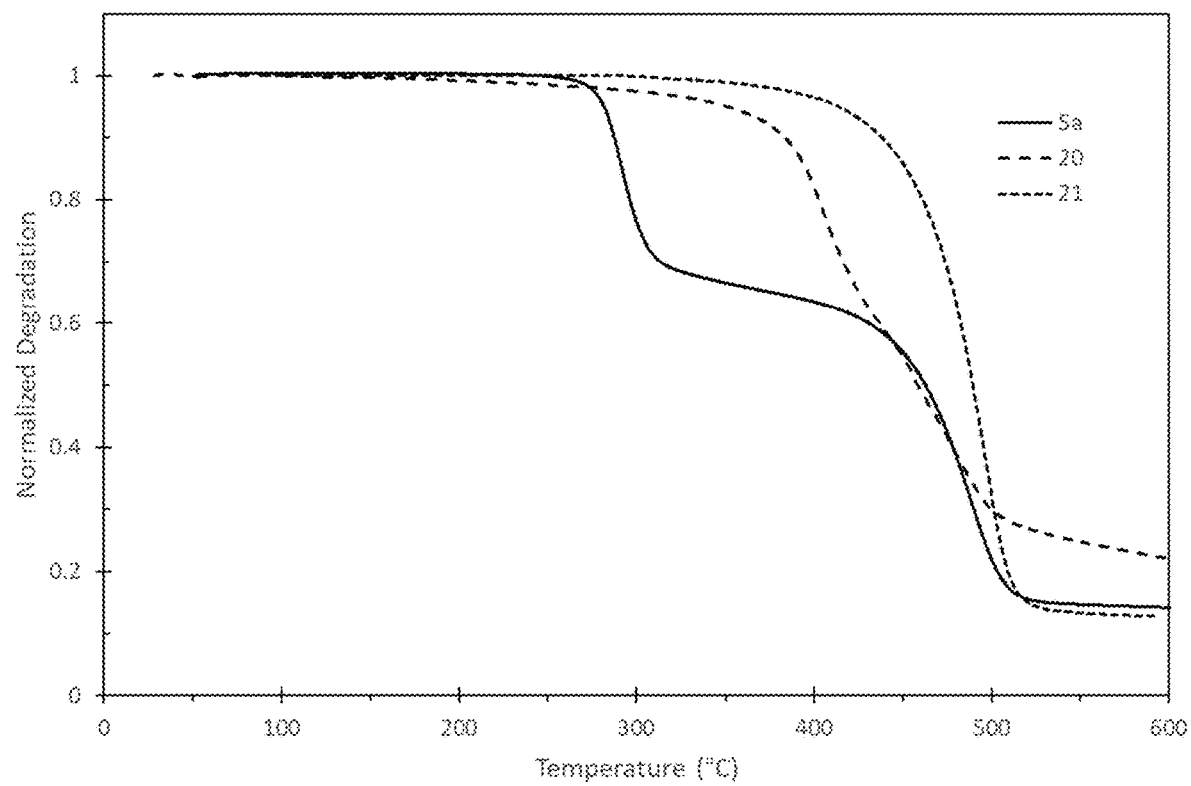
FIG. 21A shows TGA data for polymers 5a, 20, and 21.

Ester-containing semifluorinated polymer 17a is of particular interest as it can undergo degradation fluorous alcohols which contains only $C_6F_{12}$ units that do not bioaccumulate. 17a degraded under basic conditions in solution and on surfaces (FIG. 4C). After 5 hours in basic conditions, ester-containing polymer 17a had significantly smaller $M_n$, and the contact angle of surfaces coated with 17a had decreased indicating the presence of polar carboxylic acids (FIGS. 20A & 20B). In contrast, semifluorinated polymer 5a only showed minor changes in size (and contact angle, consistent with elimination of iodide but not scission of the polymer backbone (FIG. 21D).

TABLE 3

Further Exemplary Polymer Characteristics

| Polymer | $M_n$ (kDa) | $M_w$ (kDa) | Đ |
| --- | --- | --- | --- |
| 16b | 30.4 | 66.2 | 2.18 |
| 17a | 326 | 913 | 2.80 |
| 18a | 132 | 368 | 2.80 |
| 19a | 32.8 | 81.8 | 2.49 |

Figure 21B:
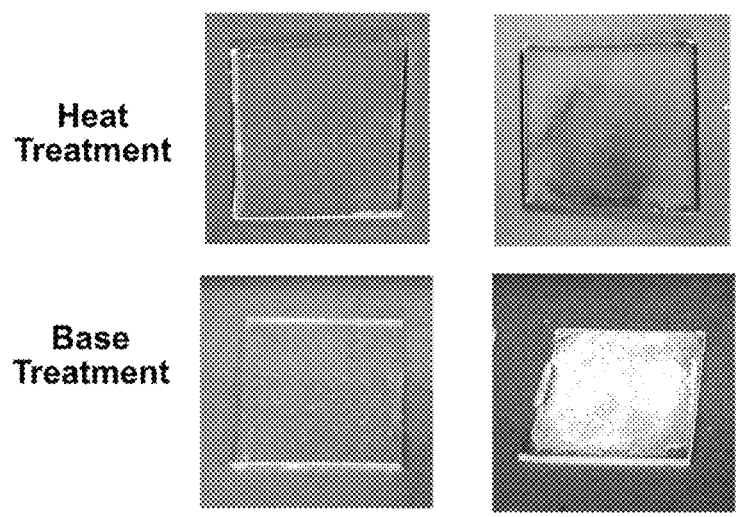
FIG. 21B shows the preparation of stable films of iodo-ene fluoropolymers. First a 5 mg/mL solution of 5a was prepared in THF and dropcast onto films. The films were then treated with DBU or heat to eliminate the iodine and yield more thermally stable fluoropolymers.

Iodide elimination represents another avenue for increasing the wt % fluorine as well as the thermal stability of the semifluorinated polymers. Quantitative elimination of iodide could be obtained by treatment with 1,8-diazabicyclo[5.4.0]undec-7-ene (DBU). The properties of the eliminated polymer 20 and reduced polymer 21 were compared to the initial iodo-ene product 5a. Surprisingly, the contact angles did not undergo significant change in the eliminated product, but were significantly increased in the reduced product. Both polymers 20 and 21 displayed superior thermal stability when compared to iodine-containing polymer 5a. Thermal gravimetric analysis (TGA) reveals 5a undergoes degradation at 300° C., with percent weight loss suggesting complete loss of iodine in the polymer. Contrastingly, the semifluorinated polymers without iodine display excellent thermal stability (FIG. 21B), rivaling that of PTFE. The chemical stability of polymers 20 and 21 are also excellent, showing no loss of fluorine upon treatment with acid, base, amine, or thiol.

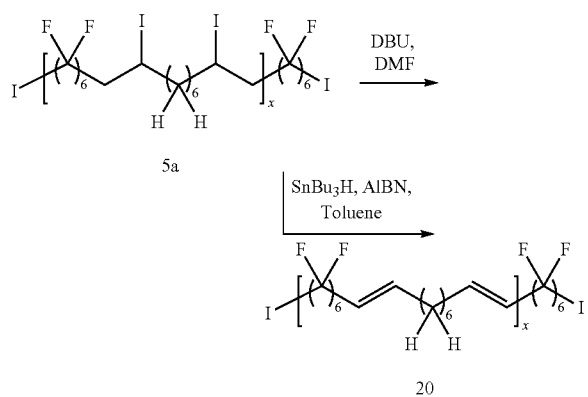

-continued

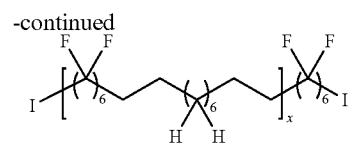

21

Figure 21C:
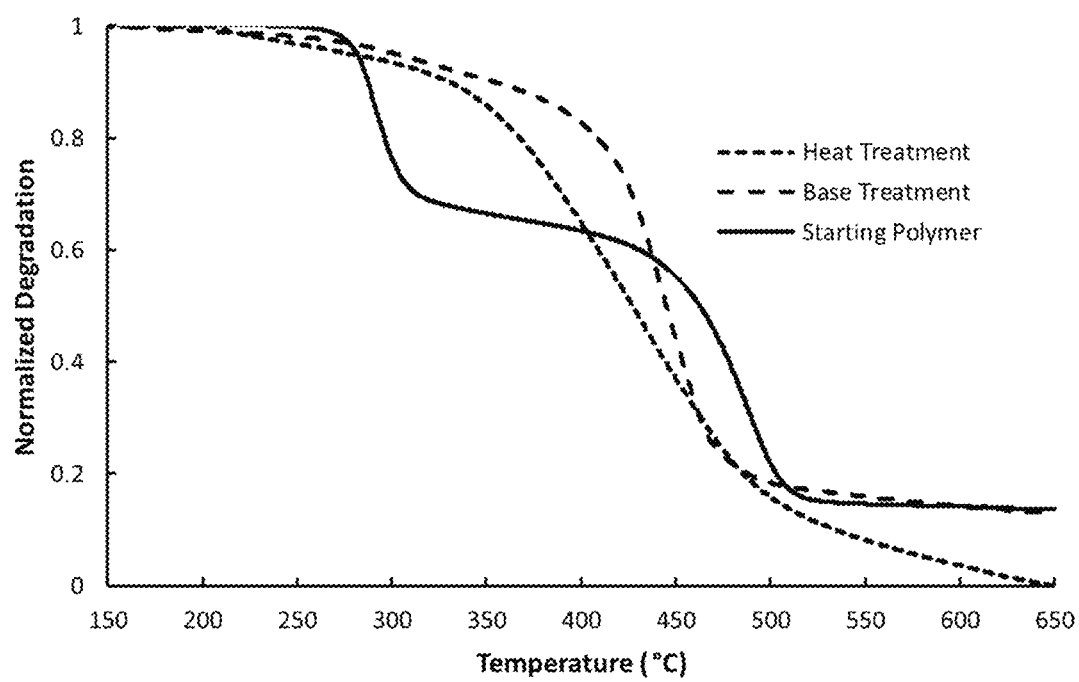
FIG. 21C shows the TGA spectra of 5a compared to the polymer treated on films with base or heat.

While the fluorous content and stability of the semifluorinated polymers 20 and 21 are desirable, a decrease in processability is observed when iodine is removed. Processability has been a major limitation of fluoropolymers, with sintering and machining powder being the primary methods employed for production of PTFE-containing materials. If traditional solution and melt processing methods employed for thermoplastics could be used for fluoropolymers, the unique properties of fluoropolymers could be extended to previously prohibited applications. Since the iodine is facile to remove via heat or base, 5a may be processed with the iodine present in the backbone followed by removing the iodine on the surface or mold. Toward this end, thin films of 5a were subject to heating or base to remove the iodine (FIG. 21C). After treatment, removal of the film and TGA analysis showed improved thermal stability (FIG. 21D). These curing methods could also be translated to bulk materials.

Figure 22A:
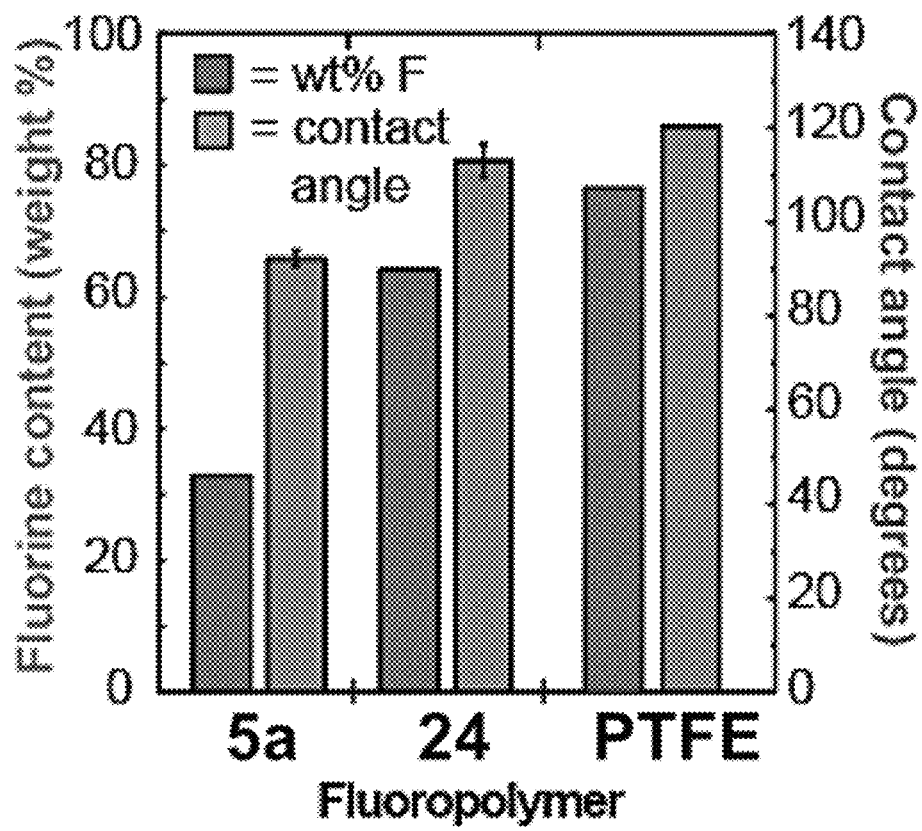
FIG. 22A shows Contact angle measurements of polymer 24 in comparison to 5a and PTFE. Thin films of 24 were prepared by dropcasting a 5 mg/mL polymer solutions in THF onto a slide and annealed at 80° C. Contact angle measurements were obtained through the same method described in FIG. 19.
Figure 22B:
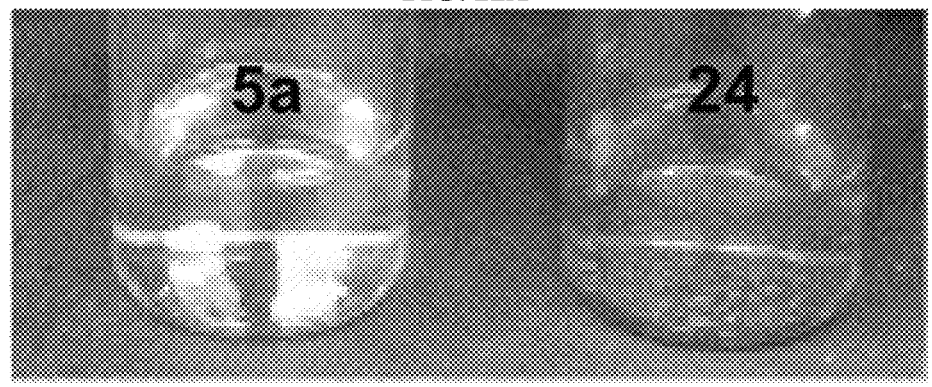

The iodine atoms incorporated into the backbone of the iodo-ene polymers are an exciting handle for the creation of processable fluoropolymers. However, the iodine atoms also offer avenues to create more fluorous polymers and add chemical functionality for post-polymerization functionalization, covalent modification of surfaces, and crosslinking. The iodine can be efficiently displaced with 1H,1I-1,2H,2H-perfluorodecanethiol (22) and thioacetate (23) to give polymers 24 and 25. The addition of the fluorous thiol yielded a polymer (24) with a contact angle similar to PTFE, but having superior processability (FIG. 22A). Fluorinated polymer 20 was much more soluble in fluorous solvent than 7 (FIG. 22B) and has a lower glass transition temperature (90° C.), facilitating solution and melt processing. The TGA data indicate 24 is stable to 230° C. degrees, which is lower than 20, 21, and PTFE.

The iodine atoms could also be efficiently displaced with thioacetate to yield 25. Removal of the acetate groups yielded thiol containing polymer 26, that could under-go Michael addition with acrylic acid to produce 30 or oxidation to give crosslinked network 27. Crosslinked polymer 23 represents a redox-active material, providing opportunities for smart, responsive, dynamic fluorous materials. Irreversibly crosslinked materials could also be prepared by treatment of 5a with ethanedithiol or photocrosslinking via thiol-ene chemistry with 1,9-decadiene (9) to give polymers 28 and 29, respectively. Permanently crosslinked fluorous materials are advantageous for reducing creep and have previously been difficult to obtain. All polymer crosslinks were confirmed by TGA and IR.

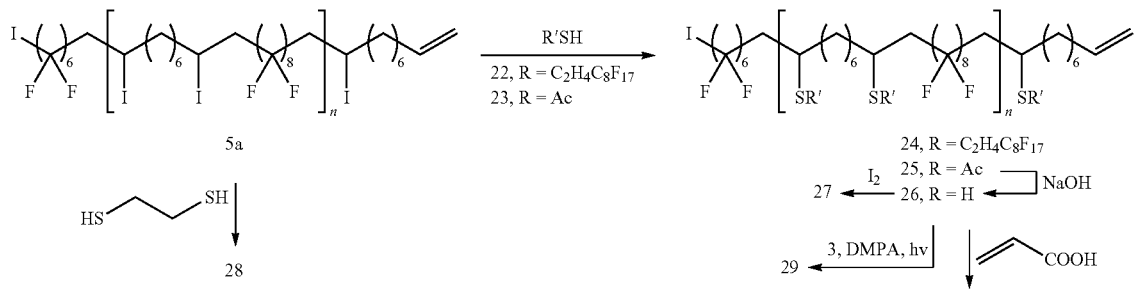

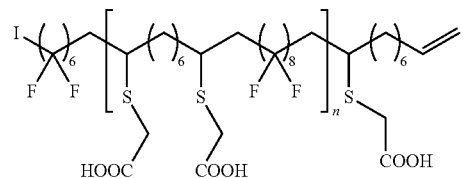

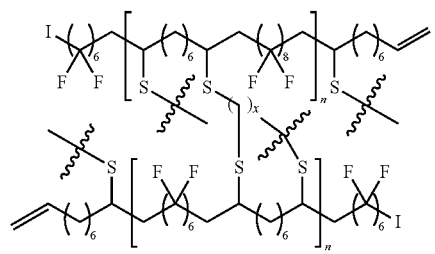

Figure 23A:
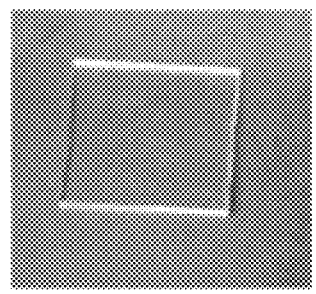
FIG. 23A shows the dropcast thin-films of 5a before and after treatment with strained cyclooctyne. Films were prepared by dropcasting 5 mg/mL polymer solutions in THF and then annealed at 80° C. Films of 5a were placed in a 0.6 mg/mL solution of strained cyclooctyne in methanol for 14 hours. Films were then sequentially washed with water and MeOH to remove excess cyclooctyne and then placed under 365 nm light.
Figure 23A:
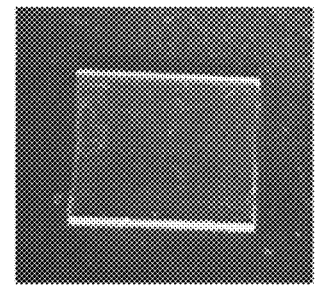
Figure 23A:
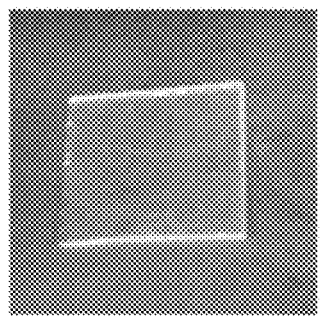
Figure 23A:
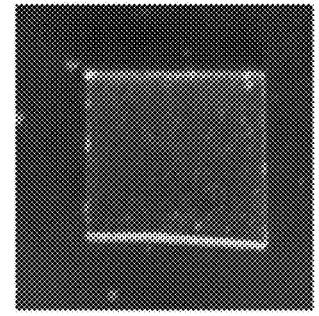
Figure 23B:
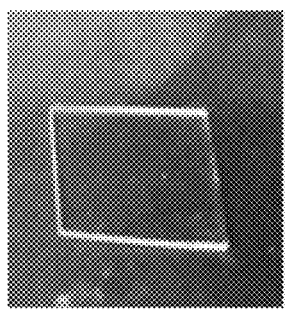
FIG. 23B shows the dropcast thin-films 31 before and after treatment with strained cyclooctyne. Films were prepared by dropcasting 5 mg/mL polymer solutions in THF and then annealed at 80° C. Films of 31 were placed in a 0.6 mg/mL solution of strained cyclooctyne in methanol for 14 hours. Films were then sequentially washed with water and MeOH to remove excess cyclooctyne and then placed under 365 nm light.
Figure 23B:
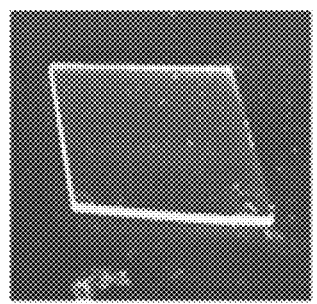
Figure 23B:
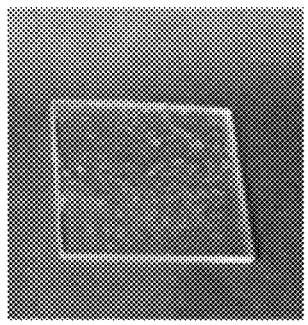
Figure 23B:
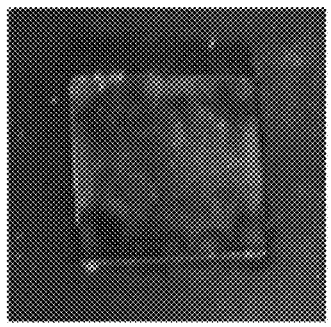

Thiols are not the only nucleophile that can displace the iodine atoms on the polymer backbone. Azide groups can also be appended to the fluoropolymers. In this instance, competing elimination was also observed. The azide incorporation allowed for crosslinking of the polymers via Cu-catalyzed azide alkyne cycloaddition. The azide also represents an opportunity to covalently conjugate to surfaces coated with the semifluorinated polymers, as demonstrated through the attachment of monofluorinated cyclooctyne to films of 31 to yield fluorescent polymer 33 (FIGS. 23A & B). Exemplary tags include rhodamine, fluorescein, polymethine dyes, small molecule drugs, biomolecule tags and biomolecules.

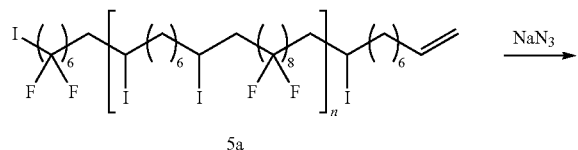 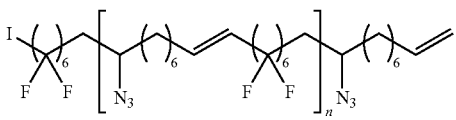

-continued

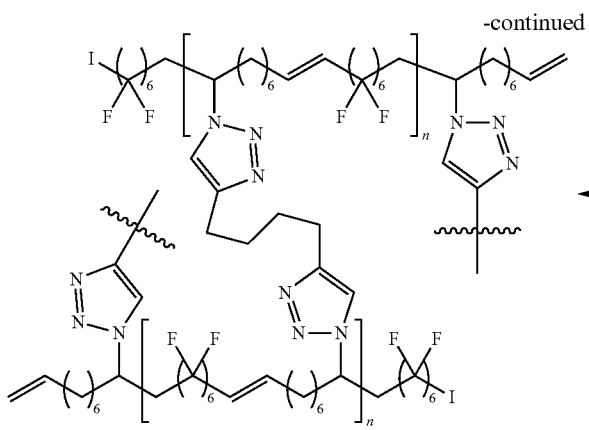

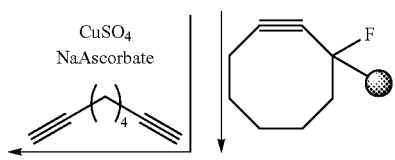

32

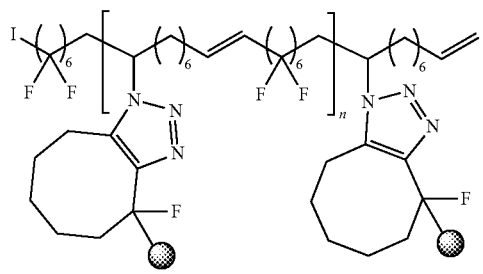

33

Allyl groups were installed on the polymer backbone by treatment of 5a with AIBN and allyl ethyl sulfone to give 30. This is a unique post-polymerization modification, which opens many avenues for further modification and crosslinking. Through thiol-ene modification of 34 with 1H,1H,2H,2H-perfluorodecanethiol 35 was prepared, which like polymer 24, contains high wt % fluorine.

In an effort to photo cross-link the allyl containing polymer 34, thin-films were developed with polymer 5a as a control. Thin-films were irradiated under 365 nm light, with or without the photo-initiator DMPA. Surprisingly, no change was noticeable in polymer 34, but there was a significant difference in polymer 5a. To further explore these changes, a 20 mg/mL sample of polymer 5a was prepared

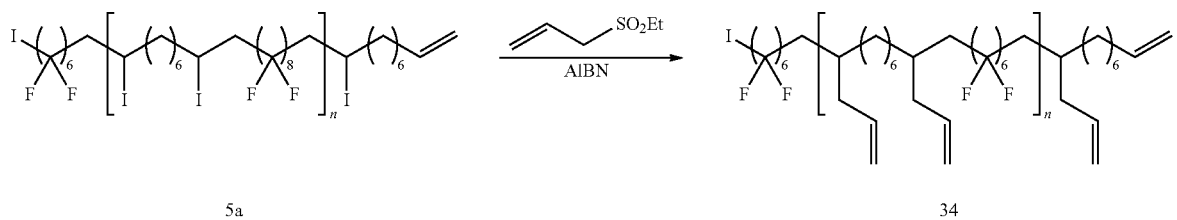

5a    34

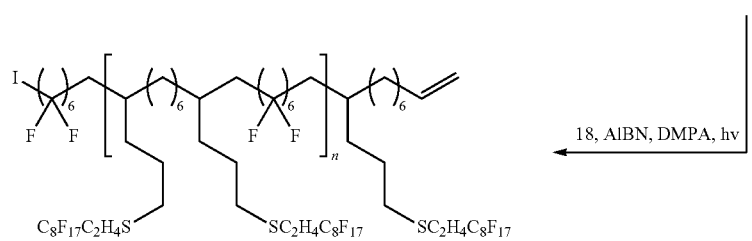

Figure 24A:
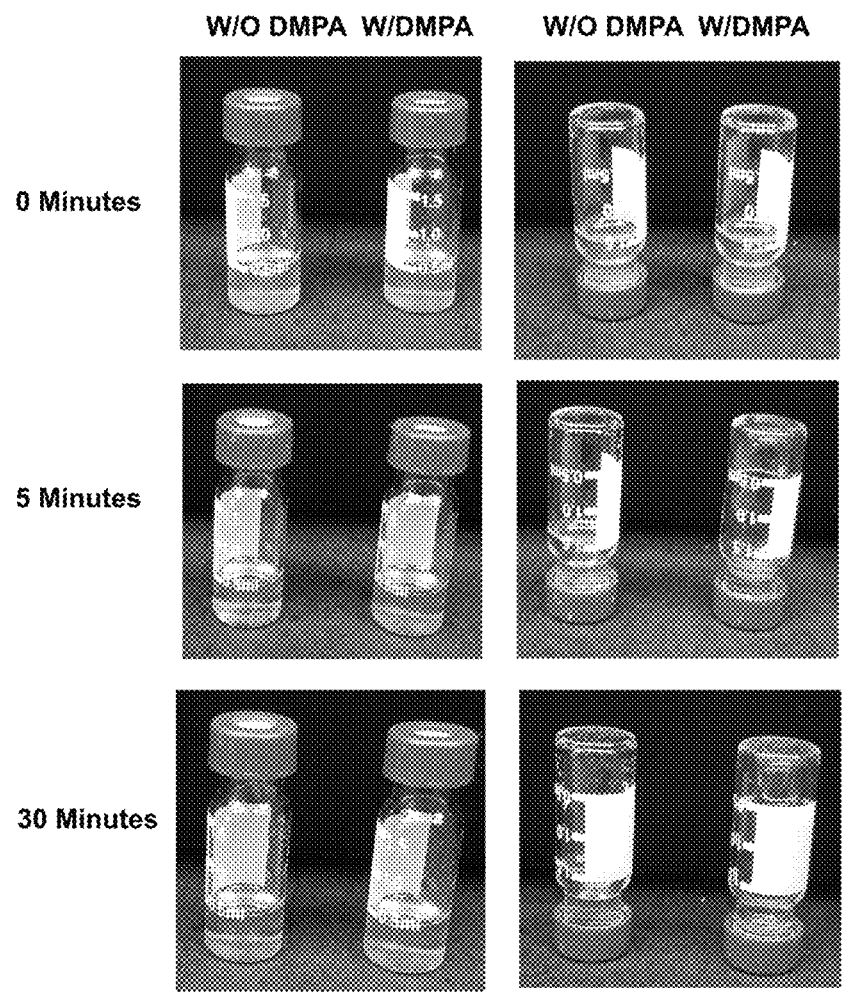
FIG. 24A shows the gelation of 13 in the presence of DMPA. Two solutions of 13 in THF (20 mg/mL) were prepared, 10% DMPA was added to one solution. Both solutions were irradiated with 365 nm light for 5 min. Pictures were taken before and after irradiation.

35 with 10 wt % DMPA. Vials were placed under a UV lamp and gelation began within 5 minutes of photoexcitation. After 30 minutes had passed, no gelation was evident in the DMPA-free control. This gelation was also noticeable in toluene (FIG. 24A).

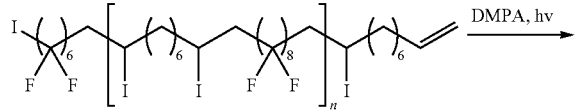

5a

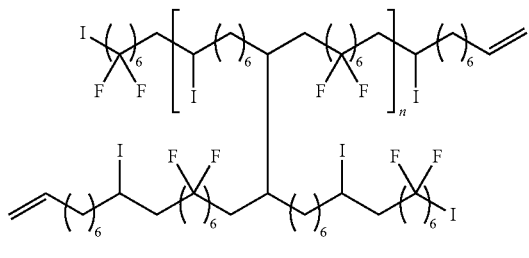

36

To determine the cause of gelation, small molecule 37 was synthesized and submitted to analogous conditions with or without DMPA and light. $^1$H and $^{19}$F NMR supported that the reaction proceeded to complete loss of iodine in 10 minutes with 2 equiv. DMPA. HRGC-MS provided evidence of dimerization, while $^{13}$C-NMR indicated that a new methine group was present. Through these data, it was hypothesized that gelation was caused by the creation of cyclobutane crosslinks. However, further investigation revealed that the crosslinks were formed through removal of iodine and crosslinking through radical coupling. The $^1$H-NMR suggests a mixture of diastereomers of 35 with trace amounts of eliminated iodine product, 38. To probe if the eliminated product was a productive intermediate toward gelation/crosslinking, compound 39 was prepared and subjected to identical conditions. No product was observed, leading indicating that the eliminated product is not along the productive crosslinking pathway. Further controls demonstrated that the reaction was not oxygen dependent.

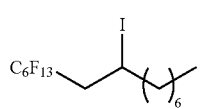

37

DMPA
hv ↓

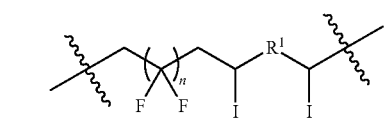

39, major          38, minor

└──────── X ────────┘

DMPA, hv

Figure 24B:
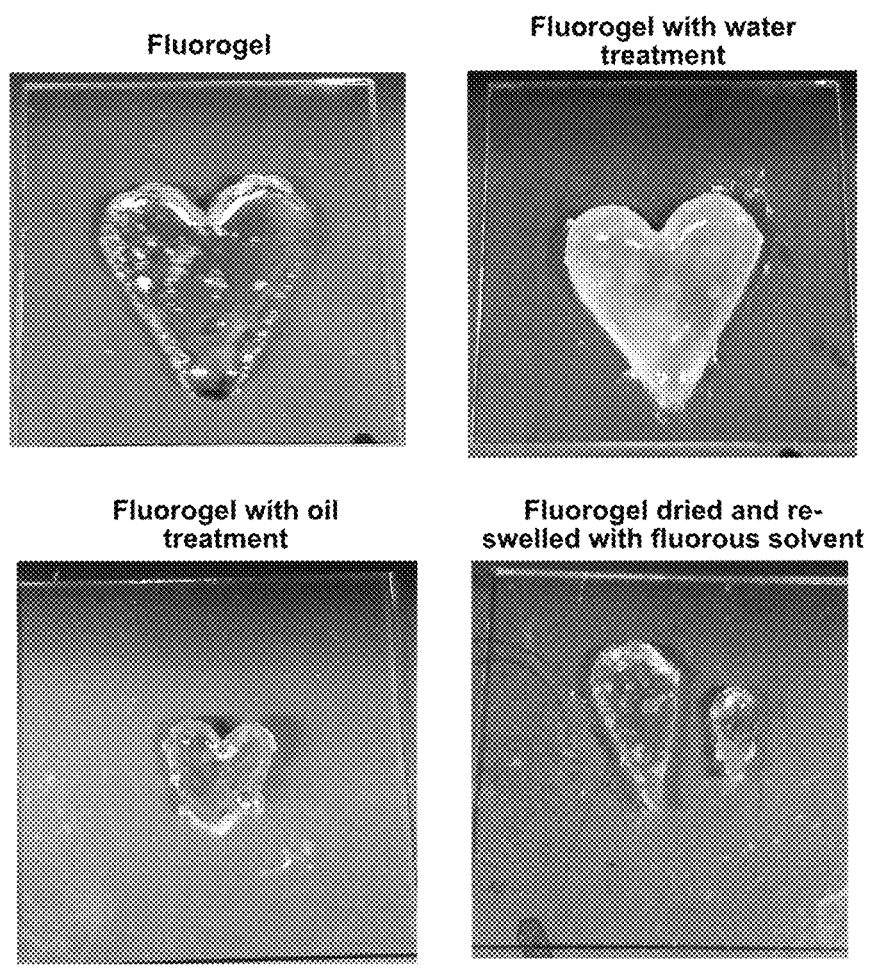
FIG. 24B shows the molding and photo-curing of polymer 13a into a heart. A solution of compound 13 (100 mg/mL) and DMPA (10%) was placed in a heart mold and irradiated with 365 nm light for 5 min. The resulting gel was removed from the mold, treated with boiling water and 105° C. mineral oil without loss of the heart shape.

The direct photocrosslinking of the iodo-ene polymers allow opportunities to fabricate organo and fluorogels. A 100 mg/mL solution of 5a in toluene was placed into a heart mold. After 5 minutes of irradiation, the crosslinked gel was removed from the mold and retained its heart shape (FIG. 24B). The gel withstood hot mineral oil and boiling water without loss of the heart shape, although it became smaller in mineral oil due to leaching of the toluene. The mineral oil treated gel could be readily re-swollen in toluene. The gel can also be swollen with fluorinated solvents such as trifluorotoluene and methoxyperfluorobutane to produce fluorogels. TGA analysis of the dried gel indicate 98.5% iodine remaining, suggesting a crosslink density of 1.5%. As with surfaces containing 5a, the stability is much lower when the iodine atoms are present. The thermal stability of the gel was increased by treatment with DBU in toluene for 5 minutes. No loss of the gel shape was observed. Thus, it was possible to obtain bulk, thermally stable fluorous materials through a combined photo and chemical curing process.

In summary, the present disclosure provides a facile and mild polymerization of dienes and diiodoperfluoroalkanes that allow access to an array of fluorinated polymers. The fluorous nature of the polymer can be easily tuned through strategic selection of monomers and post-polymerization modifications. The size of the fluoropolymers can also be controlled through use of an end-capping agent. Iodine incorporation along the polymer backbone gives an exquisite handle for modification, shown through addition of azides, thiols, and allyl groups, which further provide access to click chemistry. Furthermore, the polymers can be processed into thin-films and treated with heat or base to increase the thermal stability. These fluoropolymers can be directly photocrosslinked through the use of a photo-initiator to yield organo or fluorogels. Overall, this new polymerization method provides easy access to fluorinated polymers through safe and commercially available starting materials with excellent ability for modification and tuneability.

The polymerization techniques disclosed herein allow the preparation of a new class of functionalized, linear fluoropolymers. These new fluoropolymers are predicted to be soluble in organic solvents whilst retaining appealing physical properties. These polymers can be prepared in a safe and scalable manner.

In certain aspects, the present disclosure provides polymers comprising repeat units according to formula I, Ia, Ib, Ic, Id, Ie, If, or Ig:

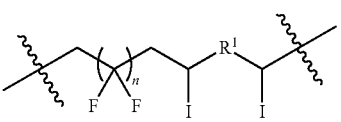

(I)

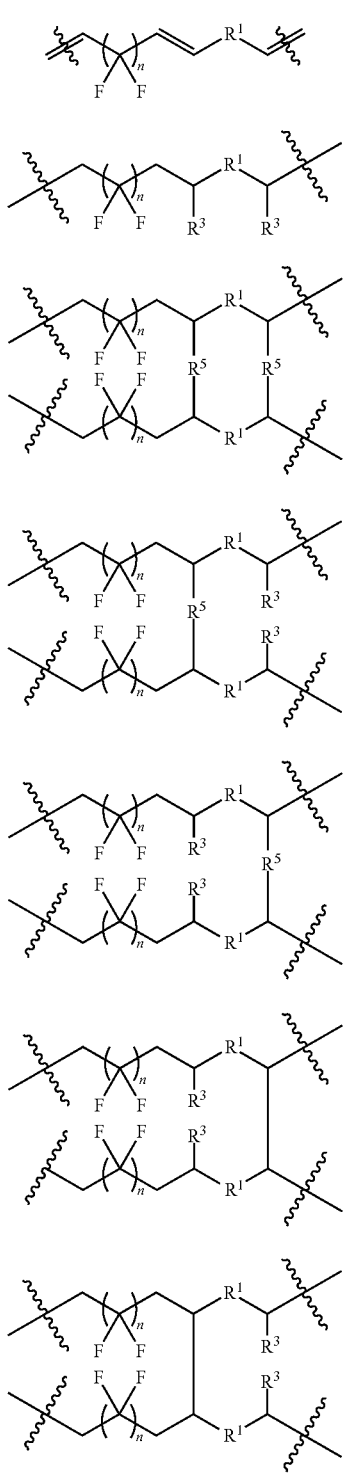

(Ia)
(Ib)
(Ic)
(Id)
(Ie)
(If)
(Ig)

wherein:
each $R^1$ and $R^5$ is independently a divalent linker;
$R^3$ is H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron; and
n is an integer from 1-100, such as 1-50, 1-25, 1-10, or 6.

In certain embodiments, the polymer comprises 1-5000 of the repeat unit, such as 1-2000, 1-1000 or 1-500. In certain preferred embodiments, the polymer comprises at least 15 of the repeat unit, such as at least 50. In certain such embodiments, the polymer comprises 15-5000 of the repeat unit, such as 15-2000, 15-1000, 15-500, 50-5000, 50-2000, or 50-500.

In certain embodiments of formula Ic, Id, and Ie, $R^5$ is an alkylene, such as a perfluoroalkylene, an ester, a carbonate, an ether, an acetal, a urea, an arylene, a heteroarylene, a thioether, a sulfoxide, a sulfone, a selenide, a phosphodiester, a boronic ester, a silyl, a siloxane, a diazo, an orthoester, a carbonyl, a disulfide, or an enol ester. In certain embodiments, $R^5$ is an alkylene, a perfluoroalkylene, a disulphide, or a thioether. In certain embodiments, $R^5$ is an alkylene, such as a perfluoroalkylene. In certain embodiments, $R^5$ is a disulphide or a thioether, such as dithioethane or dithiodecane. In certain embodiments, $R^5$ has the structure of:

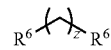

wherein,
$R^6$ is an arylene or heteroarylene; and
z is 0-20.

In certain embodiments, $R^6$ is heteroarylene, such as triazolylene. In certain embodiments, z is 4.

In certain embodiments of the polymers described above, the polymer further comprises an end group according to formula II, IIa, or IIb:

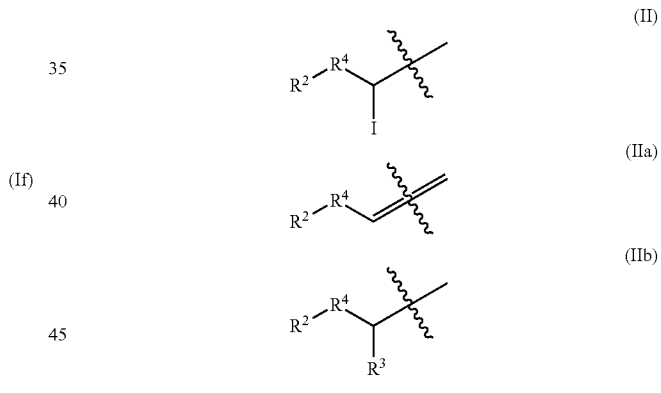

(II)
(IIa)
(IIb)

wherein:
$R^4$ is a divalent linker; and
$R^2$ is H, alkyl, alkenyl, alkynyl, aryl, heteroaryl, ester, acyloxy, alkoxy, alkylthio, disulfide, OH, SH, SeH, CN, amino, carboxy, thioester, amide, azide, phosphine, halogen, nitro, carbonyl, silyl, or boron.

In certain preferred embodiments of formula II, IIa, or IIb, $R^1$ is the same as $R^4$. In other embodiments, $R^1$ is not the same as $R^4$.

In certain embodiments of formula II, IIa, or IIb, $R^2$ is alkenyl, such as vinyl. In other embodiments, $R^2$ is halo, such as iodo. In certain embodiments, $R^2$ is:

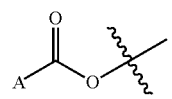

wherein A is an aryl or heteroaryl, such as phenyl, dimethylaminophenyl or azidomethylphenyl.

In certain embodiments of formula II, IIa, or IIb, $R^1$ comprises an alkylene, such as a perfluoroalkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester. In certain preferred embodiments, $R^1$ is an alkylene, such as a perfluoroalkylene. In certain further proffered embodiments, $R^1$ is selected from:

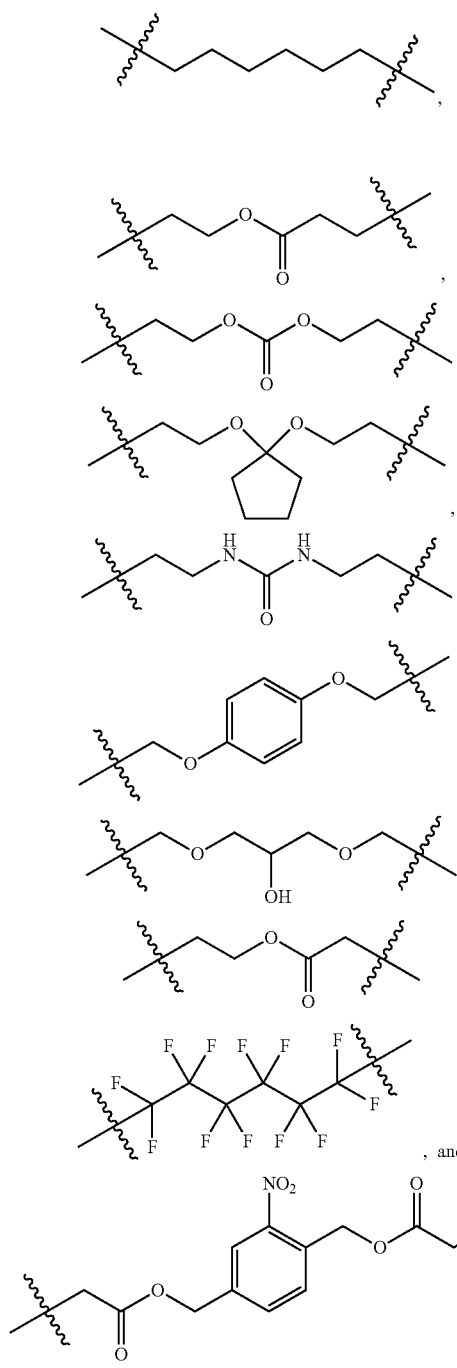

In certain even further preferred embodiments, $R^1$ is

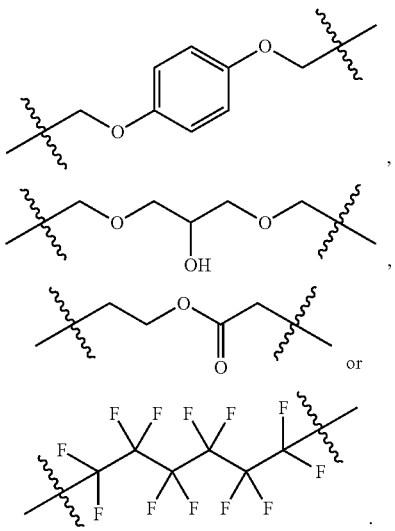

In certain embodiments of formula II, IIa, or IIb, $R^4$ comprises an alkylene, such as a perfluoroalkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester. In certain preferred embodiments, $R^4$ is an alkylene, such as a perfluoroalkylene. In certain further preferred embodiments, $R^4$ is selected from:

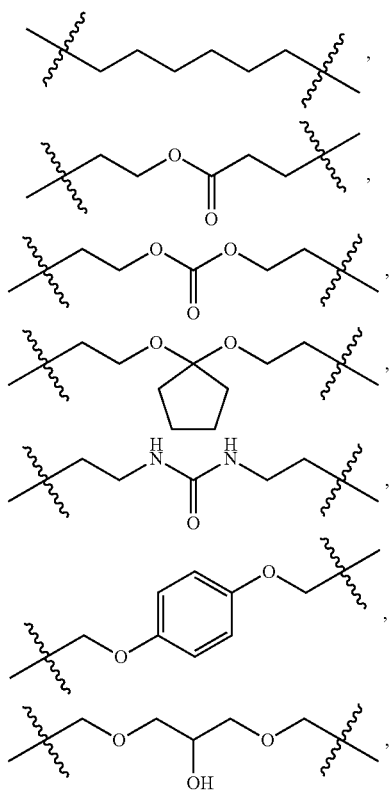

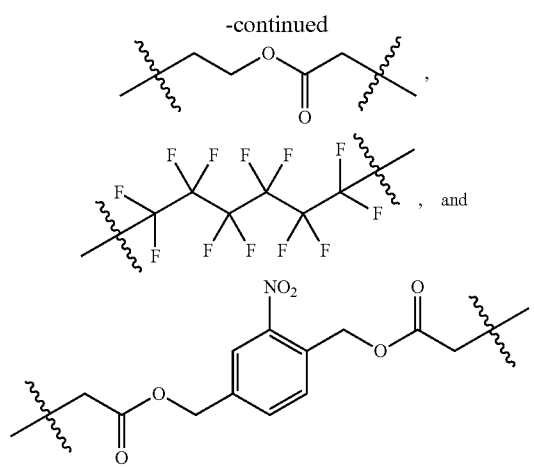

In certain even further preferred embodiments, R⁴ is selected from:

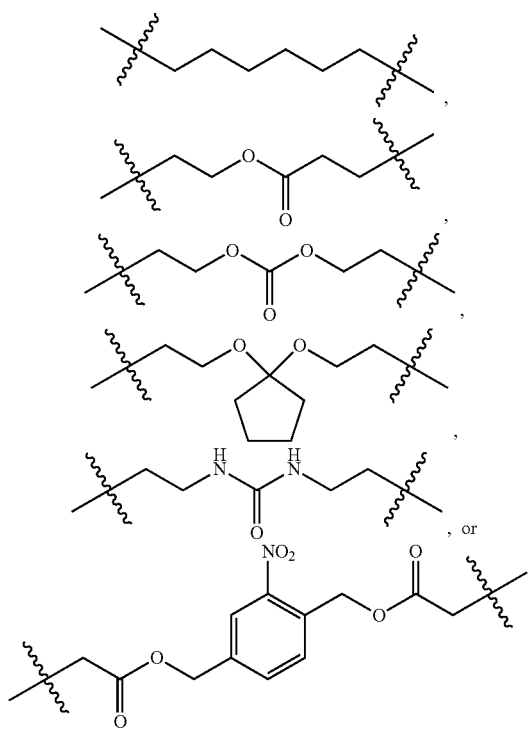

In certain embodiments of formula I, Ia, Ib, Ic, Id, Ie, If, or Ig, R³ is aryl, heteroaryl, heterocyclyl, cycloalkyl, alkylene, alkenyl, alkoxy, allyl, aryl, heteroaryl, alkylthio, OH, CN, amino, carboxy, ester, thioester, amide, or azide. In certain embodiments, R³ is perfluoroalkylenethioalkyl, such as

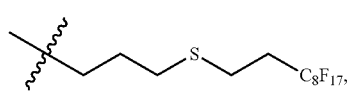

or alkenyl, such as allyl. In certain embodiments, R³ is heterocyclyl, such as fluorocyclooctatriazolyl. In certain embodiments, R³ is alkoxy, alkylthio, OH, CN, amino, carboxy, ester, thioester, amide, or azide. In certain embodiments, R³ is thioacetate or azide.

In certain embodiments of the polymers described above, the polymer is a compound according to formula III, IIIa, IIIb, IIIc, IIId, or IIIe:

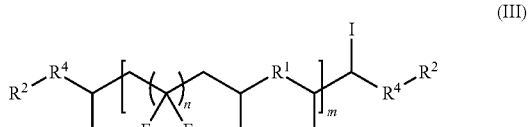

(III)

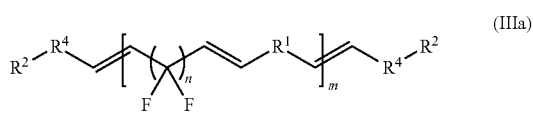

(IIIa)

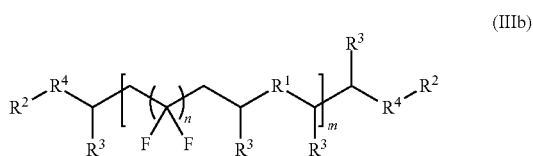

(IIIb)

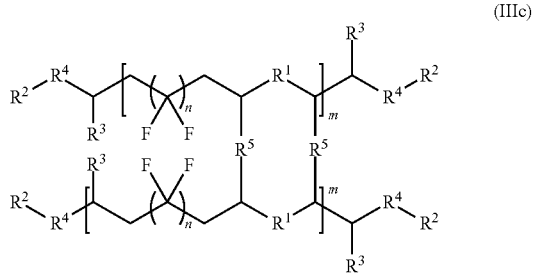

(IIIc)

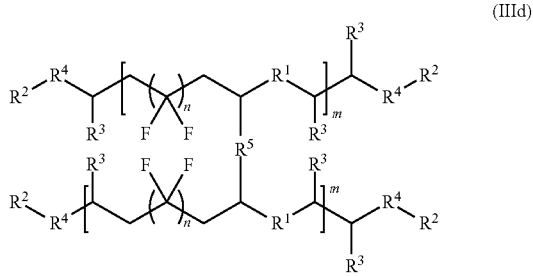

(IIId)

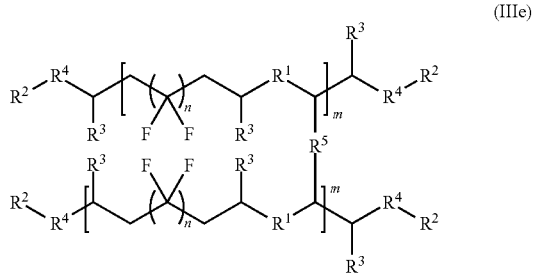

(IIIe)

wherein m is 1-5000, such as 1-2000, 1-1000 or 1-500. In certain embodiments (for example, certain embodiments of formula III), m is at least 15, such as at least 50. In certain embodiments, (for example, certain embodiments of formula III), m is 15-5000, 15-2000, 15-1000, 15-500, 50-5000, 50-2000, or 50-500.

In certain embodiments, the polymer is a compound according to formula IV:

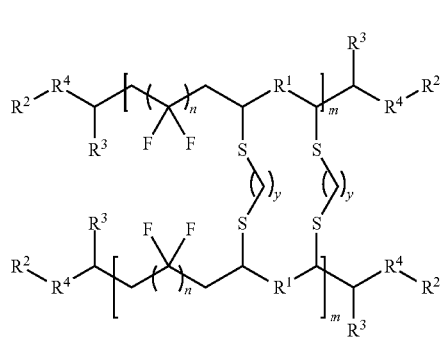

(IV)

wherein,
y is 0-20.

In certain preferred embodiments of formula IV, y is 0, 2 or 10.

In certain embodiments of formula I, Ia, Ib, Ic, Id, Ie, If, or Ig, the polymer is a compound according to formula Va, Vb, Vc, or Vd:

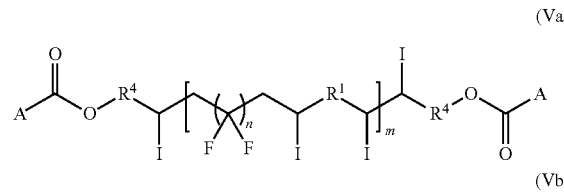

(Va)

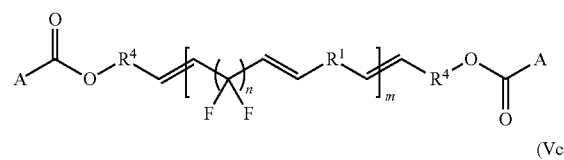

(Vb)

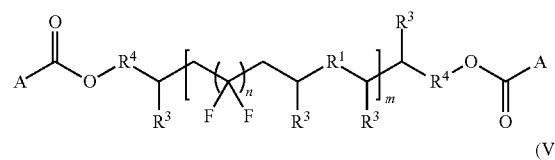

(Vc)

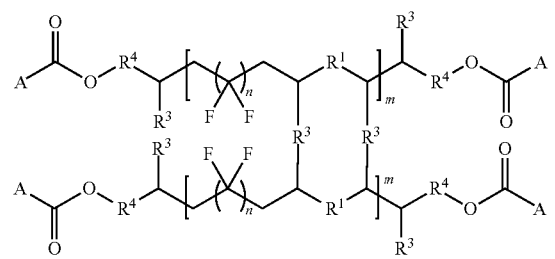

(Vd)

wherein m is 1-5000, such as 1-2000, 1-1000 or 1-500. In certain embodiments (for example, certain embodiments of formula III), m is at least 15, such as at least 50. In certain embodiments, (for example, certain embodiments of formula III), m is 15-5000, 15-2000, 15-1000, 15-500, 50-5000, 50-2000, or 50-500.

In certain embodiments of formula I, Ia, Ib, Ic, Id, Ie, If, or Ig, the polymer is a compound according to formula VI:

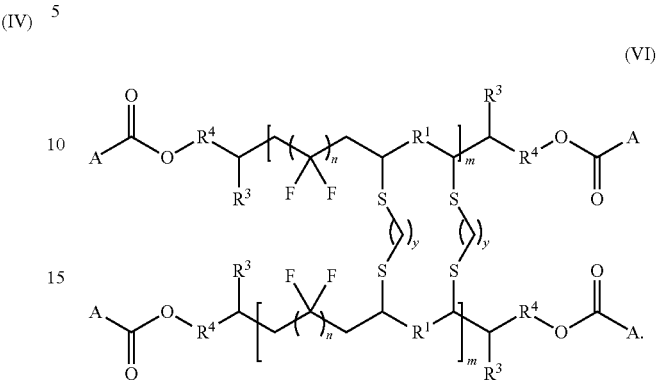

(VI)

In certain aspects, the present disclosure provides methods for preparing the polymers described above, comprising:

preparing a polymerization reaction mixture comprising a diene of formula VII with an am-iodoperfluorocarbon of formula VIII:

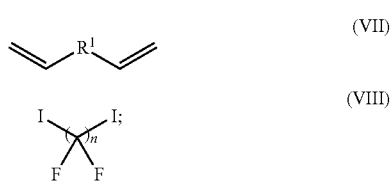

(VII)

(VIII)

and reacting the polymerization reaction mixture, thereby creating an iodinated fluoropolymer comprising repeat units of formula I.

In certain aspects, the present disclosure provides methods for preparing the cross linked polymers described above, comprising:

preparing a polymerization reaction mixture comprising a diene of formula VII with an α,ω-iodoperfluorocarbon of formula VIII:

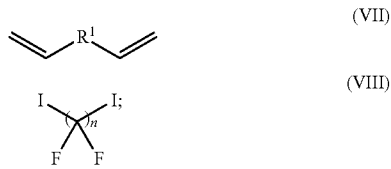

(VII)

(VIII)

wherein $R^1$ is defined above.

reacting the polymerization reaction mixture, thereby creating an iodinated fluoropolymer comprising repeat units of formula I; and contacting the iodinated fluoropolymer comprising repeat units of formula I with a cross linking agent, thereby creating a cross linked iodinated fluoropolymer comprising repeat units of formula Ic, Id, or Ie.

In certain embodiments of the aforementioned methods, the polymerization reaction mixture further comprises an end-cap of formula VI:

(VI)

wherein R² is defined above.

In certain embodiments, the end-cap is of formula VIa:

(VIa)

In certain embodiments, the molar ratio of the end-cap to the diene or α,ω-iodoperfluorocarbon is about 0.5, about 0.2, about 0.1, about 0.05, about 0.02, or about 0.01. In certain embodiments, the molar ratio of the end-cap to the diene or α,ω-iodoperfluorocarbon is 0.1-0.5,0.1-0.2,0.01-0.1,0.01-0.05, 0.01-0.02, or 0.001-0.01.

In certain embodiments of the aforementioned methods, the polymerization reaction mixture further comprises a radical initiator, such as sodium dithionite or AIBN.

In certain embodiments of the aforementioned methods, reacting the polymerization reaction mixture comprises sonicating the polymerization reaction mixture.

In certain embodiments the aforementioned methods further comprise functionalizing the iodinated fluoropolymer. In certain embodiments, functionalizing the iodinated fluoropolymer comprises:
contacting the iodinated fluoropolymer with a base, such as diazabicyclo[5.4.0]undec-7-ene (DBU), thereby creating a polymer comprising a repeat unit of formula Ia;
contacting the iodinated fluoropolymer with a nucleophile, such as potassium thioacetate or sodium azide, thereby creating a polymer comprising a repeat unit of formula Ib;
contacting the iodinated fluoropolymer with a metal hydride, such as tributyltin hydride, thereby creating a polymer comprising a repeat unit of formula Ib wherein R³ is H; or
contacting the iodinated fluorophore with a light or radical initiator to initiate radical substitution of the iodo groups, thereby creating a polymer comprising a repeat unit of formula Ib.

In certain embodiments of the aforementioned methods:
the iodinated fluoropolymer is of formula III, IIIa, or IIIb;
A is azidoalkylphenyl, such as azidomethylphenyl; and
functionalizing the iodinated fluoropolymer comprises contacting the iodinated fluoropolymer with a reagent comprising an alkyne, thereby creating a polymer of formula III, IIIa, or IIIb wherein A is triazolylalkylphenyl, such as triazolylmethylphenyl.

In certain embodiments, the reagent comprising an alkyne is an alkyne-functionalized biomolecule, an alkyne-modified surface, an alkyne-functionalized polymer such as alkynyl-PEG, an alkyne-functionalized fluorophore, an alkyne-functionalized drug moiety, or an alkyne-functionalized cell.

In certain embodiments of the methods described herein for preparing a cross linked polymer, the cross linking agent is an alkylene, such as a perfluoroalkylene, an ester, a carbonate, an ether, an acetal, a urea, an arylene, a heteroarylene, a thioether, a sulfoxide, a sulfone, a selenide, a phosphodiester, a boronic ester, a silyl, a siloxane, a diazo, an orthoester, a carbonyl, a disulfide, or an enol ester. In certain embodiments, the cross linking agent is an alkylene, a perfluoroalkylene, a disulphide, or a thioether. In certain embodiments, the cross linking agent is a disulphide or a thioether, such as dithioethane or dithiodecane. In certain embodiments, the cross linking agent is an alkyne, such as octadiyne or decadiyne. In certain embodiments, the cross linking agent is a reducing agent (e.g., iodine), light (e.g., ultraviolent or blue light), a radical initiator (e.g., DMPA or AIBN), a metal salt (e.g., copper sulfate), or an oxidizing agent (e.g., sodium ascorbate). In certain embodiments, the iodinated fluoropolymer is contacted by 1 or more cross linking agents. In certain embodiments, the solvent for the cross-linking reaction comprises DMSO, acetonitrile, water, or dimethylcarbonate. In certain embodiments, the solvent comprises acetonitrile, water, and dimethylcarbonate.

Definitions

The term "acetal" is art-recognized and may be represented by the general formula

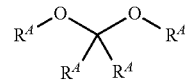

wherein each $R^A$ independently represents hydrogen or a hydrocarbyl, such as alkyl, or any occurrence of $R^A$ taken together with another and the intervening atom(s) complete a carbocycle or heterocycle having from 4 to 8 atoms in the ring structure.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group, preferably a lower alkyl group, having an oxygen attached thereto. Representative alkoxy groups include methoxy, trifluoromethoxy, ethoxy, propoxy, tert-butoxy and the like.

The term "alkoxyalkyl" refers to an alkyl group substituted with an alkoxy group and may be represented by the general formula alkyl-O-alkyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

An "alkyl" group or "alkane" is a straight chained or branched non-aromatic hydrocarbon which is completely saturated. Typically, a straight chained or branched alkyl group has from 1 to about 20 carbon atoms, preferably from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl. A $C_1$-$C_6$ straight chained or branched alkyl group is also referred to as a "lower alkyl" group.

Moreover, the term "alkyl" (or "lower alkyl") as used throughout the specification, examples, and claims is intended to include both "unsubstituted alkyls" and "substituted alkyls", the latter of which refers to alkyl moieties having substituents replacing a hydrogen on one or more carbons of the hydrocarbon backbone. Such substituents, if not otherwise specified, can include, for example, a halogen (e.g., fluoro), a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —$CF_3$, —CN, and the like.

The term "$C_{x-y}$" when used in conjunction with a chemical moiety, such as, acyl, acyloxy, alkyl, alkenyl, alkynyl, or alkoxy is meant to include groups that contain from x to y carbons in the chain. For example, the term "$C_{x-y}$ alkyl" refers to substituted or unsubstituted saturated hydrocarbon groups, including straight-chain alkyl and branched-chain alkyl groups that contain from x to y carbons in the chain, including haloalkyl groups. Preferred haloalkyl groups include trifluoromethyl, difluoromethyl, 2,2,2-trifluoroethyl, and pentafluoroethyl. $C_0$ alkyl indicates a hydrogen where the group is in a terminal position, a bond if internal. The terms "$C_{2-y}$ alkenyl" and "$C_{2-y}$ alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylthio", as used herein, refers to a thiol group substituted with an alkyl group and may be represented by the general formula alkylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "amide", as used herein, refers to a group

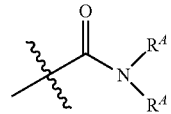

wherein each $R^A$ independently represent a hydrogen or hydrocarbyl group, or two $R^A$ are taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

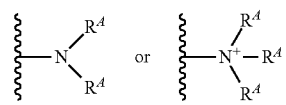

wherein each $R^A$ independently represents a hydrogen or a hydrocarbyl group, or two $R^A$ are taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group. The term "aryl" as used herein include substituted or unsubstituted single-ring aromatic groups in which each atom of the ring is carbon. Preferably the ring is a 6- or 10-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "boron" as used herein with respect to a substituent on an organic compound, is art-recognized and refers to a group —$B(R^A)_2$, wherein each $R^A$ independently represents hydrogen or a hydrocarbyl, such as alkyl, or any occurrence of $R^A$ taken together with another and the intervening atom(s) complete a heterocycle having from 4 to 8 atoms in the ring structure.

The term "boronic ester" or "boronate ester" as used herein is art-recognized and refers to a group —$B(OR^A)_2$, wherein each $R^A$ independently represents hydrogen or a hydrocarbyl, such as alkyl, or any occurrence of $R^A$ taken together with another and the intervening atom(s) complete a heterocycle having from 4 to 8 atoms in the ring structure.

The term "carbamate" is art-recognized and refers to a group

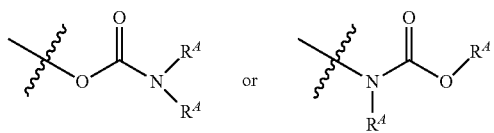

wherein each $R^A$ independently represent hydrogen or a hydrocarbyl group, such as an alkyl group, or both $R^A$ taken together with the intervening atom(s) complete a heterocycle having from 4 to 8 atoms in the ring structure.

The terms "carbocycle", and "carbocyclic", as used herein, refers to a saturated or unsaturated ring in which each atom of the ring is carbon. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0] octane, 4,5,6,7-tetrahydro-1H-indene and bicyclo[4.1.0] hept-3-ene. "Carbocycles" may be substituted at any one or more positions capable of bearing a hydrogen atom.

A "cycloalkyl" group is a cyclic hydrocarbon which is completely saturated. "Cycloalkyl" includes monocyclic and bicyclic rings. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

The term "carbocyclylalkyl", as used herein, refers to an alkyl group substituted with a carbocycle group.

The term "carbonate" is art-recognized and refers to a group —OCO$_2$—$R^A$, wherein $R^A$ represents a hydrocarbyl group.

The term "carboxy", as used herein, refers to a group represented by the formula —CO$_2$H.

The term "diazo", as used herein, refers to a group represented by the formula=N=N.

The term "disulfide" is art-recognized and refers to a group —S—S—$R^A$, wherein $R^A$ represents a hydrocarbyl group.

The term "enol ester", as used herein, refers to a group —C(O)O—C($R^A$)=C($R^A$)$_2$ wherein $R^A$ represents a hydrocarbyl group.

The term "ester", as used herein, refers to a group —C(O)O$R^A$ wherein $R^A$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The term "heteroalkyl", as used herein, refers to a saturated or unsaturated chain of carbon atoms and at least one heteroatom, wherein no two heteroatoms are adjacent.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, tetrahydropyran, tetrahydrofuran, morpholine, lactones, lactams, and the like.

The term "heterocyclylalkyl", as used herein, refers to an alkyl group substituted with a heterocycle group.

The term "hydrocarbyl", as used herein, refers to a group that is bonded through a carbon atom that does not have a=O or =S substituent, and typically has at least one carbon-hydrogen bond and a primarily carbon backbone, but may optionally include heteroatoms. Thus, groups like methyl, ethoxyethyl, 2-pyridyl, and trifluoromethyl are considered to be hydrocarbyl for the purposes of this application, but substituents such as acetyl (which has a=O substituent on the linking carbon) and ethoxy (which is linked through oxygen, not carbon) are not. Hydrocarbyl groups include, but are not limited to, aryl, heteroaryl, carbocycle, heterocyclyl, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer non-hydrogen atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The term "orthoester" as used herein is art-recognized and refers to a group —C(OR$^A$)$_3$, wherein each R$^A$ independently represents hydrogen or a hydrocarbyl, such as alkyl, or any occurrence of R$^A$ taken together with another and the intervening atom(s) complete a heterocycle having from 4 to 8 atoms in the ring structure.

The term "phosphoester", as used herein, refers to a group —P(O$_2$)OH.

The term "phosphodiester", as used herein, refers to a group —P(O$_2$)OR$^A$ wherein R$^A$ represents a hydrocarbyl group.

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "selenide", as used herein, is equivalent to an ether, wherein the oxygen is replaced with a selenium.

The term "selenoxide" is art-recognized and refers to the group —Se(O)—R$^A$, wherein R$^A$ represents a hydrocarbyl.

The term "siloxane" is art-recognized and refers to a group with an Si—O—Si linkage, such as the group —Si(R$^A$)$_2$—O—Si—(R$^A$)$_3$, wherein each R$^A$ independently represents hydrogen or hydrocarbyl, such as alkyl, or both R$^A$ taken together with the intervening atom(s) complete a heterocycle having from 4 to 8 atoms in the ring structure.

The term "silyl" refers to a silicon moiety with three hydrocarbyl moieties attached thereto.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from C$_{1-6}$ alkyl, C$_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "sulfate" is art-recognized and refers to the group —OSO$_3$H, or a pharmaceutically acceptable salt thereof.

The term "sulfonamide" is art-recognized and refers to the group represented by the general formulae

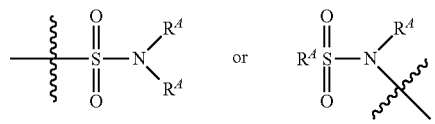

wherein each R$^A$ independently represents hydrogen or hydrocarbyl, such as alkyl, or both R$^A$ taken together with the intervening atom(s) complete a heterocycle having from 4 to 8 atoms in the ring structure.

The term "sulfoxide" is art-recognized and refers to the group —S(O)—R$^A$, wherein R$^A$ represents a hydrocarbyl.

The term "sulfonate" is art-recognized and refers to the group SO$_3$H, or a pharmaceutically acceptable salt thereof.

The term "sulfone" is art-recognized and refers to the group —S(O)$_2$—R$^A$, wherein R$^A$ represents a hydrocarbyl.

The term "thioalkyl", as used herein, refers to an alkyl group substituted with a thiol group.

The term "thioester", as used herein, refers to a group —C(O)SR$^A$ or —SC(O)R$^A$ wherein R$^A$ represents a hydrocarbyl.

The term "thioether", as used herein, is equivalent to an ether, wherein the oxygen is replaced with a sulfur.

The term "urea" is art-recognized and may be represented by the general formula

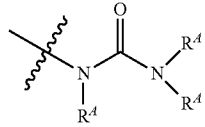

wherein each R$^A$ independently represents hydrogen or a hydrocarbyl, such as alkyl, or any occurrence of R$^A$ taken together with another and the intervening atom(s) complete a heterocycle having from 4 to 8 atoms in the ring structure.

"Protecting group" refers to a group of atoms that, when attached to a reactive functional group in a molecule, mask, reduce or prevent the reactivity of the functional group. Typically, a protecting group may be selectively removed as desired during the course of a synthesis. Examples of protecting groups can be found in Greene and Wuts, *Protective Groups in Organic Chemistry*, 3$^{rd}$ Ed., 1999, John Wiley & Sons, NY and Harrison et al., *Compendium of Synthetic Organic Methods*, Vols. 1-8, 1971-1996, John Wiley & Sons, NY. Representative nitrogen protecting groups include, but are not limited to, formyl, acetyl, trifluoroacetyl, benzyl, benzyloxycarbonyl ("CBZ"), tert-butoxycarbonyl ("Boc"), trimethylsilyl ("TMS"), 2-trimethylsilyl-ethanesulfonyl ("TES"), trityl and substituted trityl groups, allyloxycarbonyl, 9-fluorenylmethyloxycarbonyl ("FMOC"), nitro-veratryloxycarbonyl ("NVOC") and the like. Representative hydroxyl protecting groups include, but are not limited to, those where the hydroxyl group is either acylated (esterified) or alkylated such as benzyl and trityl ethers, as well as alkyl ethers, tetrahydropyranyl ethers, trialkylsilyl ethers (e.g., TMS or TIPS groups), glycol ethers, such as ethylene glycol and propylene glycol derivatives and allyl ethers.

EXAMPLES

The invention now being generally described, it will be more readily understood by reference to the following examples which are included merely for purposes of illustration of certain aspects and embodiments of the present invention, and are not intended to limit the invention.

Example 1: Dimethylaminobenzoyl End-Cap

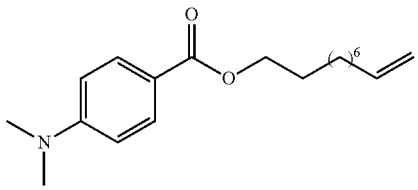

1.4 mmol of N,N-Dimethylaminobenzoyl chloride was dissolved in 5 mL of dry dichloromethane. 1.05 mmol of 9-decen-1-ol and 1.68 mmol of triethylamine was added to an addition funnel and then added dropwise to the solution. The reaction was stirred for 1 hour and then poured into 5 mL of water, and washed with water. The organic layer was dried with magnesium sulfate and evaporated to dryness. The solid was further purified by flash chromatography with a 20-45% EtOAc gradient in hexanes to yield white crystals as product. $^1$H NMR (CDCl$_3$, 500 MHz), δ ppm: 7.95 (d, 2H), 6.70 (d, 2H), 5.85 (ddt, 1H), 5.00 (m, 2H), 4.29 (t, 2H), 3.08 (s, 6H), 2.08 (m, 2H), 1.76 (m, 2H), 1.38 (m, 10H)

Example 2: Azide end-cap

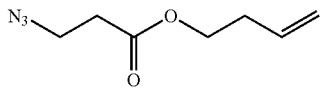

2 mmol of 3-bromopropionic acid was added to an oven dried round-bottom flask. 2 mmol of thionyl chloride was added and stirred for 2 hours at 60° C. The solution was cooled to room temperature and diluted with 5 mL of dichloromethane. 2 mmol of pyridine was added, followed by 2 mmol of 3-buten-1-ol. The reaction was stirred overnight and was quenched with 5 mL of water. The organic layer was extracted and washed 3 more times with water. The organic layer was dried with magnesium sulfate and evaporated to dryness to yield an ester, which was used without further purification. 1.36 mmol of the ester was dissolved in 5 mL of 1:1 DMF:water solution and 1.768 mmol of sodium azide was added. The solution was heated to 55° C. overnight. The organic layer was extracted with 10 mL of DCM and washed 4 times with water. The organic layer was dried with magnesium sulfate, and evaporated to dryness yielding the azide end-cap as a pure oil. $^1$H NMR (CDCl$_3$, 500 MHz), δ ppm: 5.81 (ddt, 1H), 5.13 (m, 2H), 4.21 (t, 2H), 3.60 (t, 2H), 2.61 (t, 2H), 2.43 (q, 2H).

Example 3: PEG End-Cap

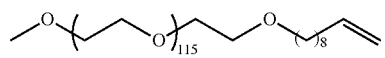

0.672 mmol PEG-benzoyl sulfonate (Mn=5000) was dissolved in 30 mL of dry DMF in a round-bottomflask. In a separate round-bottomflask, NaH (60% dispersed in oil) was added to a solution of 13.4 mmol of 9-decen-1-ol in 10 mL of dry DMF at 0° C. The decenol solution was warmed to room temperature and stirred for 1 hour. The decenol solution was transferred to the PEG solution via cannula and stirred overnight. The following day, the solution was quenched with methanol and then water. The solution was concentrated to dryness and redissolved in chloroform. The polymer was purified by precipitation from cold hexanes. The resulting alkene functionalized PEG was then dried overnight on high vacuum. $^1$H NMR (CDCl$_3$, 500 MHz), δ ppm: 5.80 (m, 1H), 4.97 (m, 2H), 3.64 (s, 762), 3.37 (s, 3H).

Example 4: PEG End-Cap

0.4 mmol PEG-benzoyl sulfonate (Mn=5000) was dissolved in 15 mL of dry DMF in a round-bottom flask. In a separate round-bottom flask, NaH (60% dispersed in oil) was added to a solution of 12 mmol of propargyl alcohol in 10 mL of dry DMF at 0° C. The alcohol solution was warmed to room temperature and stirred for 1 hour. The alcohol solution was transferred to PEG solution via cannula and stirred overnight. The following day, the solution was quenched with methanol and then water. The solution was concentrated to dryness and redissolved in chloroform. The polymer was purified by precipitation from cold hexanes. The alkyne functionalized PEG was then dried overnight on high vacuum. $^1$H NMR (CDCl$_3$, 500 MHz), δ ppm: 4.20 (d, 2H), 3.64 (s, 794H), 2.44 (t, 1H).

Example 5: Ester Diene

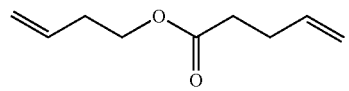

3 mmol of pentenoic acid was added to a dry round bottom-flask with a condenser attached. 3 mmol of thionyl chloride was added and solution was refluxed 1 hour. The solution was cooled to room temperature and dissolved in 5 mL of DCM. 3.3 mmol of triethylamine was added dropwise, followed by 3.3 mmol of 3-buten-1-ol. The reaction stirred overnight and was quenched following morning with 5 mL water. The organic layer was extracted and washed 3 more times with water. The organic layer was dried with magnesium sulfate and evaporated to dryness. The resulting oil was further purified by flash chromatography in 100% DCM. $^1$H NMR (CDCl$_3$, 500 MHz), δ ppm: 5.80 (m, 2H), 5.07 (m, 4H), 4.14 (t, 2H), 2.39 (m, 6H).

Example 6: Synthesis of Amide Diene

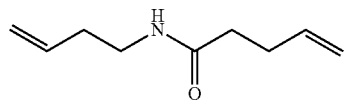

1.3 mmol of pentenoic acid was added to a dry round bottom-flask with a reflux condenser attached. 1.3 mmol of thionyl chloride was added and the solution was refluxed 1 hour. The solution was cooled to room temperature and dissolved in 5 mL of DCM. 1.6 mmol of triethylamine was added dropwise, followed by 1.6 mmol of 3-buten-1-amine. The reaction was stirred overnight and quenched the following morning with 5 mL water. The organic layer was extracted and washed 3 more times with water. The organic layer was dried with magnesium sulfate and evaporated to dryness. The resulting oil was further purified by flash chromatography in 20-40% EtOAc gradient in hexanes. $^1$H NMR (CDCl$_3$, 500 MHz), δ ppm: 5.79 (m, 2H), 5.54 (bs, 1H), 5.05 (m, 4H), 3.33 (q, 2H), 2.46 (m, 2H), 2.38 (m, 2H), 2.26 (m, 2H).

Example 7: Synthesis of Urea Diene

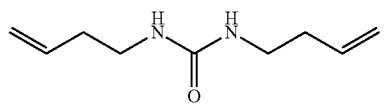

2 mmol of triphosgene was dissolved in 15 mL of dry DCM in round-bottom flask equipped with an addition funnel. 6 mmol of diisopropylethylamine and 6 mmol of 3-buten-1-amine was added to the addition funnel and dissolved in 40 mL of dry DCM. The alcohol solution was added dropwise to triphosgene. The reaction was stirred at room temperature for 6 hours and then quenched with NaH$_2$PO$_4$. The solution was washed with saturated NaHCO$_3$ solution and then brine. The organic layer was dried with magnesium sulfate, and evaporated to dryness. The resulting oil was purified by flash chromatography with a 19:1 DCM/MeOH eluent. $^1$H NMR (CDCl$_3$, 500 MHz), δ ppm: 5.79 (ddt, 2H), 5.14 (m, 4H), 4.74 (bs, 2H), 3.29 (q, 4H), 2.29 (qt, 4H).

Example 8: Synthesis of Carbonate Diene

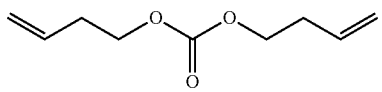

3 mmol of triphosgene was dissolved in 15 mL of dry DCM in a round-bottom flask equipped with an addition funnel. 15 mmol of diisopropylethylamine and 15 mmol of 3-buten-1-ol dissolved in 40 mL of dry DCM was added to the addition funnel. The alcohol solution was added dropwise to triphosgene. The reaction stirred at room temperature for 6 hours at which point it was quenched with NaH$_2$PO$_4$. The solution was washed with saturated NaHCO$_3$ solution and then brine. The organic layer was dried with magnesium sulfate, and evaporated to dryness. The resulting oil was purified by flash chromatography with a 9:1 hexane/EtOAc eluent. $^1$H NMR (CDCl$_3$, 500 MHz), δ ppm: 5.83 (m, 2H), 5.21 (m, 4H), 4.38 (t, 4H), 2.54 (q, 4H).

Example 9: Synthesis of Acetal Diene

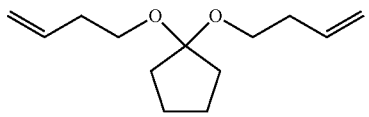

10 mmol of cyclopentanone was dissolved in 15 mL of toluene in a round-bottom flask equipped with a Dean-Stark apparatus. 21 mmol of 3-buten-1-ol was added, followed by 10 mg of tin dichloride hydrate. The reaction was stirred overnight at 120° C. The following day, the solution was filtered and evaporated to dryness. The resulting oil was purified by flash chromatography with 4-10% EtOAc gradient in hexanes. $^1$H NMR (CDCl$_3$, 500 MHz), δ ppm: 5.88 (ddt, 2H), 5.10 (m, 4H), 3.51 (t, 4H), 2.34 (qt, 4H), 1.81 (ddt, 4H), 1.69 (ddd, 4H).

Example 10: General Polymerization Procedure with End-Cap

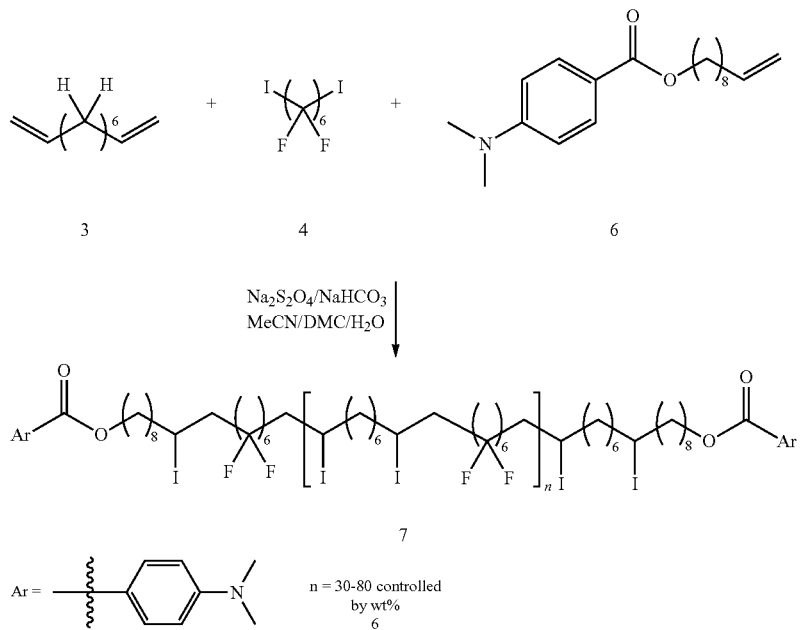

In a scintillation vial, 0.25 mmol (1 eq) of diene was dissolved in 1.5 mL of acetonitrile and 0.7 mL of water. 0.025-0.05 mmol alkene end-cap (0.01-0.2 eq) was added to the solution followed by addition of 0.2625-0.2875 mmol diiodoperfluorohexane (1.05-1.15 eq). 0.375 mmol of $Na_2S_2O_4$ and $NaHCO_3$ (1.5 eq. each) were added and the vial was placed in a sonication bath for 6-14 hours. Following completion of polymerization, the resulting polymer was precipitated from 50 mL of cold methanol. Ether was used if PEG is the end-cap. The precipitate was centrifuged at 2500×g for 5 minutes, and the resulting pellet was dried with high vacuum. NMR and GPC analysis shown in FIGS. 18A and 18B.

Example 11: Preparation of Polymer with Azidyl End-Cap

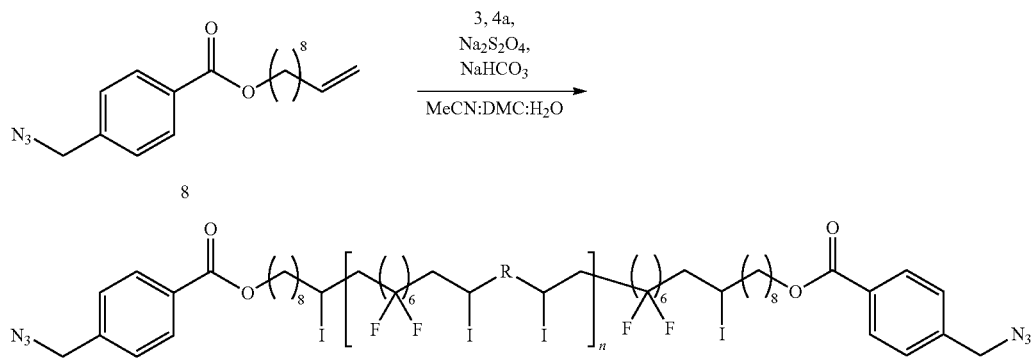

A polymer with an azidyl end cap is prepared according to the general procedures described above.

Example 12: Preparation of Polymers without End-Caps

Diiodoperfluoroalkane (0.1 mmol, 1 eq) was dissolved in 0.6 mL of acetonitrile, 0.5 mL of dimethyl carbonated, and 0.3 mL of water. 1,9-Decadiene (0.0138g, 0.1 mmol, 1 eq) was added to solution. $Na_2S_2O_4$ (0.032g, 0.15 mmol, 1.5 eq) and $NaHCO_3$ (0.012g, 1.5 mmol, 1.5 eq) were added and the vial was placed in a sonication bath for 6-14 hours. Following completion of polymerization, the resulting polymer was precipitated from 50 mL of cold methanol. Precipitate was centrifuged at 2500×G for 5 minutes, and the resulting pellet was dried with high vacuum.

5a, diiodoperfluorohexane polymer: White powder, 83%. $^1$H NMR (CDCl$_3$, 500 MHz), δ ppm: 4.33 (tt, 2H), 2.83 (m, 4H), 1.80 (ddt, 4H), 1.38 (m, 8H). $^{19}$F NMR (CDCl$_3$, 500 MHz), δ ppm:-113 (q, 4F),-122 (s, 4F),-124 (s, 4F). GPC, DMSO: M$_n$: 135, M$_w$: 254, D: 1.89. TGA: 10% mass loss at 286° C.

5b, diiodoperfluorooctane polymer: White powder, 93%. NMR (CDCl$_3$, 500 MHz), δ ppm: 4.33 (tt, 2H), 2.83 (m, 4H), 1.80 (ddt, 414), 1.38 (m, 8H). $^{19}$F NMR (CDCl$_3$, 500 MHz), δ ppm:-113 (q, 4F),-121 (s, 4F),-122 (s, 4F),-124 (s, 4F). GPC, DMSO: M$_n$: 184, M$_w$: 239, D: 1.30.

5c, diiodoperfluorobutane polymer: White powder, 76%. $^1$H NMR (CDCl$_3$, 500 MHz), δ ppm: 4.33 (tt, 2H), 2.83 (m, 4H), 1.80 (ddt, 4H), 1.38 (m, 8H). $^{19}$F NMR (CDCl$_3$, 500 MHz), δ ppm:-113 (q, 4F),-123 (s, 4F). GPC, DMSO: M$_n$: 79.3, M$_w$: 121, D: 1.53.

Example 13: Alternative Polymerization Method for 5a

Diiodoperfluorohexane (0.055g, 0.1 mmol, 1 eq) and 1,9-Decadiene (0.0138g, 0.1 mmol, 1 eq) were dissolved in 1.5 mL of dimethylsulfoxide. Na$_2$S$_2$O$_4$ (0.032g, 0.15 mmol, 1.5 eq) and NaHCO$_3$(0.012g, 1.5 mmol, 1.5 eq) were added and the solution slowly turned bright yellow. The reaction was then stirred at room temperature overnight. The resulting solution was precipitated from water (25 mL) followed by methanol (25 mL) and the precipitate was centrifuged at 2500×G for 5 minutes. White solid, 51%. $^1$H NMR (CDCl$_3$, 500 MHz), δ ppm: 4.33 (tt, 2H), 2.83 (m, 4H), 1.80 (ddt, 4H), 1.38 (m, 8H). $^{19}$F NMR (CDCl$_3$, 500 MHz), δ ppm:-113 (q, 4F),-122 (s, 4F),-124 (s, 4F). GPC, THF: M$_n$: 12.0, M$_w$: 24.8, D: 2.08. TGA: 10% mass loss at 286° C.

Example 14: Preparation of Polymer with PEG End-Cap

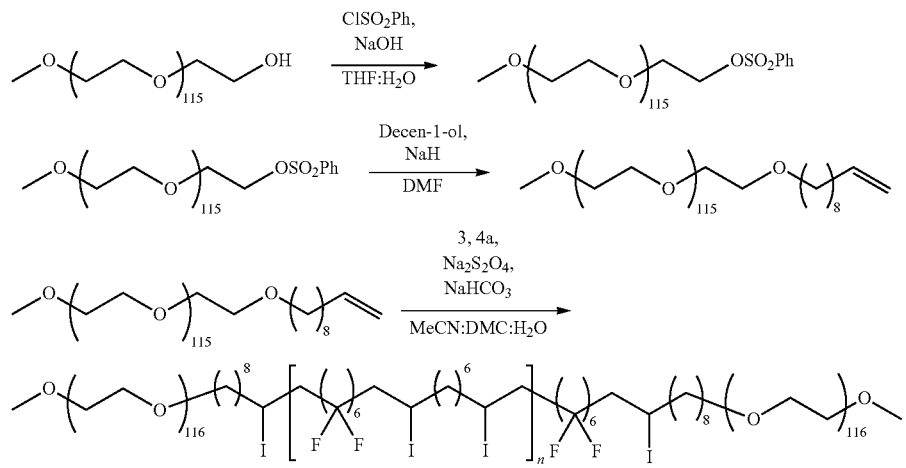

A polymer with a PEG end cap is prepared according to the general procedures described above.

Example 15: General Procedure for Alkyne-Azide Click Chemistry

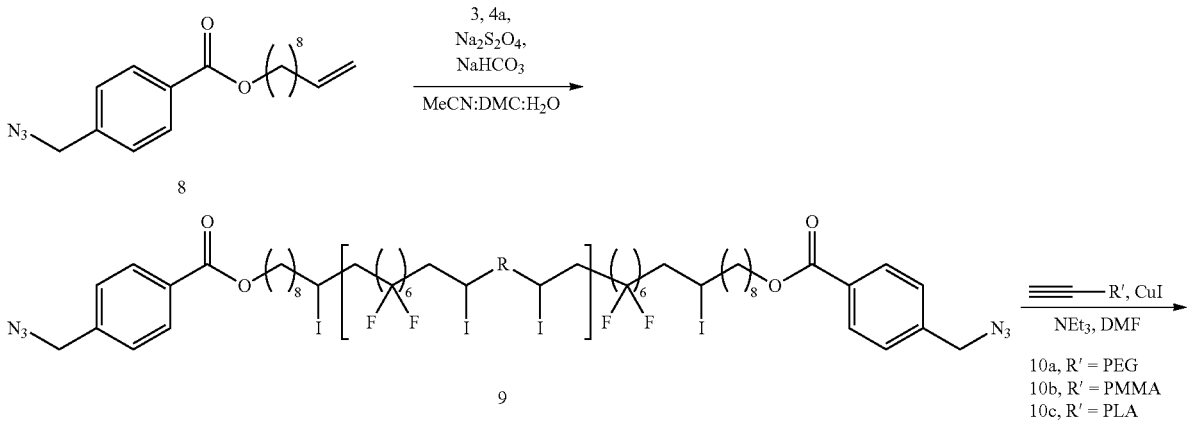

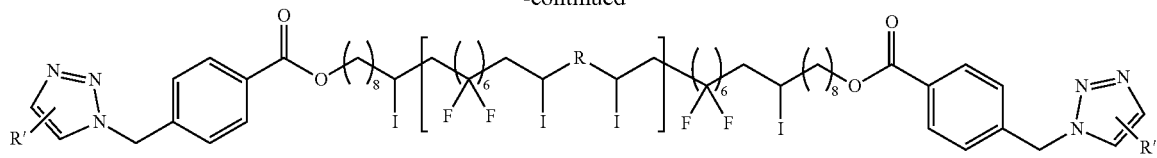

11a-c

Figure 16:
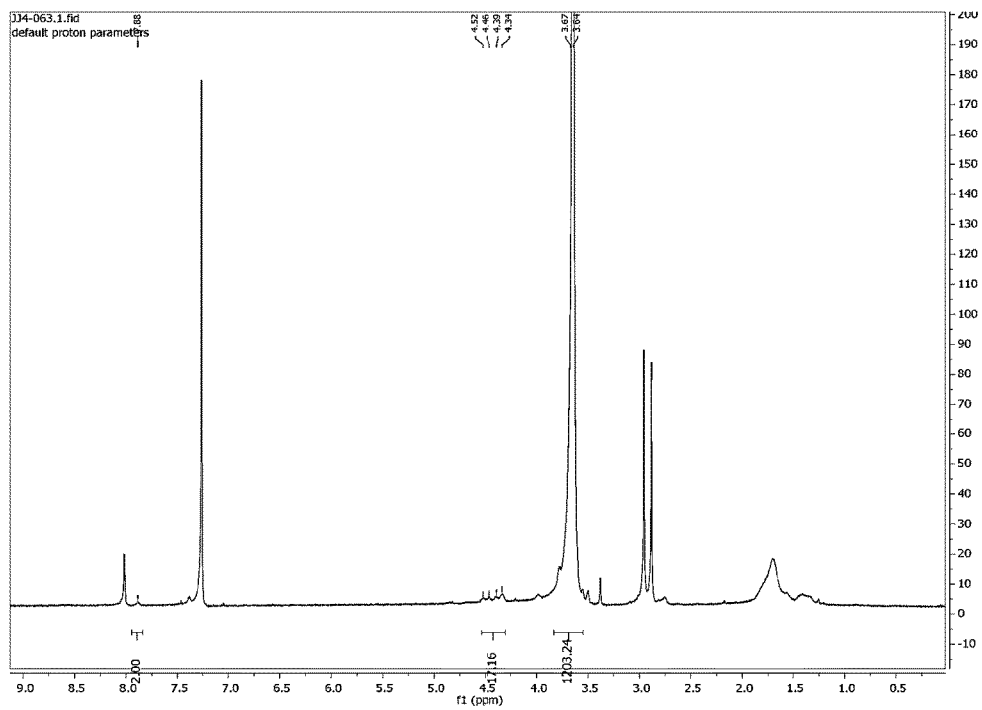
FIG. 16 shows an NMR spectrum of a polymer to which a triazole end cap has been added.

Azide end-capped polymer, 9, (0.01g, 0.0005 mmol, 1 eq) was dissolved in 2 mL of 1:1 Dimethylformamide/water solution. Sodium ascorbate (0.001g) and copper (II) sulfate (0.001g) were added to the solution. The solution was stirred at room temperature overnight. The polymer was precipitated from cold diethyl ether and subsequently centrifuged at 2500×g for 5 minutes. The resulting pellet was dried with high vacuum. The NMR spectrum is provided in FIG. 16.

Example 16: General Procedure for Iodine Elimination, 20

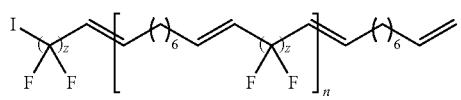

Figure 13A:
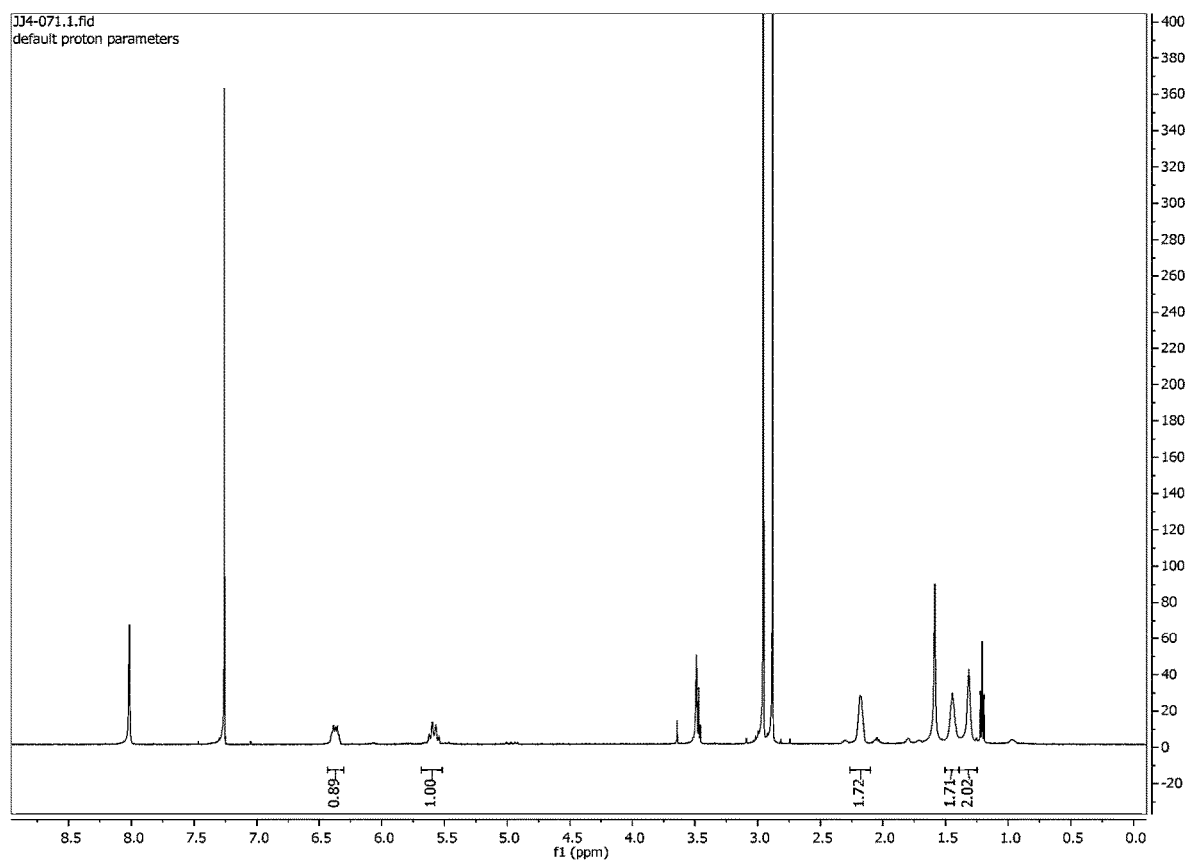
FIGS. 13A and 13B show an NMR spectrum and a thermogravimetric analysis trace for a polymer from which iodine has been eliminated.
Figure 13B:
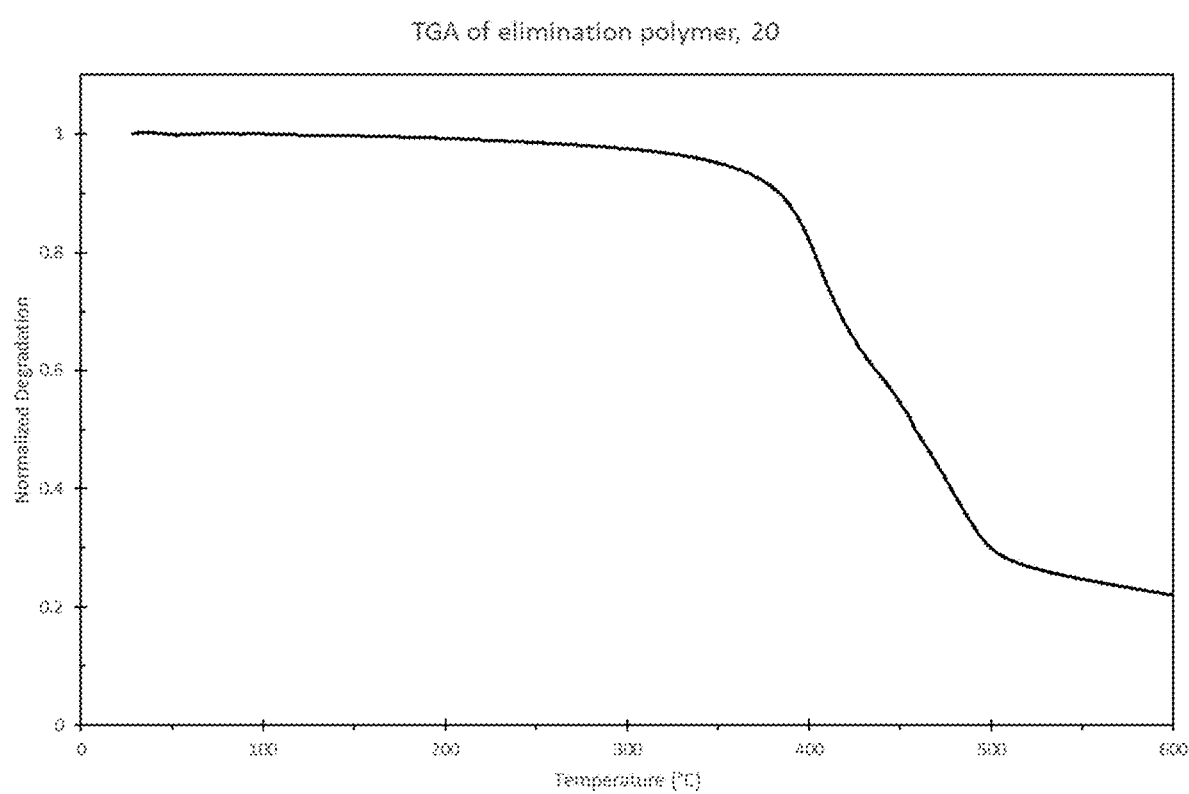

Polymer 5a (0.05g, 0.72 mmol, 1 eq) was dissolved in 1.5 mL of dimethylformamide. 1,8-Diazabicyclo(5.4.0)undec-7-ene (DBU) (0.065g, 0.433 mmol, 6 eq) was added dropwise and stirred overnight at room temperature. The resulting polymer was precipitated from 50 mL of cold methanol. Precipitate was centrifuged at 2500×G for 5 minutes, and the resulting pellet was dried with high vacuum. White powder, quantitative. $^1$H NMR (CDCl$_3$, 500 MHz), δ ppm: 6.37 (t, 2H), 5.58 (q, 2H), 2.19 (s, 4H), 1.44 (s, 4H), 1.31 (s, 4H). $^{19}$F NMR (CDCl$_3$, 500 MHz), δ ppm:-111 (s, 4F),-122 (s, 4F),-124 (s, 4F). TGA: 10% mass loss at 383° C. The NMR spectrum and thermogravimetric analysis trace are provided in FIGS. 13A and 13B.

Example 17: General Procedure for Thioacetate Addition to Polymer, 25

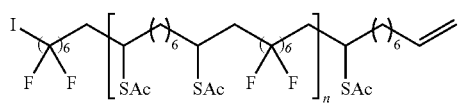

Figure 14A:
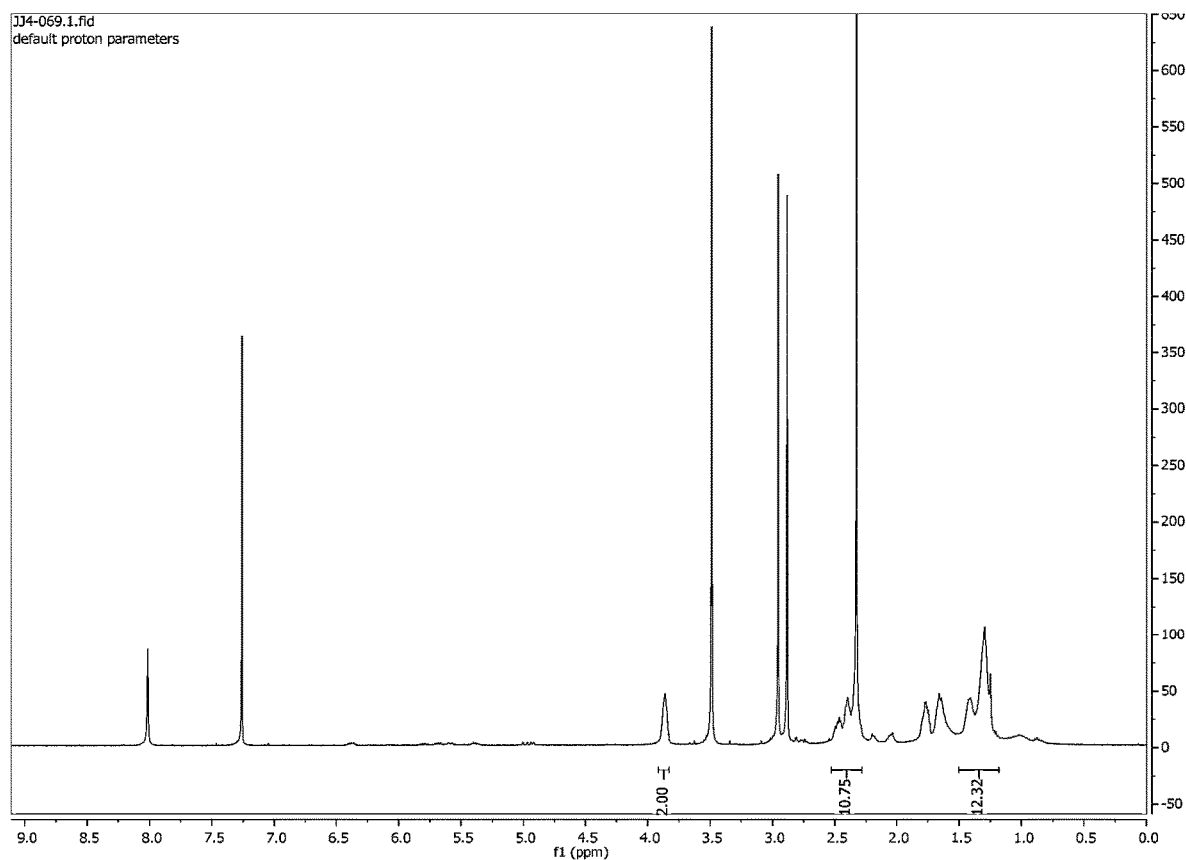
FIGS. 14A and 14B show an NMR spectrum and a thermogravimetric analysis trace for a polymer to which thioacetate has been added.
Figure 14B:
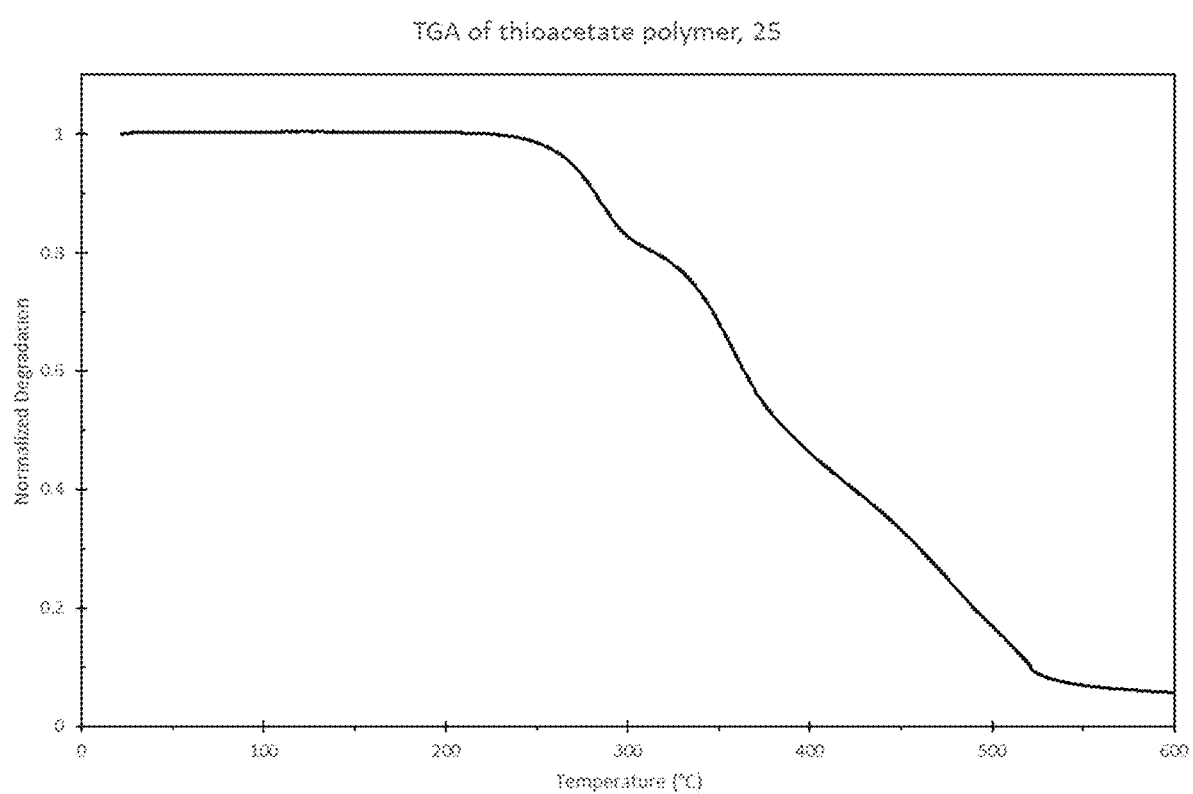

Polymer 5a (0.05g, 0.072 mmol, 1 eq) was dissolved in 1 mL of dimethylformamide. Potassium thioacetate (0.098g, 0.433 mmol, 6 eq) was added and stirred overnight at room temperature. The resulting polymer was precipitated from 50 mL of cold methanol. Precipitate was centrifuged at 2500×G for 5 minutes, and the resulting pellet was dried with high vacuum. White powder, quantitative. $^1$H NMR (CDCl$_3$, 500 MHz), δ ppm: 3.86 (s, 2H), 2.33 (m, 10H), 1.76 (m, 4H), 1.36 (m, 8H). $^{19}$F NMR (CDCl$_3$, 500 MHz), δ ppm:-113 (q, 4F),-122 (s, 4F),-124 (s, 4F). FT-IR: 2932 (C—H str) (w), 1695 (C=O) (s), 1000-1100 (C—F bend) (vs). TGA: 10% mass loss at 282° C. The NMR spectrum and thermogravimetric analysis trace are provided in FIGS. 14A and 14B.

Example 18: General Procedure for Azide Addition to Polymer, 31

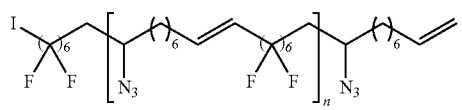

Figure 15A:
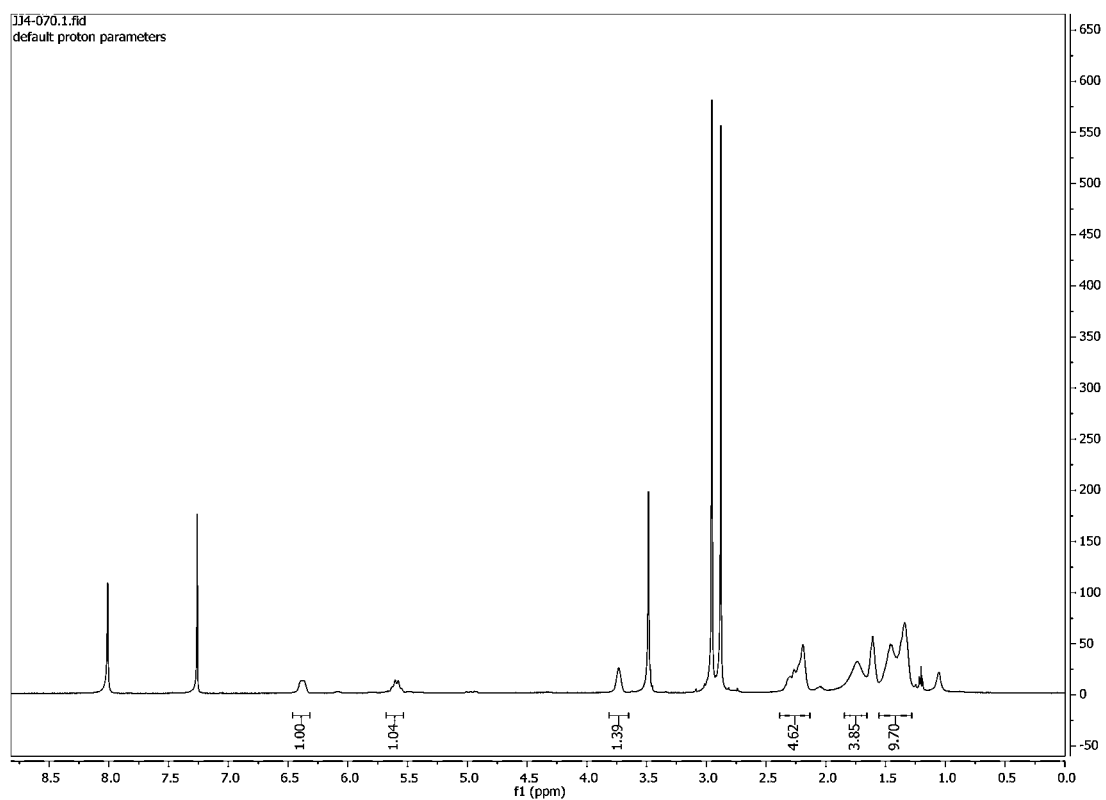
FIGS. 15A and 15B shows an NMR spectrum and thermogravimetric analysis trace of a polymer to which azide has been added.
Figure 15B:
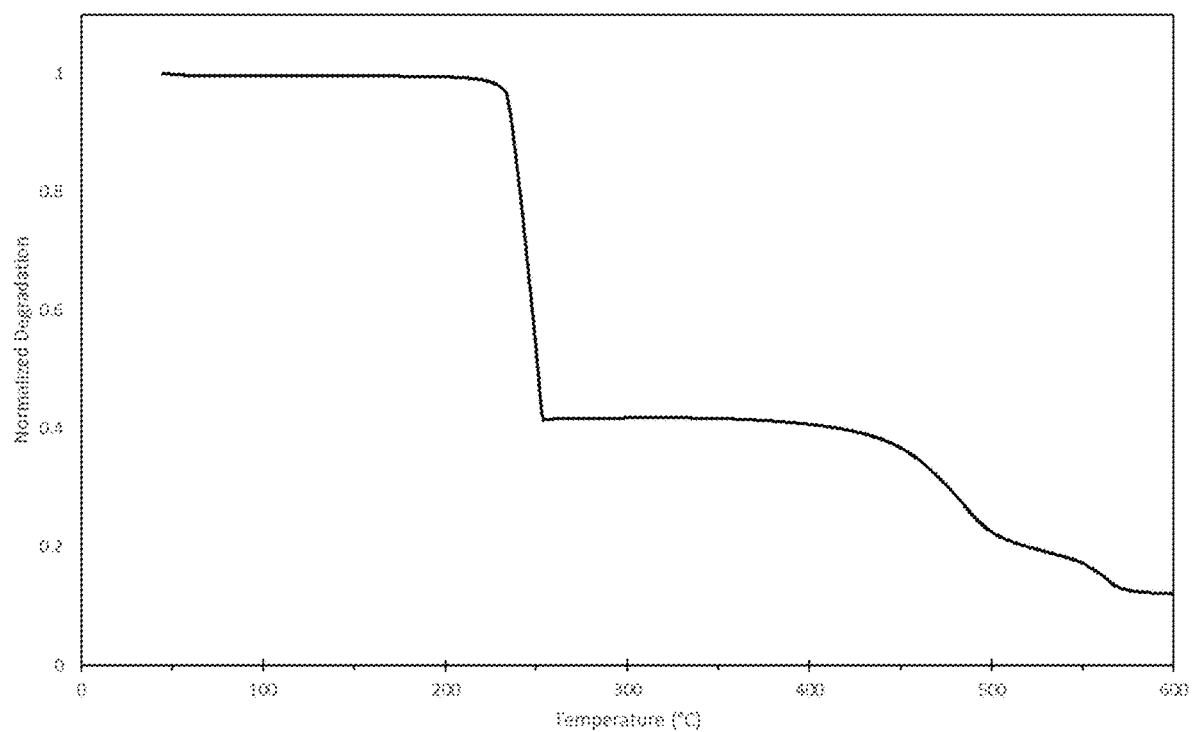

Polymer 5a (0.05g, 0.072 mmol, 1 eq) was dissolved in 1 mL of dimethylformamide. Sodium azide (0.028g, 0.433 mmol, 6 eq) was added and stirred overnight at room temperature. The resulting polymer was precipitated from 50 mL of cold methanol. Precipitate was centrifuged at 2500×G for 5 minutes, and the resulting pellet was dried with high vacuum. White powder, 72% isolated yield, 53% azide incorporation, 47% eliminated iodine. NMR (CDCl$_3$, 500 MHz), δ ppm: 6.38 (t, 1H), 5.58 (1H, q), 3.74 (s, 1.1), 2.2 (m 4H), 1.61 (m, 2H), 1.4 (m, 8H). $^{19}$F NMR (CDCl$_3$, 500 MHz), δ ppm:-111 (s, 4F),-122 (s, 4F),-124 (s, 4F). TGA: 10% mass loss at 220° C. The NMR spectrum is provided in FIG. 15.

Example 19: General Procedure for Reduction of Polymer, 21

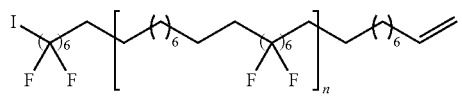

Polymer 5a (0.1g, 0.144 mmol, 1 eq), tributyltin hydride (0.419g, 14.4 mmol, 10 eq), and azoisobutyronitrile (AIBN) (0.005g, 0.029 mmol, 0.2 eq) and 6 mL of toluene were added to a two-neck round bottom flask and freeze-pump-thawed three times. Solution was then heated to 100° C. for 24 hours with AIBN being added over the course of the reaction. The solution was then cooled to room temperature and the resulting polymer was precipitated from hexanes. Precipitate was centrifuged at 2500×G for 5 minutes, and the resulting pellet was dried with high vacuum Example 20: General Procedure for Cross-Linking Through Disulfide Formation, 27

Thioacetate containing polymer 28 (0.0235g, 0.040 mmol, 1 eq) was dissolved in 1.8 mL (8:1 v/v %) mixture of dimethylformamide and water. Sodium hydroxide (0.100g, 0.32 mmol, 8 eq) was added and stirred at 70° C. for 4 hours. Reaction cooled to room temperature and neutralized with glacial acetic acid. Catalytic iodine was then added and stirred for an additional two hours. The resulting slurry was precipitated from water (25 mL) followed by methanol (25 mL) and the precipitate was centrifuged at 2500×G for 5 minutes. Orange solid, quantitative. FT-IR: 2932 (C—H str) (w), 1630 (C=O) (s), (1000-1100 (C—F bend) (vs), 699 (S—S bend) (s). TGA: 10% mass loss at 364° C.

Example 21: General Procedure for Cross-Linking Through Ethylene Thiol Addition, 28

Polymer 11a (0.022g, 0.042 mmol, 1 eq) was dissolved in 1 mL of dimethylformamide. Ethylene thiol (0.004g, 0.042 mmol, 1 eq) and potassium carbonate (0.006g, 0.042 mmol, 1 eq) were added to the solution and stirred overnight at room temperature. The resulting slurry was precipitated from water (25 mL) followed by methanol (25 mL) and the precipitate was centrifuged at 2500×G for 5 minutes. White solid, quantitative. FT-IR: 2932 (C—H str) (w), 1000-1100 (C—F bend) (vs). TGA: 10% mass loss at 280° C.

Example 22: Procedure for Cross-Linking Through Thiol-Ene Chemistry, 29

Thioacetate containing polymer 28 (0.0235g, 0.040 mmol, 1 eq) was dissolved in 1.8 mL (8:1 v/v %) mixture of dimethylformamide and water. Sodium hydroxide (0.100g, 0.32 mmol, 8 eq) was added and stirred at 70° C. for 4 hours. Solution cooled to room temperature and 1,9-Decadiene (0.007g, 0.05 mmol, 1.2 eq) and Dimethoxyphenylacetophenone (DMPA) (0.0015g, 0.005 mmol, 0.012 eq) were added and then irradiated under 365 nm light for 14 hours. The resulting slurry was precipitated from water (25 mL) followed by methanol (25 mL) and the precipitate was centrifuged at 2500×G for 5 minutes. Orange solid, 35%. FT-IR: 2932 (C—H str) (w), 1000-1100 (C—F bend) (vs). TGA: 10% mass loss at 331° C.

Example 23: Procedure for Allyl Addition to Polymer, 34

Polymer 11a(0.1g, 0.144 mmol, 1 eq), allyl ethyl sulfone (0.133g, 1.154 mmol, 8 eq), and azoisobutyronitrile (AIBN) (0.005g, 0.029 mmol, 0.2 eq) and 6 mL of toluene were added to a two-neck round bottom flask and freeze-pump-thawed three times. Solution was then heated to 100° C. for 24 hours with AIBN being added over the course of the reaction. The solution was then cooled to room temperature and the resulting polymer was precipitated from hexanes. Precipitate was centrifuged at 2500×G for 5 minutes, and the resulting pellet was dried with high vacuum. White powder, 48% isolated yield, 55% allyl incorporation, 45% remaining iodine. $^1$H NMR (CDCl$_3$, 500 MHz), δ ppm: 5.72 (ddt, 1H), 5.06 (m, 2H), 4.33 (tt, 1.2H), 2.8 (m, 2.4H), 2.08 (m, 5H), 1.80 (m, 2.4H), 1.58 (m, 4H), 1.32 (m, 10H). $^{19}$F NMR (CDCl$_3$, 500 MHz), δ ppm:-113 (q, 4F),-122 (s, 4F),-124 (s, 4F).

Example 24: Procedure for Cross-Linking Through Alkyne-Azide Chemistry, 32

Azide containing polymer 34 (0.0.08g, 0.16 mmol, 1 eq) and 1,7-octadiyne (0.017g, 0.16 mmol, 1 eq) were dissolved in 2 mL of dimethylformamide. Copper sulfate (0.003g, 0.016 mmol, 0.1 eq) and sodium ascorbate (0.006g 0.032g, 0.2 eq) were added to the solution with 0.1 mL of water. The solution was then stirred overnight at room temperature. The resulting slurry was precipitated from water (25 mL) followed by methanol (25 mL) and the precipitate was centrifuged at 2500×G for 5 minutes. Black solid, quantitative. TGA: 10% mass loss at 332° C.

Example 25: Procedure for Photo-Cross-Linking, 36

Polymer 11a (0.05g, 0.072 mmol, 1 eq) and 10 wt. % Dimethoxyphenylacetophenone (DMPA) (0.005g, 0.02 mmol, 0.27 eq) were dissolved in 2.5 mL of toluene at 80° C. and then cooled to room temperature. The resulting yellow solution was then placed under 365 nm light for 5 minutes at which point the yellow solution formed a yellow-orange gel. Excess toluene was removed via decanting and the polymer was reswelled and decanted 2× to remove DMPA. The newly formed gel was then dried on high vacuum to remove toluene. Rubbery orange solid, quantitative. TGA: 10% mass loss at 286° C.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

The invention claimed is:

1. A method of preparing a fluoropolymer comprising:
preparing a polymerization reaction mixture comprising a diene of formula VII with an α,ω-iodoperfluorocarbon of formula VIII:

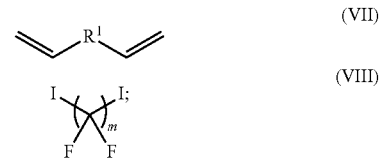

and reacting the polymerization reaction mixture with sodium dithionite, thereby creating a fluoropolymer comprising repeat units according to formula I, Ia, or Ib:

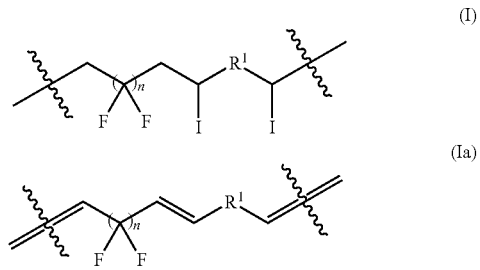

47
-continued (Ib)
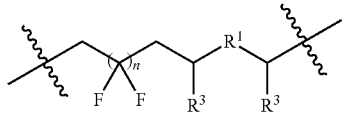

wherein:

each $R^1$ is independently a divalent linker;

each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron; and n is an integer from 1-100.

2. The method of claim 1, wherein the method further comprises contacting the fluoropolymer with a cross linking agent, thereby creating a cross-linked fluoropolymer comprising repeat units according to formula Ic, Id, Ie, If, or Ig:

(Ic)
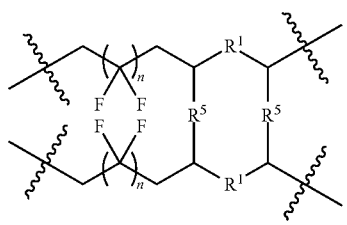

(Id)
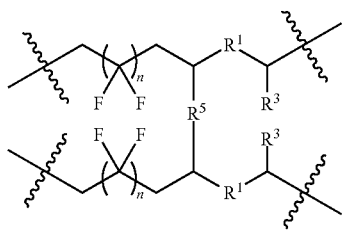

(Ie)
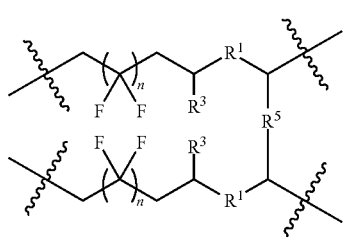

(If)
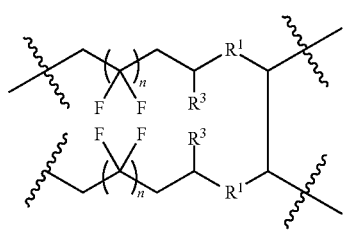

48
-continued (Ig)
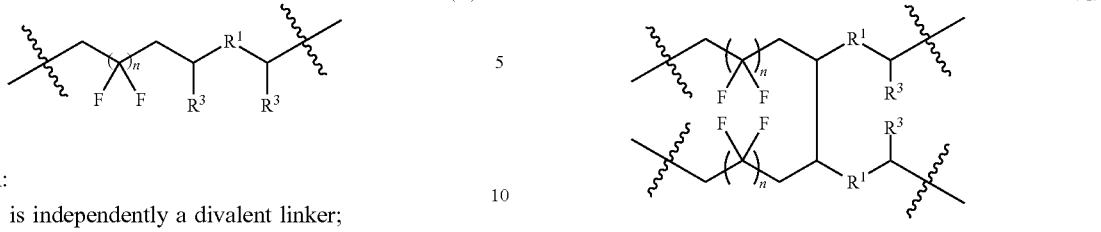

wherein each $R_5$ has the structure of:

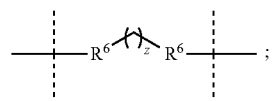

each $R^1$ is independently a divalent linker;

each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;

n is an integer from 1-100;

wherein:

each $R^6$ is independently an arylene or heteroarylene; and z is 0-20.

3. The method of claim 2, wherein the cross-linked fluoropolymer is a compound according to formula IIIc, IIId, or IIIe:

(IIIc)
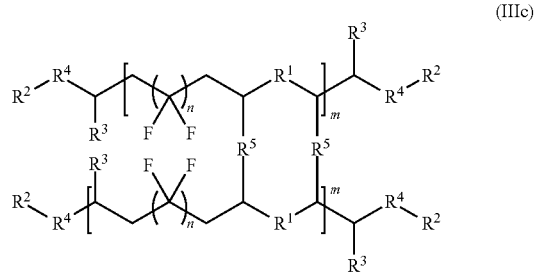

(IIId)
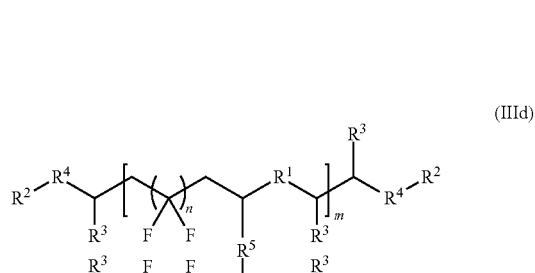

-continued

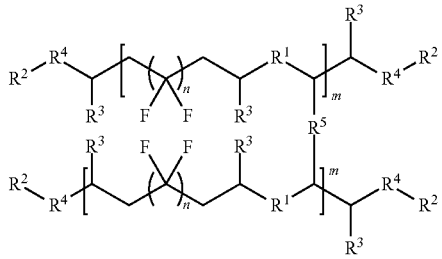

(IIIe)

wherein m is 1-5000;
each $R^1$ is independently a divalent linker;
each $R^2$ is independently H, alkyl, alkenyl, alkynyl, aryl, heteroaryl, ester, acyloxy, alkoxy, alkylthio, disulfide, OH, SH, SeH, CN, amino, carboxy, thioester, amide, azide, phosphine, halogen, nitro, carbonyl, silyl, or boron;
each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;
each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and
n is an integer from 1-100.

4. The method of claim 3, wherein m is 15-5000, 15-2000, 15-1000, 15-500, 50-5000, 50-2000, or 50-500.

5. The method of claim 2, wherein the cross-linked fluoropolymer is a compound according to formula IV:

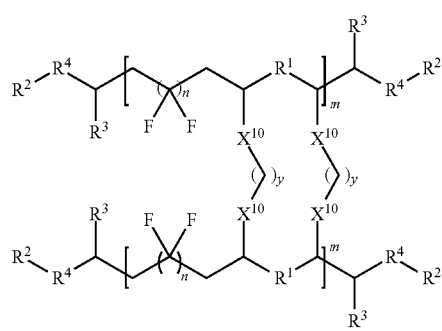

(IV)

wherein,
each $R^1$ is independently a divalent linker;
each $R^2$ is independently H, alkyl, alkenyl, alkynyl, aryl, heteroaryl, ester, acyloxy, alkoxy, alkylthio, disulfide, OH, SH, SeH, CN, amino, carboxy, thioester, amide, azide, phosphine, halogen, nitro, carbonyl, silyl, or boron;
each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;
each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and
n is an integer from 1-100;
each $X^{10}$ is independently O or S; and
y is 0-20.

6. The method of claim 5, wherein y is 0, 2 or 10.

7. The method of claim 2, wherein the cross-linked fluoropolymer polymer is a compound according to formula Vd:

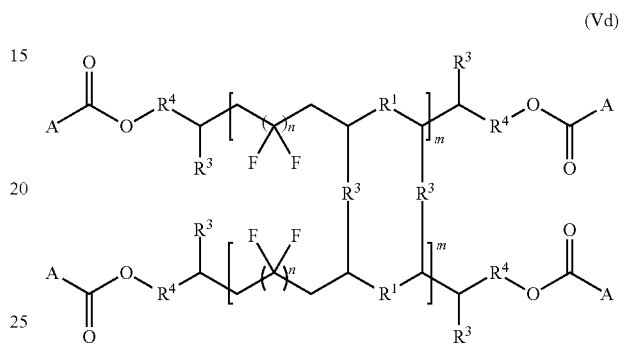

(Vd)

wherein
each A is independently aryl or heteroaryl;
each $R^1$ is independently a divalent linker;
each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;
each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and
n is an integer from 1-100; and
m is 1-5000.

8. The method of claim 7, wherein the fluoropolymer polymer is a compound according to formula VI:

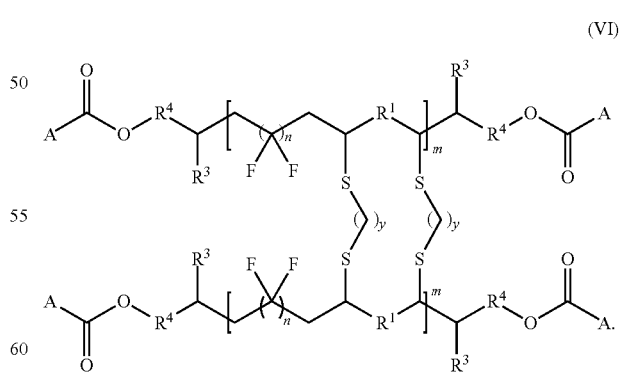

(VI)

wherein
each A is independently aryl or heteroaryl;
each $R^1$ is independently a divalent linker;
each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;

each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and n is an integer from 1-100;

m is 1-5000; and y is 0-20.

9. The method of claim 8, wherein $R^4$ comprises a perfluoroalkylene.

10. The method of claim 1, wherein the repeat unit further comprises an end group according to formula II, IIa, or IIb:

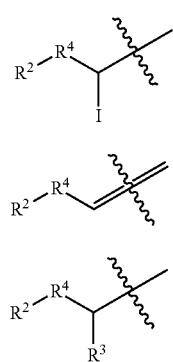

wherein:

$R^4$ is a divalent linker;

$R^2$ is H, alkyl, alkenyl, alkynyl, aryl, heteroaryl, ester, acyloxy, alkoxy, alkylthio, disulfide, OH, SH, SeH, CN, amino, carboxy, thioester, amide, azide, phosphine, halo, nitro, carbonyl, silyl, or boron; and each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron.

11. The method of claim 10, wherein $R^1$ is the same as $R^4$.

12. The method of claim 10, wherein $R^2$ is alkenyl or halo.

13. The method of claim 10, wherein $R^2$ is:

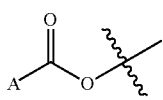

wherein A is an aryl or heteroaryl;

or $R^2$ is an amide.

14. The method of claim 10, wherein $R^4$ comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester.

15. The method of claim 10, wherein $R^4$ is selected from:

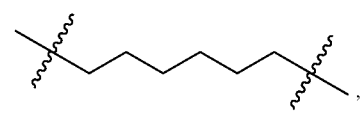

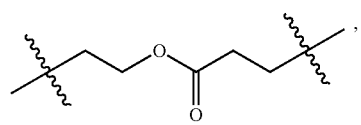

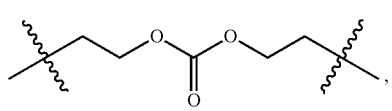

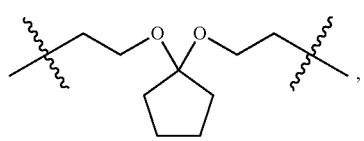

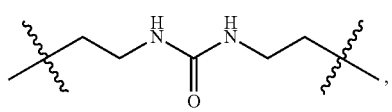

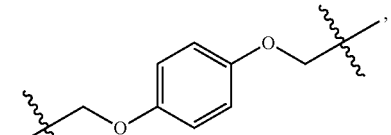

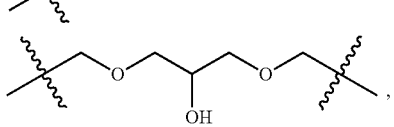

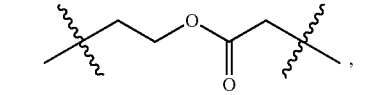

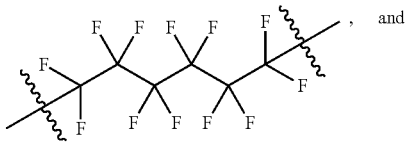

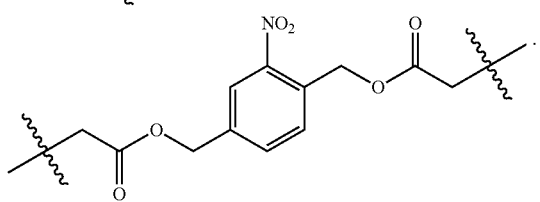

16. The method of claim 1, wherein $R^1$ comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester.

17. The method of claim 1, wherein $R^1$ is selected from:

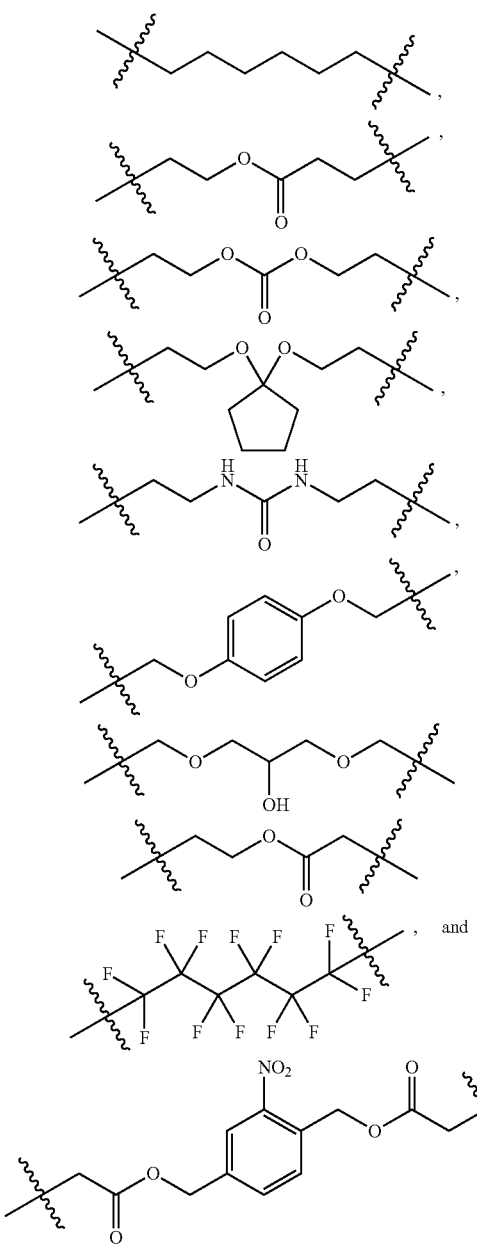

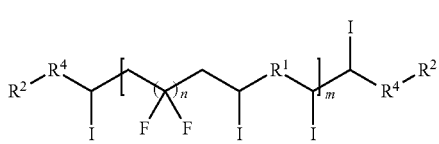

18. The method of claim 1, wherein $R^3$ is aryl, heteroaryl, cycloalkyl, alkenyl, alkoxy, alkylthio, OH, CN, amino, carboxy, ester, thioester, amide, or azide.

19. The method of claim 1, wherein $R^1$ comprises a perfluoroalkylene.

20. The method of claim 1, wherein the fluoropolymer is a compound according to formula III, IIIa, or IIIb:

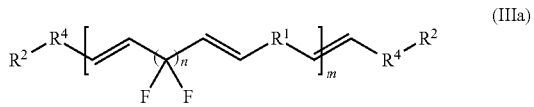

(III)

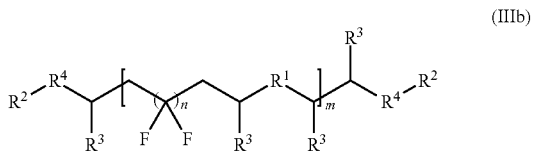

(IIIa)

(IIIb)

wherein m is 1-5000;

each $R^1$ is independently a divalent linker;

each $R^2$ is independently H, alkyl, alkenyl, alkynyl, aryl, heteroaryl, ester, acyloxy, alkoxy, alkylthio, disulfide, OH, SH, SeH, CN, amino, carboxy, thioester, amide, azide, phosphine, halogen, nitro, carbonyl, silyl, or boron;

each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;

each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and n is an integer from 1-100.

21. The method of claim 1, wherein the fluoropolymer is a compound according to formula Va or Vb:

(Va)

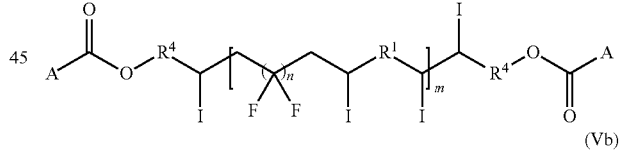

(Vb)

each A is independently aryl or heteroaryl;

each $R^1$ is independently a divalent linker;

each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and n is an integer from 1-100; and m is 1-5000.

22. The method of claim 1, wherein the fluoropolymer is a compound according to formula Vc:

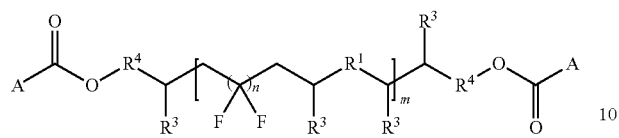

(Vc)

wherein m is 1-5000;
each A is independently aryl or heteroaryl;
each $R^1$ is independently a divalent linker;
each $R^3$ is independently H, alkyl, alkenyl, alkynyl, alkoxy, allyl, aryl, heteroaryl, alkylthio, disulfide, OH, SH, SeH, CN, amino, carboxy, ester, thioester, amide, azide, phosphine, halogen, nitro, carbonyl, silyl, or boron;
each $R^4$ independently comprises an alkylene, an ester, a carbonate, an ether, an acetal, a urea, an arylene, a heteroarylene, a thioether, a sulfoxide, a sulfone, a selenide, a selenoxide, a phosphodiester, boron, a boronic ester, a silyl, a siloxane, a diazo, an orthoester, a carbonyl, a disulfide, or an enol ester; and
n is an integer from 1-100; and
m is 1-5000.

* * * * *

UNITED STATES PATENT AND TRADEMARK OFFICE
CERTIFICATE OF CORRECTION

PATENT NO. : 11,597,785 B2
APPLICATION NO. : 16/764680
DATED : March 7, 2023
INVENTOR(S) : Ellen M. Sletten et al.

Page 1 of 1

It is certified that error appears in the above-identified patent and that said Letters Patent is hereby corrected as shown below:

In the Claims

In Claim 12, Line 48, cancel the text:
"halo."
And insert:
--halogen--.

Signed and Sealed this
Twelfth Day of December, 2023

Katherine Kelly Vidal
*Director of the United States Patent and Trademark Office*